US010322906B2

(12) United States Patent
Gale

(10) Patent No.: US 10,322,906 B2
(45) Date of Patent: Jun. 18, 2019

(54) APPARATUS FOR FOLDING A SHEET OF MATERIAL INTO A SUPPORT STRUCTURE

(71) Applicant: Tessellated Group, LLC, Napa, CA (US)

(72) Inventor: Gregory W. Gale, Napa, CA (US)

(73) Assignee: Tessellated Group, LLC, Napa, CA (US)

( * ) Notice: Subject to any disclaimer, the term of this patent is extended or adjusted under 35 U.S.C. 154(b) by 10 days.

(21) Appl. No.: 15/849,964

(22) Filed: Dec. 21, 2017

(65) Prior Publication Data
US 2018/0215572 A1   Aug. 2, 2018

Related U.S. Application Data

(63) Continuation of application No. 14/421,194, filed as application No. PCT/US2013/054813 on Aug. 13, 2013, now abandoned.

(60) Provisional application No. 61/683,171, filed on Aug. 14, 2012, provisional application No. 61/682,702, filed on Aug. 13, 2012.

(51) Int. Cl.
| | |
|---|---|
| *B65H 45/12* | (2006.01) |
| *B21D 11/02* | (2006.01) |
| *B21D 13/02* | (2006.01) |
| *B21D 47/00* | (2006.01) |
| *B21D 5/01* | (2006.01) |
| *B29C 53/04* | (2006.01) |
| *B31D 3/00* | (2017.01) |
| *B31D 5/04* | (2017.01) |

(52) U.S. Cl.
CPC ............... *B65H 45/12* (2013.01); *B21D 5/01* (2013.01); *B21D 11/02* (2013.01); *B21D 13/02* (2013.01); *B21D 47/00* (2013.01); *B29C 53/04* (2013.01); *B31D 3/002* (2013.01); *B31D 5/04* (2013.01)

(58) Field of Classification Search
CPC ........ B65H 45/12; B21D 11/02; B21D 13/02; B21D 47/00; B21D 5/01; B31D 3/002; B31D 5/04; B29C 53/24; B29C 53/04; B29C 53/10
USPC ............... 493/405, 448, 451, 463, 955, 966; 264/286, 287, 280, 284, 285, 292, 324; 156/462, 474; 72/319, 401, 306, 177, 72/187
See application file for complete search history.

(56) References Cited

U.S. PATENT DOCUMENTS

| | | | |
|---|---|---|---|
| 3,417,959 A | 12/1968 | Schultz | |
| 3,955,019 A * | 5/1976 | Keith | ......................... B26F 1/24 |
| | | | 264/248 |

(Continued)

OTHER PUBLICATIONS

"PCT International Preliminary Report on Patentability in PCT/US2013/054813", dated Feb. 17, 2015, 5 pages.

(Continued)

*Primary Examiner* — Andrew M Tecco
*Assistant Examiner* — Nicholas Igbokwe
(74) *Attorney, Agent, or Firm* — Servilla Whitney LLC

(57) ABSTRACT

Apparatus and methods for forming three dimensional structures from a sheet of material of a desired medium are described. Examples described include an apparatus for folding a sheet of material to create a folded structure, the apparatus having a first and second array of creasing elements, and at least one actuator for causing relative movement of the first and second array of creasing elements from a first position to a second position.

13 Claims, 35 Drawing Sheets

(56) References Cited

U.S. PATENT DOCUMENTS

| | | | | |
|---|---|---|---|---|
| 3,963,813 | A * | 6/1976 | Keith | B29C 51/24 |
| | | | | 264/165 |
| 4,012,932 | A * | 3/1977 | Gewiss | B31D 5/00 |
| | | | | 264/287 |
| 4,614,632 | A * | 9/1986 | Kezuka | B29C 51/08 |
| | | | | 264/280 |
| 4,967,533 | A | 11/1990 | Weisse | |
| 5,000,673 | A * | 3/1991 | Bach | B27N 3/20 |
| | | | | 156/62.2 |
| 5,645,259 | A * | 7/1997 | Chen | A47B 3/12 |
| | | | | 108/118 |
| 6,640,605 | B2 | 11/2003 | Gitlin | |
| 6,913,570 | B2 | 7/2005 | Kehrle | |
| 7,222,511 | B2 | 5/2007 | Durney | |
| 7,429,171 | B2 * | 9/2008 | Akishev | B21D 13/02 |
| | | | | 425/388 |
| 7,488,169 | B2 * | 2/2009 | Keduka | B29C 51/30 |
| | | | | 264/299 |
| 7,762,938 | B2 | 7/2010 | Gale | |
| 2006/0053857 | A1 | 3/2006 | Durney | |
| 2010/0165463 | A1 | 7/2010 | Mimura | |

OTHER PUBLICATIONS

"PCT International Search Report in PCT/US13/54813", dated Sep. 2, 2014, 2 pages.
"PCT International Written Opinion in PCT/US2013/54813", dated Sep. 2, 2014, 4 pages.

* cited by examiner

APPARATUS FOR FOLDING A SHEET OF MATERIAL INTO A SUPPORT STRUCTURE

CROSS-REFERENCE TO RELATED APPLICATIONS

This is a continuation of U.S. application Ser. No. 14/421,194, filed Aug. 13, 2013, which is the U.S. National Phase entry of International Application No. PCT/US2013/054813, filed Aug. 13, 2013, which claims priority to U.S. Provisional Application No. 61/682,702, filed Aug. 13, 2012, and U.S. Provisional Application No. 61/683,171, filed Aug. 14, 2012, the disclosures of which are all incorporated herein in their entireties.

TECHNICAL FIELD

This present disclosure relates to apparatus for folding a sheet of material, and more particularly apparatus for folding a sheet of material into a three dimensional structure.

BACKGROUND

Sandwiched structures are known in the art. Some sandwich structures are formed using corrugated materials, which may be fluted by passing a material between rollers. Other sandwiched structures may be formed using core materials, for example honeycomb cores or foam cores, which may be sandwiched or disposed between one or more ply sheets or external liners.

However, conventional sandwich structures exhibit many drawback in strength, rigidity, weight, and durability. Improved three dimensional support structures have been introduced, as described in U.S. Pat. No. 7,762,932, which is incorporated herein in its entirety by this reference for any purpose. Instead of corrugating the core or inner medium of the structure, the three dimensional support structures described in U.S. Pat. No. 7,762,932 are generally formed by folding a sheet of medium, which may be paper or other foldable medium, into a three dimensional structure.

While certain processes for large scale production of corrugated structures may be known, methods and apparatus for obtaining folded three dimensional structures in an automated fashion are not currently available. The present disclosure may address some or all of the shortcomings in the art.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
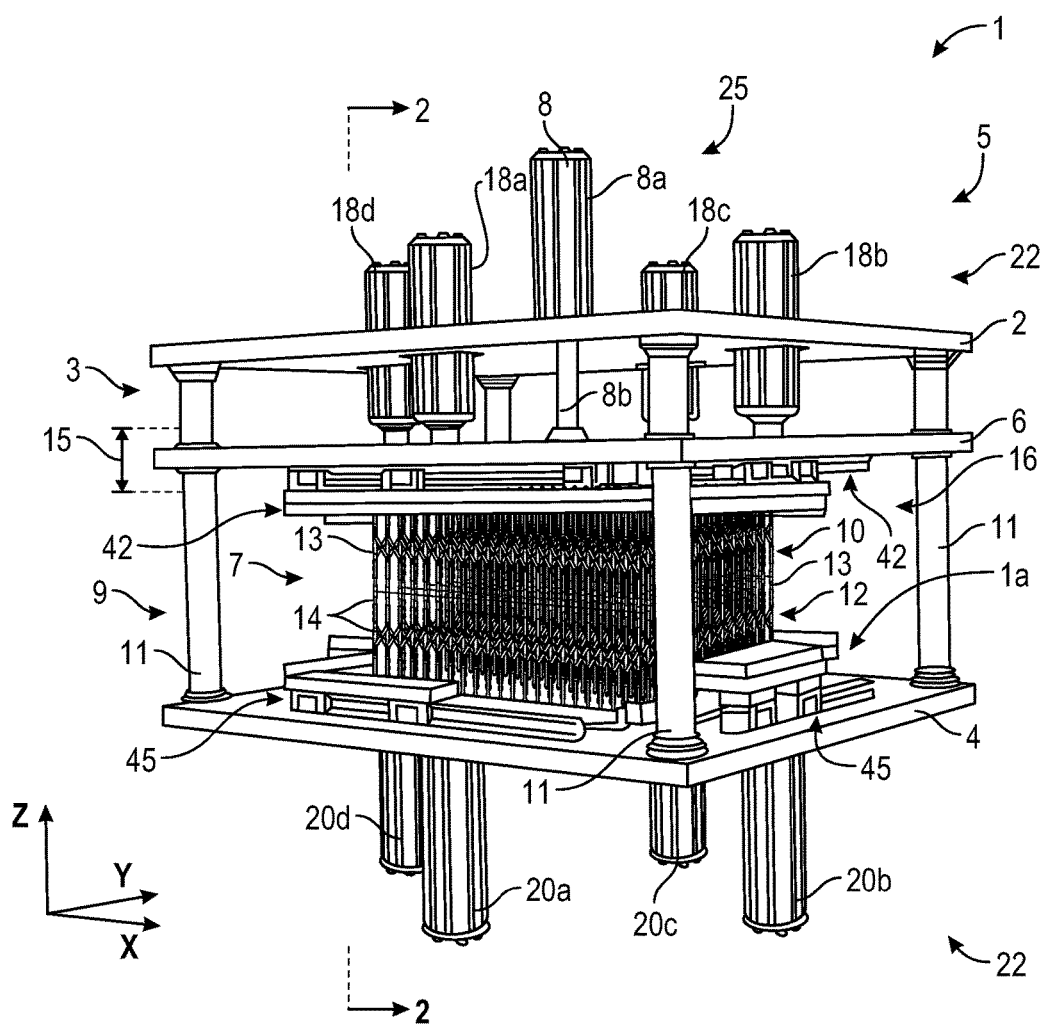
FIG. 1 is an isometric and schematic view of an apparatus of the present invention for folding a sheet of material into a support structure.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

Apparatus, systems and methods for folding a sheet of material into a folded support structure are described herein, which apparatus, systems, and methods, as will be appreciated, lend themselves to a level of automation. An exemplary apparatus includes a first array of creasing elements and a second array of creasing elements, each of the creasing elements in the first and second arrays having a leading edge adapted to engage a sheet of material. The apparatus further includes at least one first actuator for causing relative movement of the first and second arrays of creasing elements from a first position in which the first and second plurality of creasing elements are spaced apart to a second position in which the first and second array of creasing elements are at least partially interdigitated whereby the sheet of material can be placed between the first and second arrays of creasing elements and folded by the leading edges of the creasing elements during the relative movement of the first and second arrays creasing elements to the second position. The apparatus also includes at least one second actuator for moving the creasing elements of the first array closer together and the creasing elements of the second array closer together during relative movement of the first and second arrays of creasing elements to the second position whereby the movement of the creasing elements of the first array closer together and the creasing elements of the second array closer together accommodates contraction of the sheet of material as it is folded by the first and second arrays of creasing elements.

An exemplary apparatus for folding a sheet of material into a support structure according to the present invention is illustrated in FIGS. 1-4. Exemplary folding apparatus 1 therein may include a support structure 3, an actuation assembly 5 including a plurality of actuators, and a creasing assembly 7 including a first or top array 10 of creasing elements and a second or bottom array 12 of creasing elements. The support structure 3 generally includes any structural features provided for supporting and maintaining the relative positioning between components of the actuation assembly 5 and creasing assemblies 7. The actuation assembly 5 can include an suitable actuation device such as a pump, motor or other mechanical or electrical actuator adapted for generating and providing the desired movement of the components of the creasing assembly 7, for example the movement of creasing arrays 10, 12 and creasing elements relative to each other. In the context of this disclosure, creasing elements may interchangeably be referred to as folding elements and accordingly, the term "folding element" is an alternate term for "creasing element." The creasing assembly 7 includes structures configured to engage with a folding medium to obtain a folded three dimensional structure as will be described.

In the creasing assembly 7, a first array 10 of creasing elements and a second array 12 of creasing element including a respective plurality of individual top creasing elements 13 and bottom creasing elements 14 can be provided, each creasing element 13, 14 being configured to engage with a foldable medium during operation of the apparatus 1 to fold the medium according to a desired pattern. In the exemplary apparatus 1, the creasing assembly 7 has a first or top array 10 of creasing elements 13 and a second or bottom array 12 of creasing elements 14, each as described in further detail below. As will be understood, designations of relative positioning such as "top," "bottom," "left," "right," and similar identifiers are used herein only for the purposes of facilitating the description of the examples disclosed herein and are not to be taken in a limiting sense.

The support structure 3 may include a plurality of support elements or members, which can include platforms or plates, which may be generally rigid and used to mount various components of the actuation assembly 5 and creasing assembly 7 thereto. A first or top support member or plate 2 and a second or bottom support member or plate 4 may remain stationary relative to each other during the operation of the device, and accordingly may be respectively referred to herein as stationary top platform 2 and a stationary base platform 4. A third or intermediate support member or plate 6 may be provided between the top plate 2 and bottom plate 4. The third or intermediate plate 6 may be configured to move relative to the first and/or second plates 2, during operation of the folding apparatus 1. In one embodiment, illustrated in FIG. 1, first plate 2, second plate 4, and intermediate plate 6 are each generally rectangular in shape and each extend in the x-y plane, noted in FIG. 1, and are disposed in spaced-apart positions along the z axis and generally parallel to each other. In one embodiment, intermediate or moveable plate 6 is movable along the z axis or vertical direction 15 relative to and between both top plate 2 and bottom plate 4. Each of the plates 2, 4, 6 may be made from any suitable rigid material such as metal, plastic or ceramic. It is appreciated that other form factors and relative arrangement may be used in other embodiments of the invention.

Figure 2:
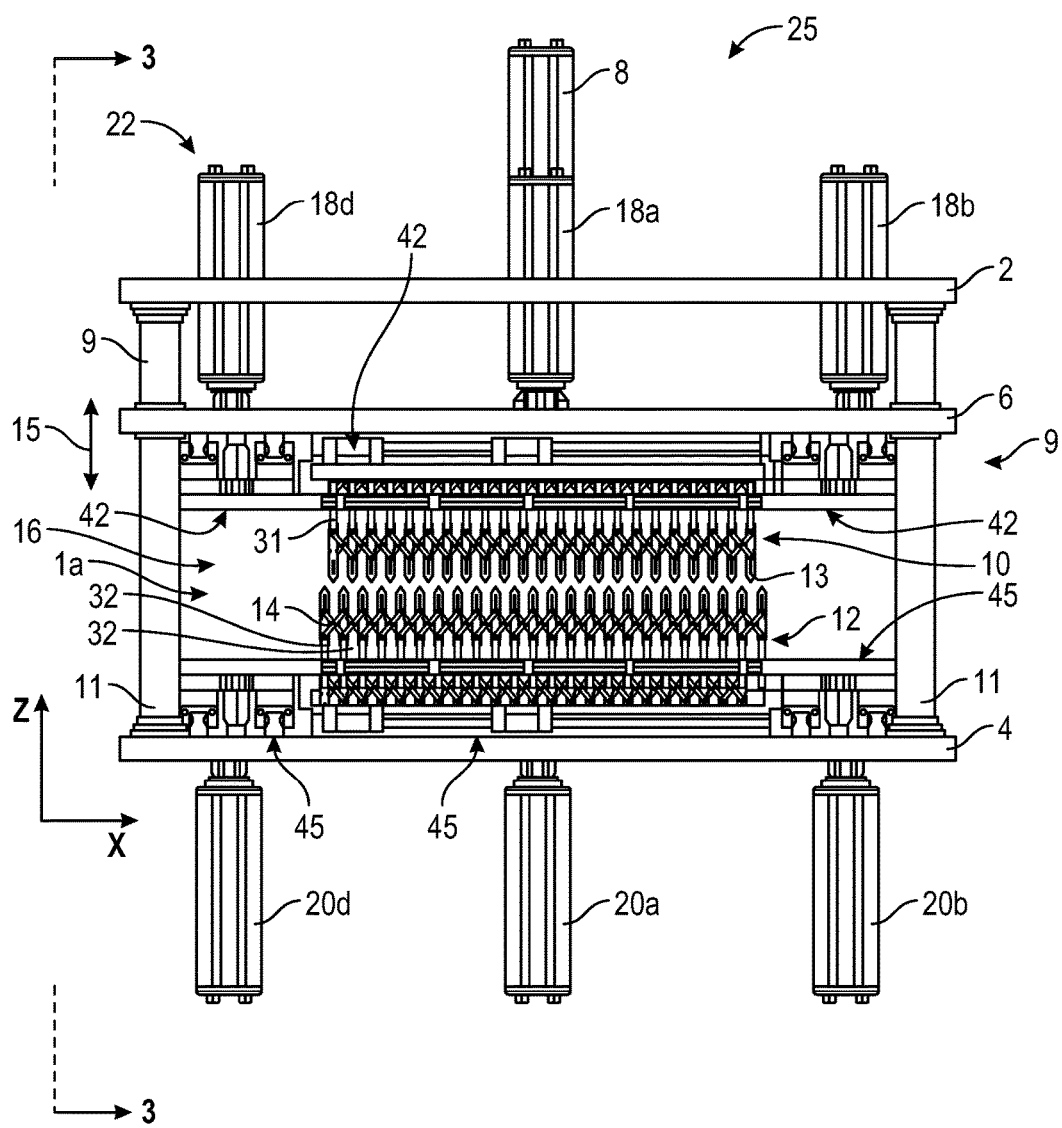
FIG. 2 is a front elevational view of the apparatus of FIG. 1 taken along the line 2-2 of FIG. 1.
Figure 3:
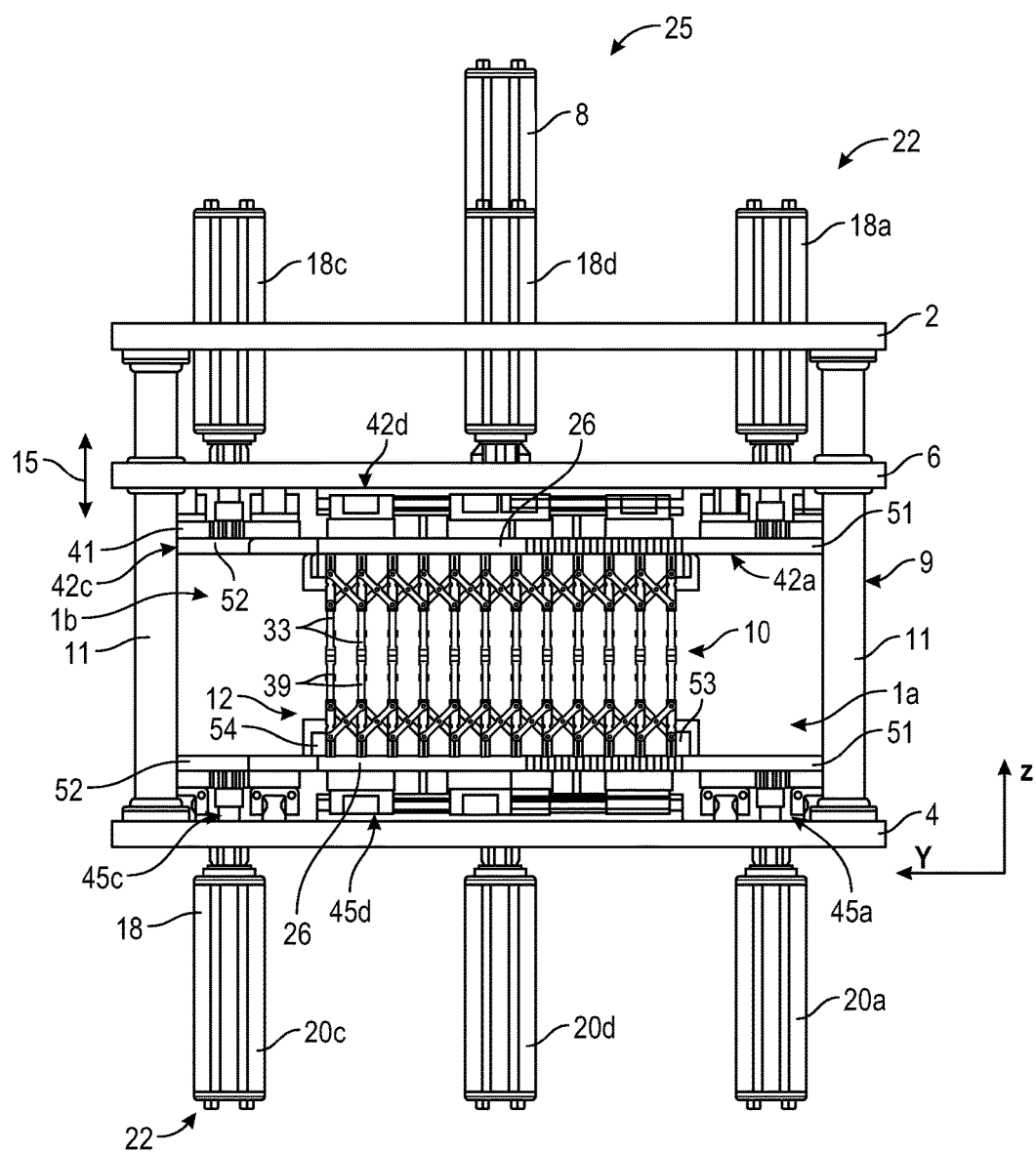
FIG. 3 is a side elevational view of the apparatus of FIG. 1 taken along the line 3-3 of FIG. 2.

The support structure 3 may also include one or more support members 9. The support members may be implemented as posts or columns 11 extending between the top plate 2 and the bottom plate 4. The guide columns 11 are mounted or secured to and support the top plate 4 in a fixed position relative to the bottom plate 2. Each of the columns has a first or top end secured to top plate 2 and a second or bottom end secured to bottom plate 4. The columns 11 may, in some examples, be used as vertical movement guides for the vertical movement of the intermediate plate 6 relative to and between the plates 2, 4. in one embodiment, four support members or columns 11 are provided, one at each corner of plates 2, 4 and as shown in FIGS. 1-3, however it is appreciated that any number of support members 11 may be used as desired or suitable for the particular application. In some examples the plates or platforms 2, 4, 6 may be circular, for example, and different number of columns, for example three in number, or in some examples six or eight columns may be used to maintain the plates in the desired configuration. It is appreciated that other mechanisms, structures, guides or elements may be provided for permitting intermediate plate 6 to move relative to top and bottom plates 2, 4 and for guiding the intermediate plate 6 during such movement.

The intermediate plate 6, which is provided between the first plate 2 and second plate 4, is configured to move in the vertical direction 15, for example the direction perpendicular to the respective planes of top and bottom plates 2, 4 and thus along the z axis or vertical direction 15, during the operation of exemplary apparatus 1. A plurality of apertures or openings may be provided through the thickness of the intermediate plate 6 such that the columns 11 can pass through the plate 6 and the plate 6 can move up and down, using the columns 11 as guides. Each of the apertures may include a bearing assembly or any other conventional sliding contact mechanism (not shown) for slidingly coupling the support member within the aperture to the intermediate plate 6. The bearing may be selected such that it provides a nominally frictionless contact between surfaces of the columns 11 and the apertures. In some examples, one or more surfaces of the apertures and/or columns may be treated or otherwise coated with a low-friction coating to reduce friction between and minimize wear of the surfaces of the columns 11 and apertures as the plate 6 moves up and down. In one embodiment, some or all of the columns 11 are cylindrical and the apertures in plate 6 are circular, although it is appreciated that other cooperatively engaging cross-sectional configurations, such as oval, rectangular or square, can be provided.

In one embodiment, a plurality of linear actuators, for example cylinder-piston type, hydraulic or electric actuators, may be used instead of the stationary support members or columns 11. That is, in some examples, a first plurality of pistons or actuators (not shown) may be provided between the first plate 2 and the intermediate plate 6 and a second plurality of pistons (non shown) may be provided between the intermediate plate 6 and the second plate 4. The movement of the linear actuators may be controlled and/or synchronized as desired, using a programmable controller for example, to provide coordinated movement of such actuators and thus corresponding movement of the intermediate plate 6 along the z axis or vertical direction 15.

Figure 21:
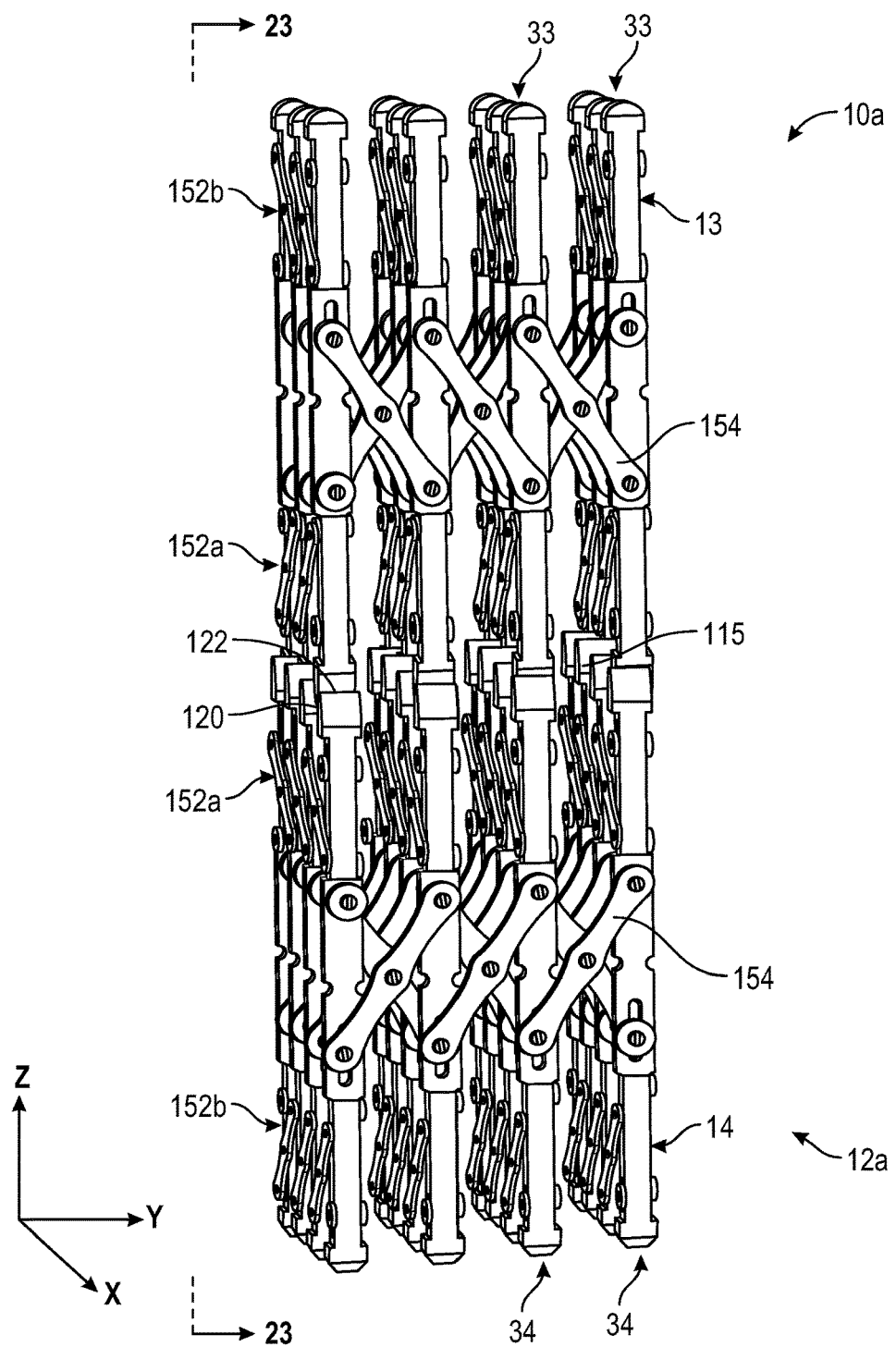
FIG. 21 is a side-perspective isometric view of the portion of the first and second arrays of creasing elements of FIG. 16 in a partially engaged position with a partially folded sheet of material disposed therebetween.
Figure 22:
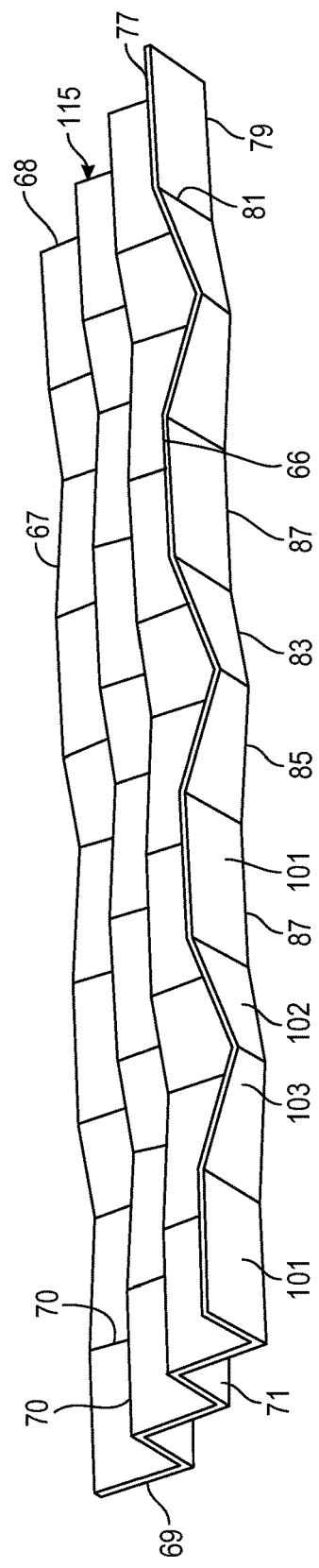
FIG. 22 is a somewhat schematic, isometric view of the partially folded sheet of material of FIG. 6.
Figure 23:
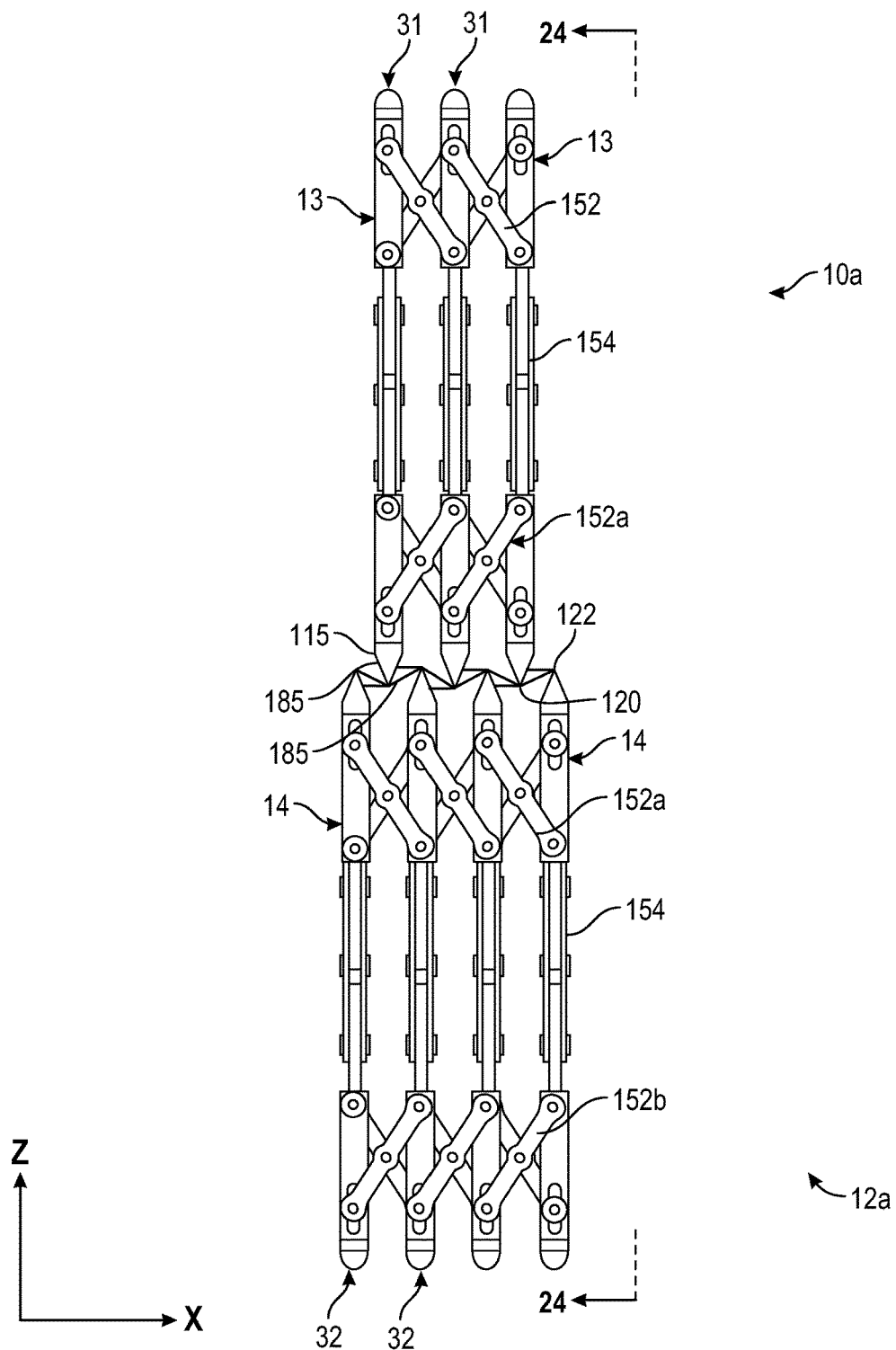
FIG. 23 is a front elevational view of the portion of the first and second arrays of creasing elements of FIG. 21 taken along the line 23-23 of FIG. 21.
Figure 24:
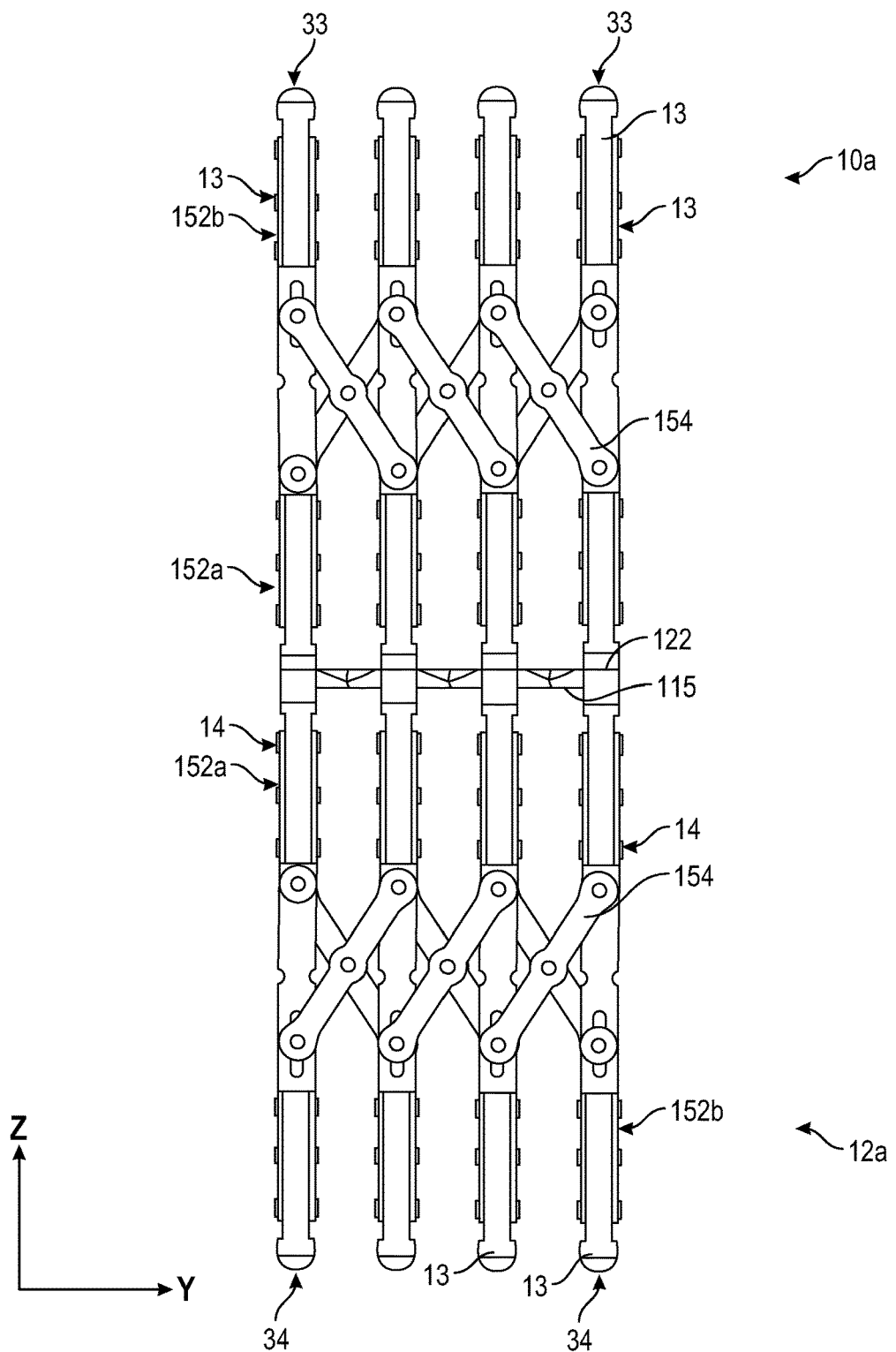
FIG. 24 is a side elevational view of the portion of the first and second arrays of creasing elements of FIG. 21 taken along the line 24-24 of FIG. 23.

Actuation assembly 5 may generally include actuation devices for causing relative movement between the first array 10 and the second array 12 between a first or home position where the first array 10 and second array 12 are spaced apart, as shown for example in FIGS. 2, 3, 16, 17, 19 and 20, and a second position where the creasing elements of the first array 10 and second array 12 are interdigitated, as shown for example in FIGS. 21, 23 and 24. In the example in FIGS. 1-3, by virtue of the arrays 10, 12 being mounted to two separate respective plates or platforms, movement of the arrays 10, 12 towards or away from each other is achieved by one or more actuators configured to move one or both of such plates towards or away from each other. In one embodiment, first array 10 is mounted on the intermediate plate 6, for example on the lower or inner-facing surface of the intermediate plate 6, and second array 12 is mounted on bottom plate 4, for example on the upper or inner-facing surface of the bottom plate 4 and thus arrays 10, 12 face or are opposed to each other. The actuators of actuation assembly 5 can serve to cause intermediate plate 6 to move downwardly or towards bottom plate 4, or cause bottom plate 4 to move upwardly or towards intermediate plate 6, or both. In one embodiment the actuation assembly 5 moves intermediate plate 6 downwardly relative to bottom plate 4, and top plate 2, and the bottom and top plates 4, 2 remain stationary, and in this manner first or top array 10 is moved from a first or home position in which the creasing elements 13 of the top array are spaced from the creasing elements 14 of the bottom array 12 to a second position in which the creasing elements 13 of the top array 10 are at least partially interdigitated with the creasing elements 14 of the bottom array 12. The actuation assembly 5 may also include actuation devices configured to move the creasing element 13, 14 and/or arrays 10, 12 in the x-y plane, for example longitudinally and laterally.

Figure 4:
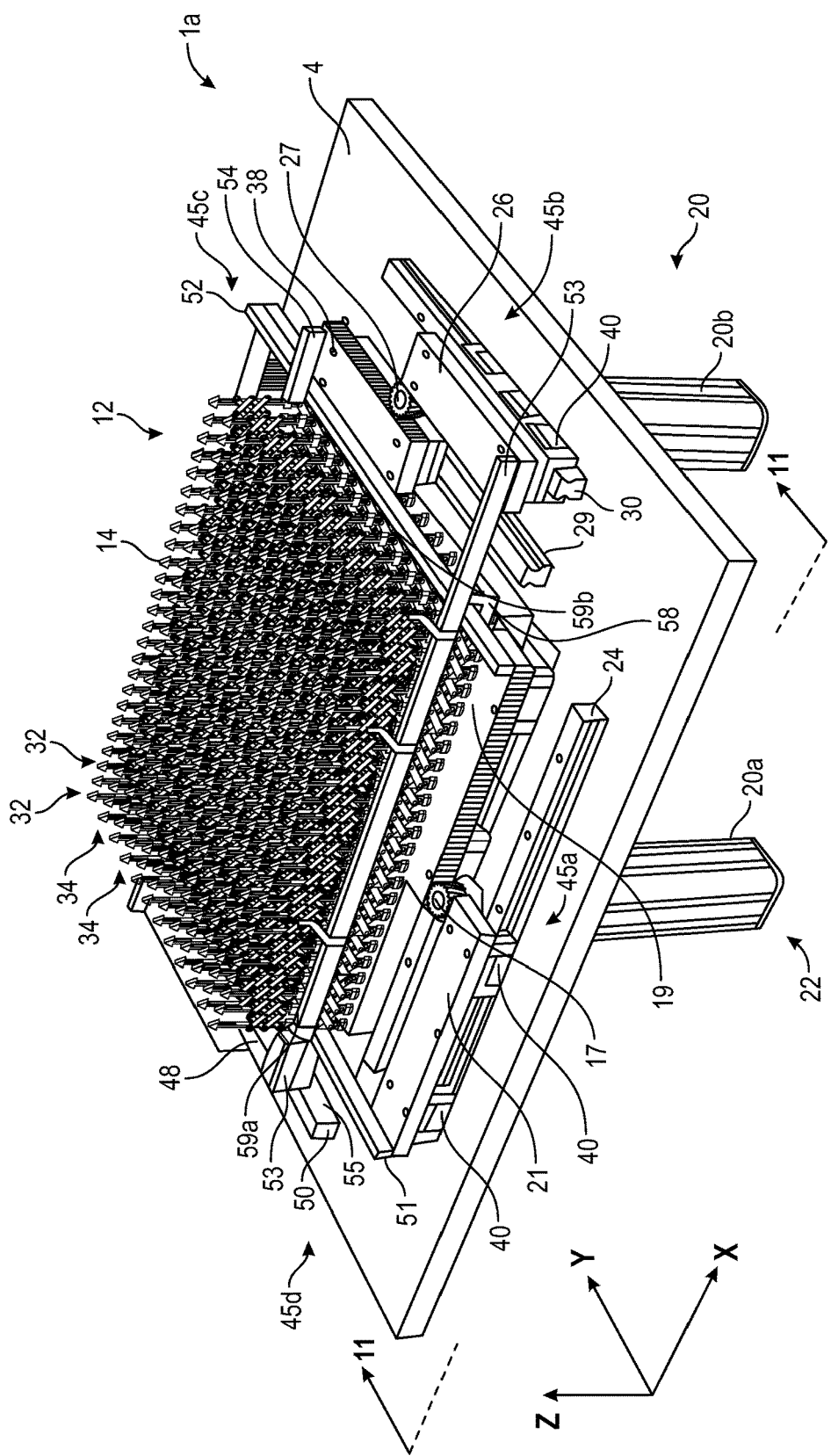
FIG. 4 is an isometric view of the bottom half of the apparatus of FIG. 1 in the fully-disengaged position.
Figure 25:
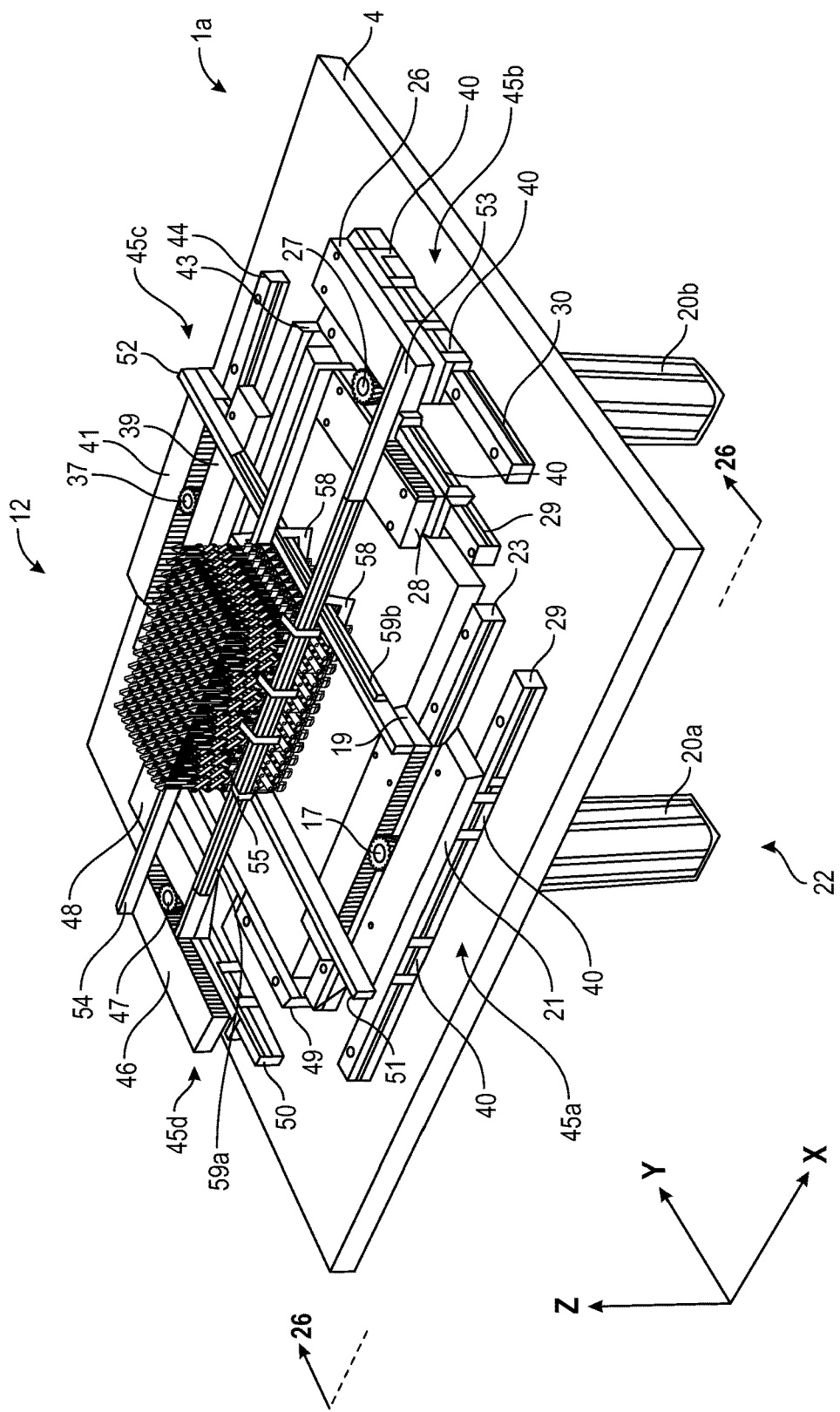
FIG. 25 is an isometric view of the bottom half of the apparatus of FIG. 1 in a fully-engaged position.
Figure 26:
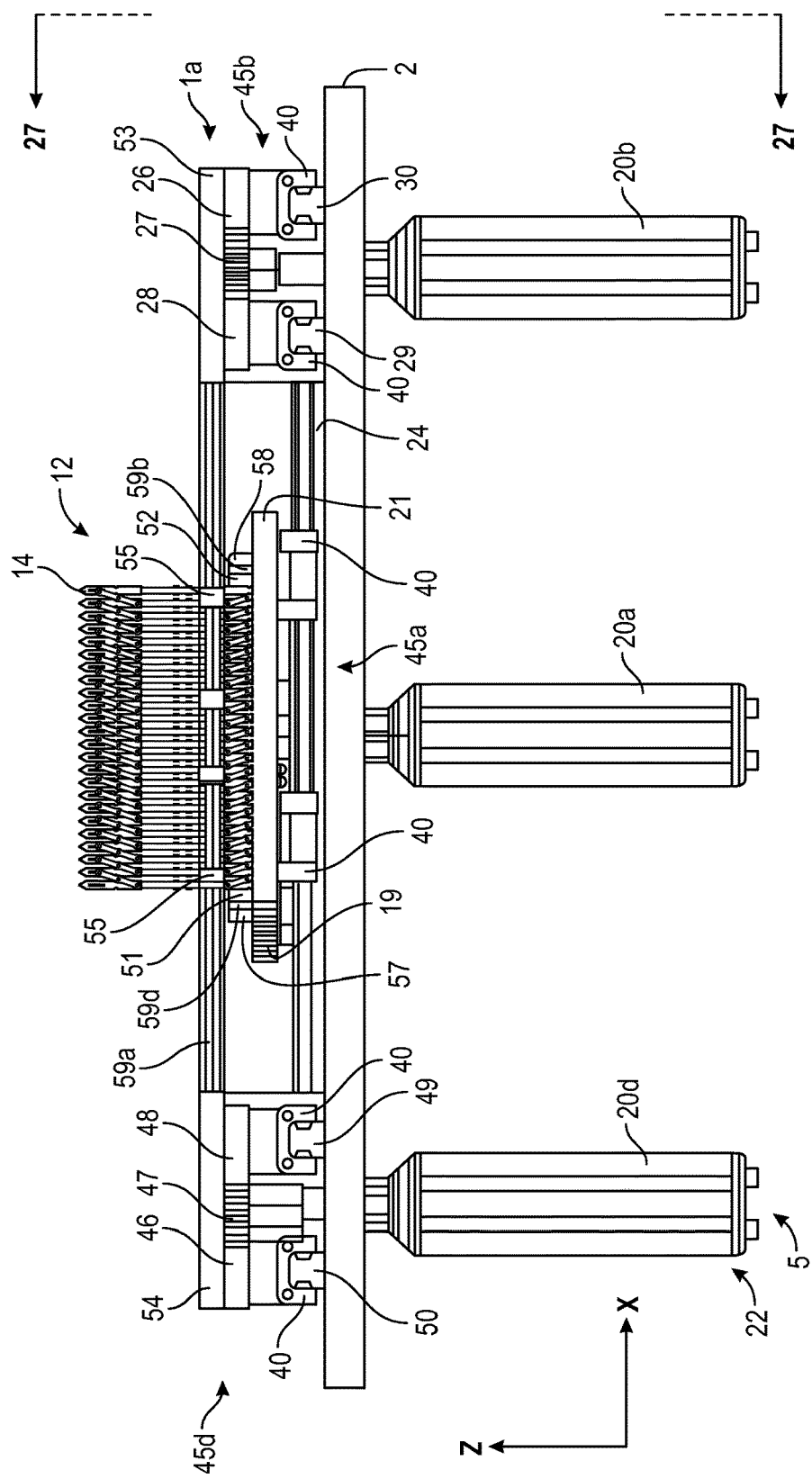
FIG. 26 is a front elevational view of the bottom half of the apparatus of FIG. 25 taken along the line 26-26 of FIG. 25.
Figure 27:
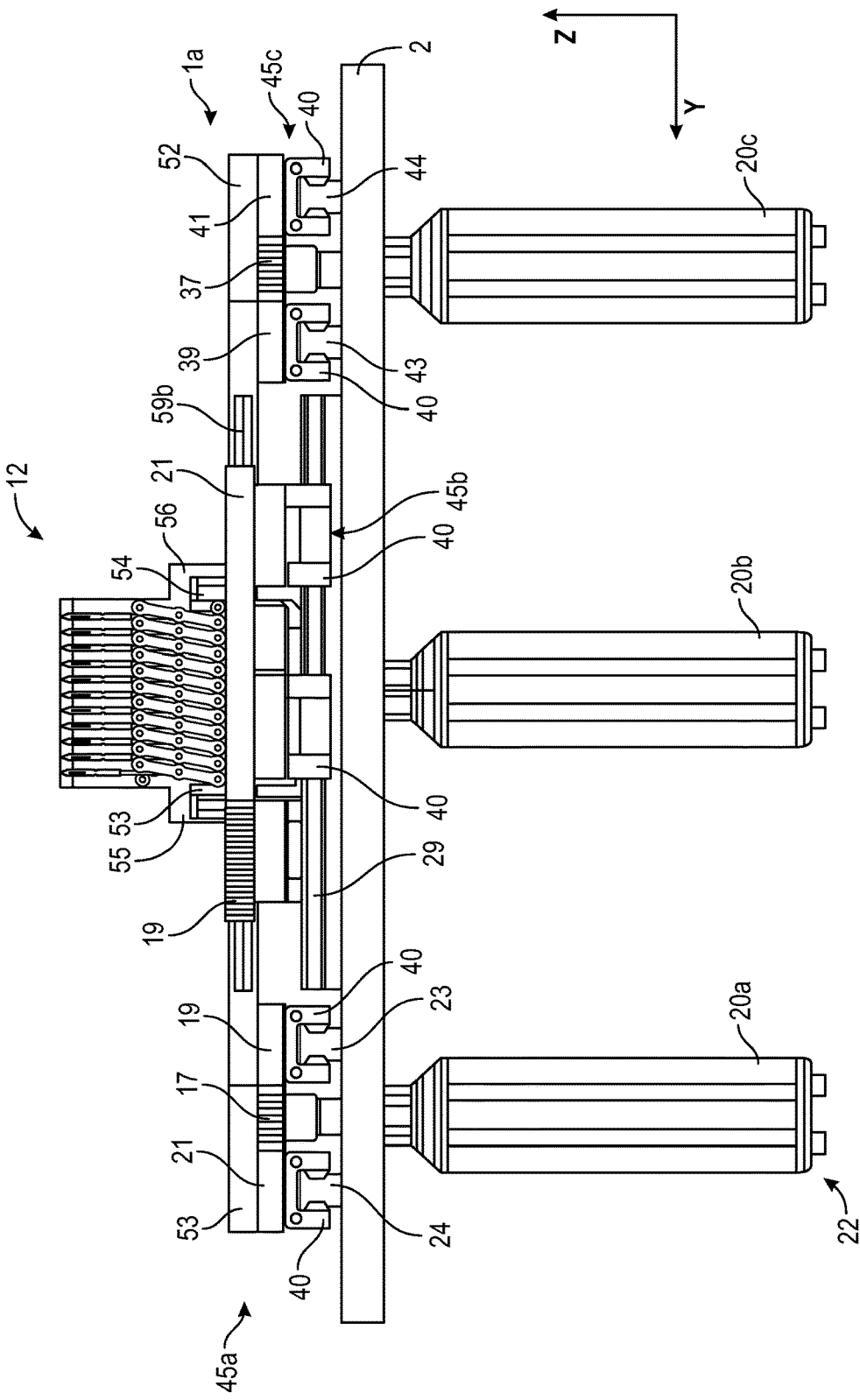
FIG. 27 is a side elevational view of the bottom half of the apparatus of FIG. 25 taken along the line 27-27 of FIG. 26.

An exemplary operation of the apparatus will be briefly described to further aid in understanding the components and functions of the actuation assembly. Generally, during operation, the first array 10 and second array 12 and respective individual creasing elements or folding elements 13, 14 of the arrays are configured to move along the x and y directions. At some stages of a folding operation the individual creasing elements, for example creasing elements or folding elements 13 and 14, of the first array 10 and the second array 12 move between a first or fully expanded position, as illustrated in FIG. 4, and a second or fully contracted position, as illustrated in FIG. 25. In the fully expanded or home position, the creasing elements 13, 14 are spaced farther apart from each other more than when the creasing elements are in the fully contracted position, in which the creasing elements are closer together. In one embodiment, for example as shown in FIGS. 25-30, adjacent creasing elements are at least nearly touching each other and can in fact touch each other when the respective array is in the fully contracted position. Accordingly in some instances, the first or top array 10 and/or the second or bottom array 12 may be said to be in an expanded configuration, for example when the creasing elements are spaced apart, or in a collapsed configuration, for example when the creasing elements are close together. The arrays 10 and 12 can pass through several intermediate stages of being partially expanded or collapsed along the x and y directions when moving between such first and second positions. Contraction and expansion of the creasing elements of an array 10, 12 in the x direction can be coordinated with or independent of the contraction and expansion of such creasing elements in the y direction. In addition, contraction and expansion of creasing elements 13 in one array 10 and can be coordinated with or independent of the contraction and expansion of creasing elements 14 in the other array 12.

Figure 28:
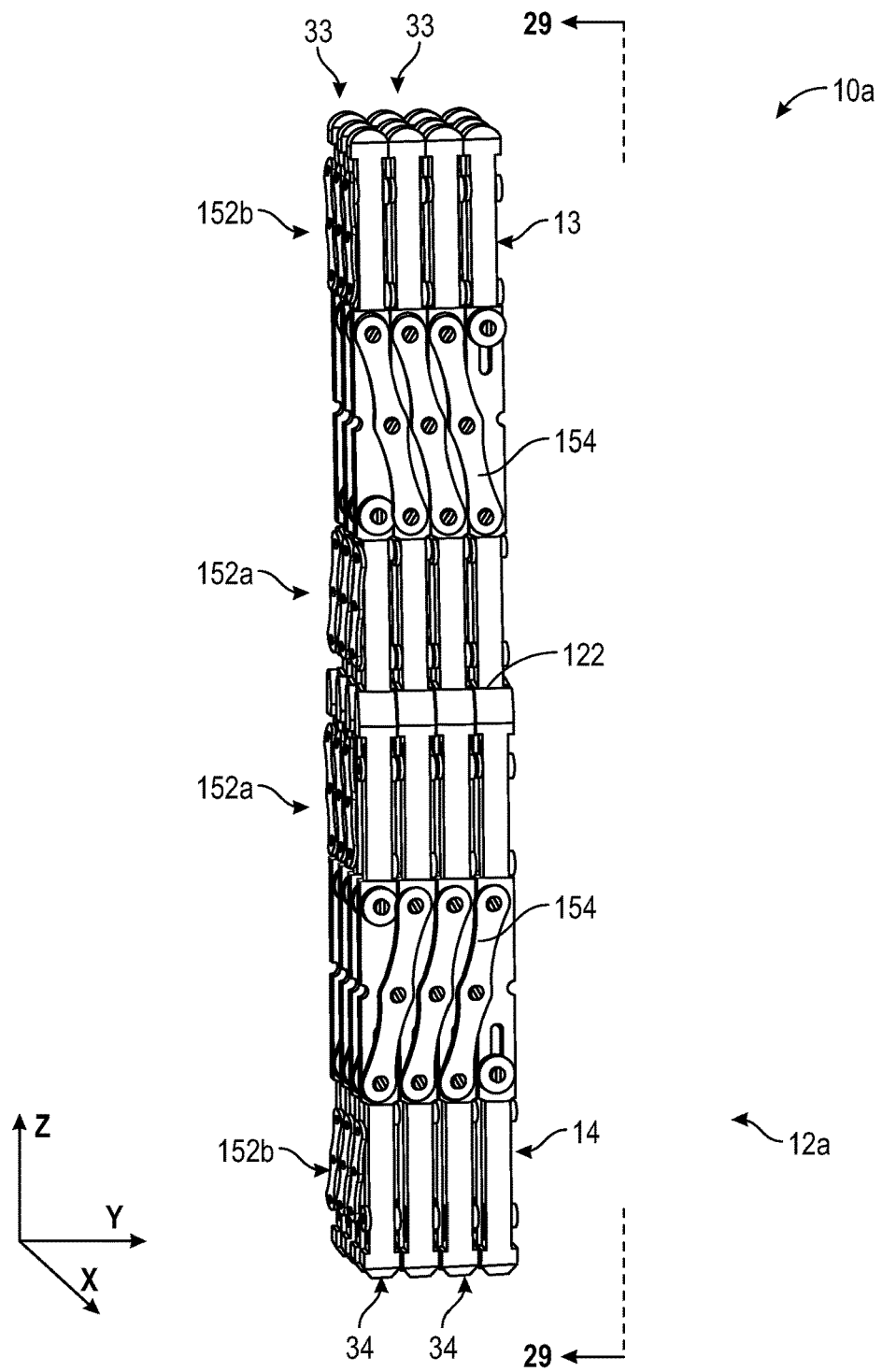
FIG. 28 is a side-perspective isometric view of the portion of the first and second arrays of creasing elements of FIG. 16 in a fully engaged position with a fully folded sheet of material disposed therebetween.
Figure 29:
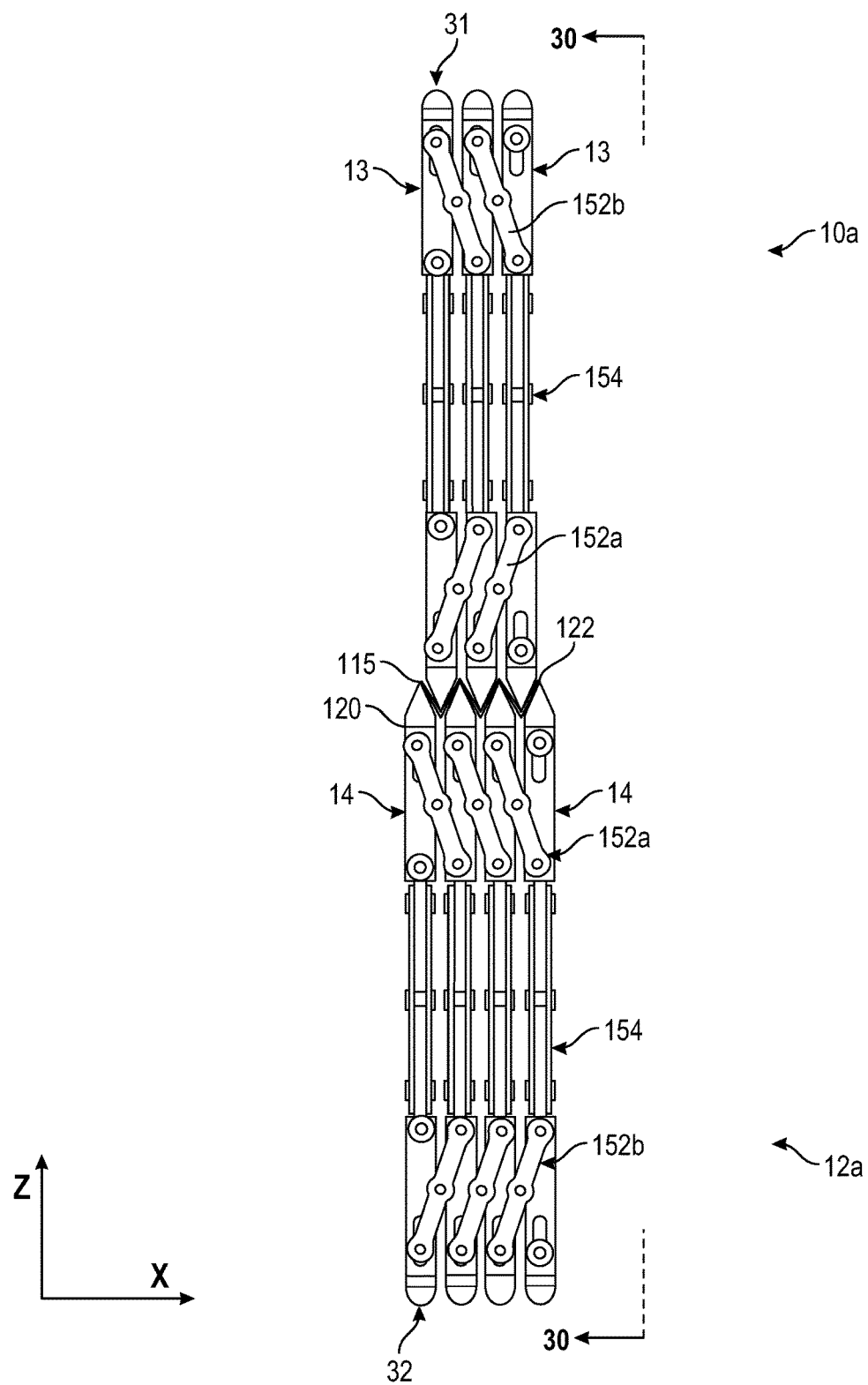
FIG. 29 is a front elevational view of the portion of the first and second arrays of creasing elements of FIG. 28 taken along the line 29-29 of FIG. 28.
Figure 30:
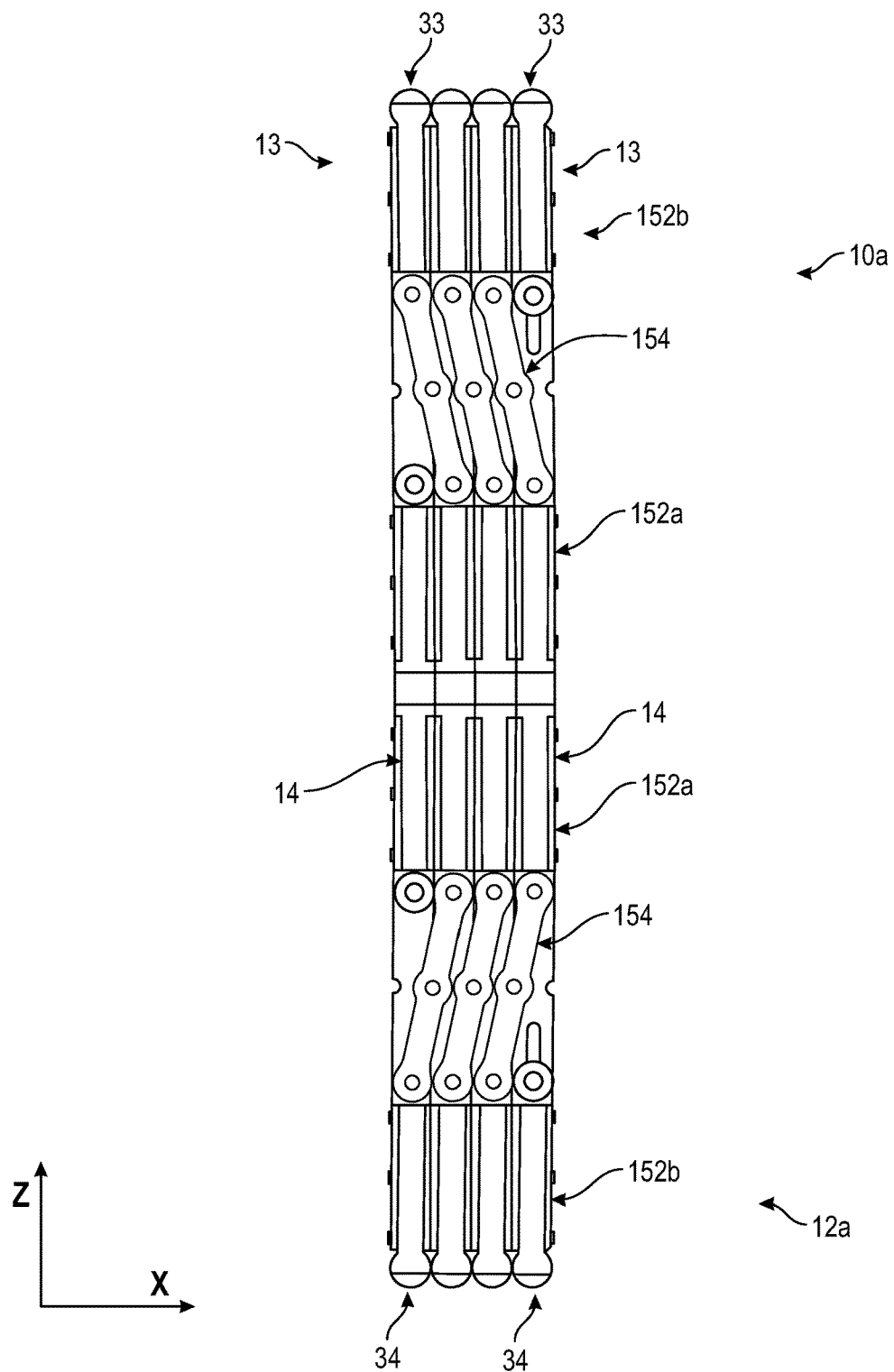
FIG. 30 is a side elevational view of the portion of the first and second arrays of creasing elements of FIG. 28 taken along the line 30-30 of FIG. 28.

In addition, the first or top array 10 is also configured to translate or move up and down, that is along the z axis and vertical direction 15, relative to the second or bottom array 12 (see FIGS. 1-3). At some stages of a folding operation the individual creasing elements, for example creasing elements 13 and 14, of the first array 10 and the second array 12 move relative to each other between a first or spaced-apart or non-interdigitated position, as illustrated in FIGS. 1-3, 16-17, and a second or fully interdigitated position, as illustrated in FIG. 28-30. In the first expanded position, the creasing elements 13, 14 are spaced farther apart from each other and the leading edges 120 of the creasing elements 13 are not interdigitated with the leading edges 122 of the creasing elements 14. In one embodiment, for example as shown in FIGS. 28-30, the top portion 150 of the creasing elements 13 are fully interdigitated with the top portion 150 of creasing elements 14 when the arrays 10, 12 are fully interdigitated relative to or with each other. In one embodiment, the inclined surfaces 124, 126 of creasings elements 13 are in contact with or in closed proximity to and substantially parallel to the opposed inclined surfaces 124, 126 of the creasing elements 14 when the arrays 10, 12 are fully interdigitated relative to each other. The arrays 10 and 12 can pass through several intermediate stages of being partially interdigitated in z direction when moving between such first and second positions. Interdigitation of the arrays 10, 12 in the z direction can be coordinated with or independent of the contraction and expansion one or both of the arrays in the x direction and in the y direction. For example, the relative movement of the arrays 10, 12 can be coordinated such that the arrays are fully contracted in the x and y directions and when the arrays are fully interdigitated in the z direction. It is appreciated that many combinations of independent or coordinated movement of the creasing elements or folding elements of one array in the x, y and z directions, or of the creasing elements or folding elements of both arrays in the x, y and z directions, can be provided by apparatus 1.

Movement of the arrays 10, 12 and creasing elements 13, 14 along the x and/or y direction is provided by one or more array actuation assemblies or devices 22. Movement in the vertical direction 15 of one or more of the arrays is provided using one or more plate actuation assemblies or devices 25. This combination of array and plate actuation devices or actuators is configured to provide three-degrees of freedom of the creasing elements 13, 14 of each of the arrays 10, 12, for example movement along all three of the x, y and z axes, such that each creasing element in an array 10 or 12 is moveable along the x, y, and z axes relative to the creasing elements in the other array 12 or 10. Hence, for example, each creasing element 13 in the top array 10 is movable along all three orthogonal x, y and z axes relative to the creasing elements 14 in the bottom array 12. In one embodiment, creasing elements 13, 14 are restrained from rotational movement along all of the axes, however it is appreciated that arrays of creasing elements may be provided that rotate or pivot along one or any combination of axes such that various curved structures may be manipulated or formed using the apparatus described herein.

Generally, the arrays 10, 12 and individual creasing elements 13, 14 are configured for linear motion along the x, y and z axes according to a desired timing or sequence to achieve the folding of a sheet of material into a folded support structure, as will be described herein. The timing and sequence of relative motion of the arrays and creasing elements may be controlled with one or more manual or programmable controllers (not shown), which are operatively coupled for example by hard wiring or wireless communication to the actuation assembly 5.

In one embodiment, plate actuation may be accomplished by a plate actuation assembly or device 25 that includes one or more linear actuators 8, for example piston-type actuator that can be hydraulic, pneumatic or electric or any other linear actuators currently known or later developed. In the present example, a single actuator 8 having a housing 8a and a piston 8b that is extendable from the housing 8a in a linear manner is used, with the first or free end of the piston 8b secured to the intermediate or moveable plate 6 and the housing 8a being secured to the top plate 2. In this manner, as the first end of the piston 8b moves away from or extends from the actuator housing 8a, plate 6 is translated or moved downwardly on columns 11 along the z direction to a position closer to the bottom plate 4, thus contracting the creasing assembly 7 in the z direction by causing the creasing elements 13 of the top array 10 to interdigitate with the creasing elements 14 of the bottom array 12. When the piston 8b retracts into the housing 8a, moveable plate 6 is translated or moved upwardly and away from the bottom plate 4, thus expanding the creasing assembly 7 along the z direction by causing the creasing elements 13 of the top array 10 to move away from the creasing elements 14 of the bottom array 12.

As will be appreciated, in some examples, any number of actuators 8 may be used in plate actuation device or assembly 25. For example, in other embodiments, two or more actuators 8, and in some embodiments smaller actuators 8, may be used in place of a single central actuator 8. In other examples, four actuators 8 may be used, which may for example be located at each corner of the apparatus 1, such as at each corner of top plate 2 and intermediate plate 6. As previously described, in some examples, the linear actuation of the plate 6 may be achieved by replacing the support members or columns 11 with active components, for example linear actuators. In one embodiment (not shown), a rack and pinion gearing mechanism may be used to provide linear actuation of the intermediate plate 6. Any other actuation devices 8 currently known or later developed may be used to move the plate 6 and thus move the arrays 10, 12 closer together and farther apart, that is provide vertical movement of one or both of the arrays 10, 12.

The actuation assembly 5 may also include an array actuation assembly or device 22 for providing movement of the first array 10 and second array 12 of creasing elements 13, 14 and the individual creasing elements 13, 14 along the x and/or y directions, for example lateral and/or longitudinal movement in the x-y plane. Array actuation assembly 22 may be implemented using any combination of hydraulic, pneumatic or electrical actuators, piston-type or otherwise. In some examples, the array actuation assembly 22 may include one or more hydraulically or pneumatically-driven rotary actuators. In some examples, electrical motors or other electrical actuators may be used to provide the desired movement of the arrays 10, 12 and associated creasing elements 13, 14 in the x-y plane. The x-y plane, as used in the context of the present disclosure, is meant to refer to some reference x-y plane, for example the x-y plane illustrated in FIG. 1, as well as any plane parallel to such reference x-y plane.

In one embodiment of apparatus 1, array actuation assembly 22 for causing longitudinal and lateral actuation of the arrays 10, 12 of creasing elements includes a plurality of rotary actuators, such as first or top rotary actuators 18 and second or bottom actuators 20. The array actuation assembly may, in addition, include a plurality motion converters or transmission mechanisms, such as first or top gear mechanisms 42 and second or bottom gear mechanism 45, for converting the rotation of the shafts of the respective actuators 18, 20 to linear motion. The gear mechanisms 42, 45 may be of the rack and pinion type, and in one embodiment may include a central gear or pinion and a pair of linear bar gears or racks, each of the pair of racks being disposed on opposite sides of the pinion gear and engaged with the teeth of the pinion gear. The components of each of gear mechanisms 42, 45 may be made from any suitable material such as metal or plastic. In one embodiment of apparatus 1, four rotary top actuators 18 are mounted to the intermediate plate 6 and move up and down with the plate 6 and four rotary bottom actuators 20 are mounted on the bottom plate 2, and remain stationary with such plate 2. Each of the plurality of actuators 18 and 20 is configured to rotate a one of the circular gears or pinions of the respective rack and pinion assemblies 42 and 45 to cause the related bar gear or rack of the respective rack and pinion assembly 42 and 45 to translate along the x or y directions. In some embodiments, certain coupling devices may be used, if desired, to couple the rotation of a single actuator to a plurality of rack and pinion assemblies, such that fewer number of actuators may be needed.

FIGS. 4, and 11-13 show perspective, side, and top views of the bottom half 1*a* of the folding apparatus 1, and specifically bottom plate 4, bottom actuators 20, bottom rack and pinion assemblies 45 and bottom array 12 mounted on the bottom plate 4 and more particularly carried by the bottom rack and pinion assemblies 45. The bottom half assembly 1*a* includes four rotary actuators 20 as described above and four sets of rack and pinion gears 45*a*, 45*b*, 45*c* and 45*d*, described in further detail below. A first bottom rack and pinion gear assembly 45*a*, which is arranged along the x axis and adapted for x movement, includes a first x-pinion 17 and a first pair of x-racks including inner bar gear or rack 19 and outer bar gear or rack 21. The first pair of x-racks are provided on a first pair of x-rails. That is, the inner rack 19 is slidably coupled to inner rail 23 and outer rack 21 is slidably coupled to outer rail 24 in each case for example by a set of bearing mechanisms or bearings 40. Any bearing mechanism currently known or later developed may be used to slidably couple the inner and outer racks 17, 19 to the respective inner and outer rails 23, 24. The x-rails 23 and 24 may be rigidly mounted by any suitable means, for example by being bolted, welded or otherwise affixed, to bottom plate or platform 2. The first x-pinion 17 is coupled to and rotated by a first rotary actuator 20*a* during operation of the array actuation assembly or device 22, said rotation being transmitted to the racks 19, 21 which are configured to slide along the x-rails in the x direction, as shown for example by comparison of FIG. 4 and FIG. 25. During such movement or translation, the outer gear teeth on pinion 17 are rotated by actuator 20*a* and mesh with the respective teeth of racks 19, 24 to cause the racks to slide or move in opposite linear directions on the respective rails 23, 24, either towards each other in a contraction motion of the assembly 45*a* or away from each other in an extension motion of the assembly 45*a*.

A second bottom rack and pinion gear assembly 45*c* is also arranged along the x axis and adapted for x movement. The second rack and pinion gear assembly 45*c* is disposed generally opposite the first bottom rack and pinion gear assembly 45*a*, that is on the opposing side of the bottom array 12 of creasing elements 13. The second gear assembly 45*c* is substantially similar in construction and operation to first gear assembly 45*a* and includes a second x-pinion 37 and a second pair of x-racks including second inner bar gear or rack 39 and second outer bar gear or rack 41. The second pair of x-racks are provided on a second pair of x-rails, the rails being mounted to plate 2. That is, the second inner rack 39 is slidable coupled to second inner rail 43 and second outer rack 41 is coupled to second outer rail 44 by any suitable means such as by respective sets of bearings 40. The second x-pinion 37 is coupled to and rotated by a rotary actuator 20*c* during operation of the device, and rotation of the pinion 37 is used to translate the racks 39 and 41 in x direction in the manner discussed above with respect to first bottom rack and pinion gear assembly 45*c*.

Two additional rack and pinion gear assemblies 45*b*, 45*d*, each substantially similar to assemblies 45*a* and 45*c*, may be provided along the y direction and adapted for y movement in a direction perpendicular to the movement of assemblies 45*a* and 45*c*. A third rack and pinion gear assembly 45*b* includes a third pinion gear or first y-pinion gear 27 and a third pair of racks also known as first pair of y-racks, including third inner bar gear or rack 28 and third outer bar gear or rack 26. Similar to the gear assembly 45*a*, the racks 28 and 26 are slidably coupled or engaged with a third pair of rails also referred to as a first pair of y-rails, such as third inner rail 29 and third outer rail 30, by any suitable means such as a by respective sets of bearings 40, and the racks 28 and 26 are configured to traverse along the y direction in response to the rotation of third actuator 80*b* that is connected to third pinion gear 27 in the manner discussed above with respect to first bottom rack and pinion gear assembly 45*d*. Similarly, a fourth rack and pinion assembly 45*d* is provided on the opposite side of the bottom array 12 of creasing elements 14 from the third rack and pinion gear assembly 45*b*. Fourth rack and pinion gear assembly 45*d* includes a fourth pinion gear or first y-pinion gear 47 and a fourth pair of racks also known as second pair of y-racks, including fourth inner bar gear or rack 48 and fourth outer bar gear or rack 46. Similar to the third gear assembly 45*b*, the racks 48 and 46 are slidably coupled or engaged with a fourth pair of rails also referred to as a second pair of y-rails, such as fourth inner rail 49 and fourth outer rail 50, by any suitable means such as a by respective sets of bearings 40, and the racks 48 and 46 are configured to traverse along the y direction in response to the rotation of fourth actuator 80*d* that is connected to third pinion gear 47 in the manner discussed above with respect to first bottom rack and pinion gear assembly 45*d*.

The actuation assembly 22 may further include a plurality of x-push/pull or translation bars 51, 52 and y-push/pull or translation bars 53, 54, operatively coupled to the bottom array 12 and configured to collapse the array 12. In one embodiment, each of the push/pull or translation bars 51-54 may be a generally elongate members which is coupled at its opposite ends to opposite respective rack gears, such as opposite sets of the racks discussed above. The push/pull bars may also be coupled to the sides of the bottom array 12, or may be otherwise configured to apply a generally inward force to cause the bottom array 12, under the force of the rack and pinion assemblies discussed above, to contract or collapse. The push/pull bars also apply a generally outward force to cause the bottom array 12, under the force of the rack and pinion assemblies discussed above, to expand.

Figure 12:
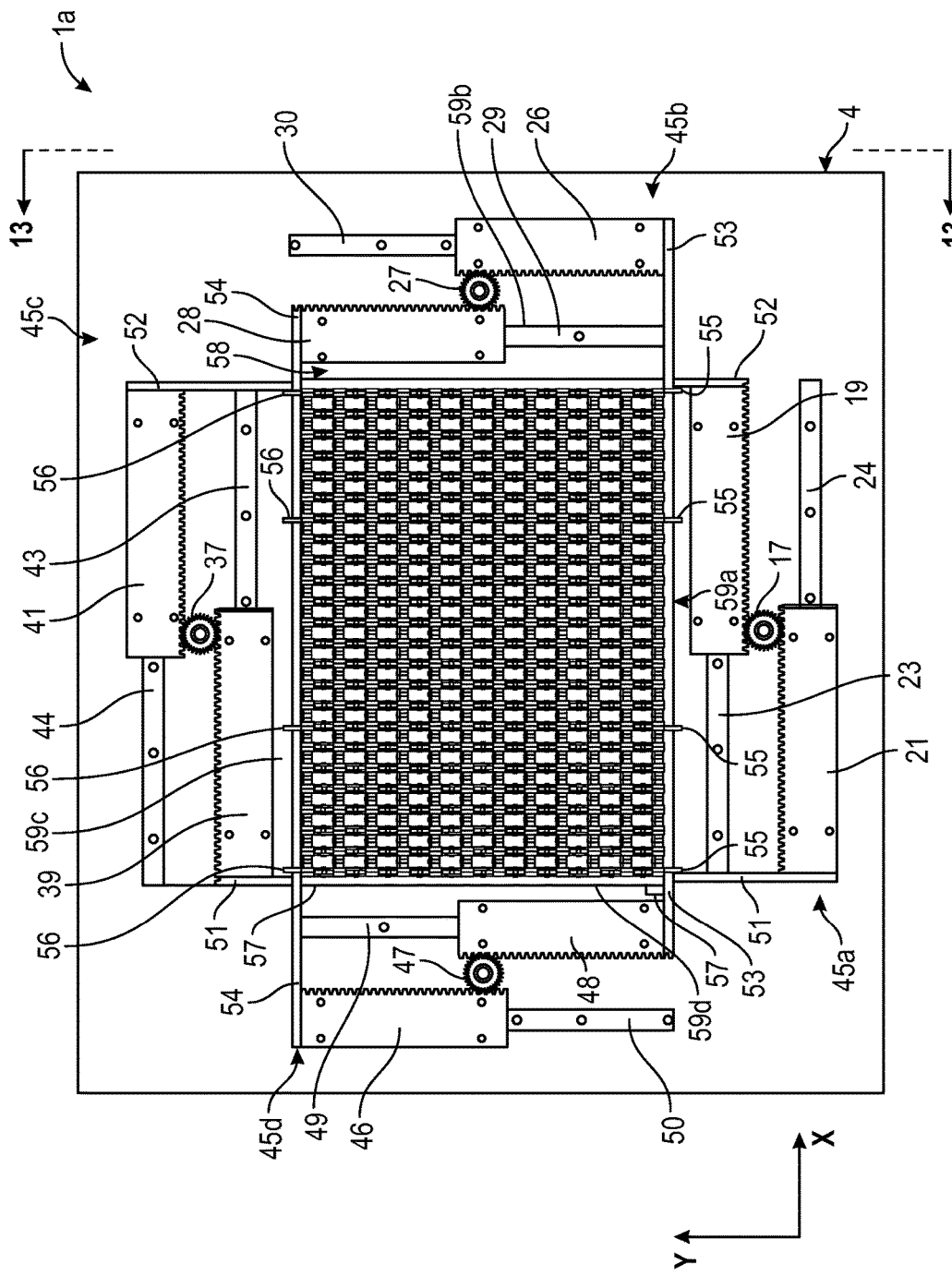
FIG. 12 is a top plan view of the bottom half of the apparatus of FIG. 4 taken along the line 12-12 of FIG. 11.
Figure 13:
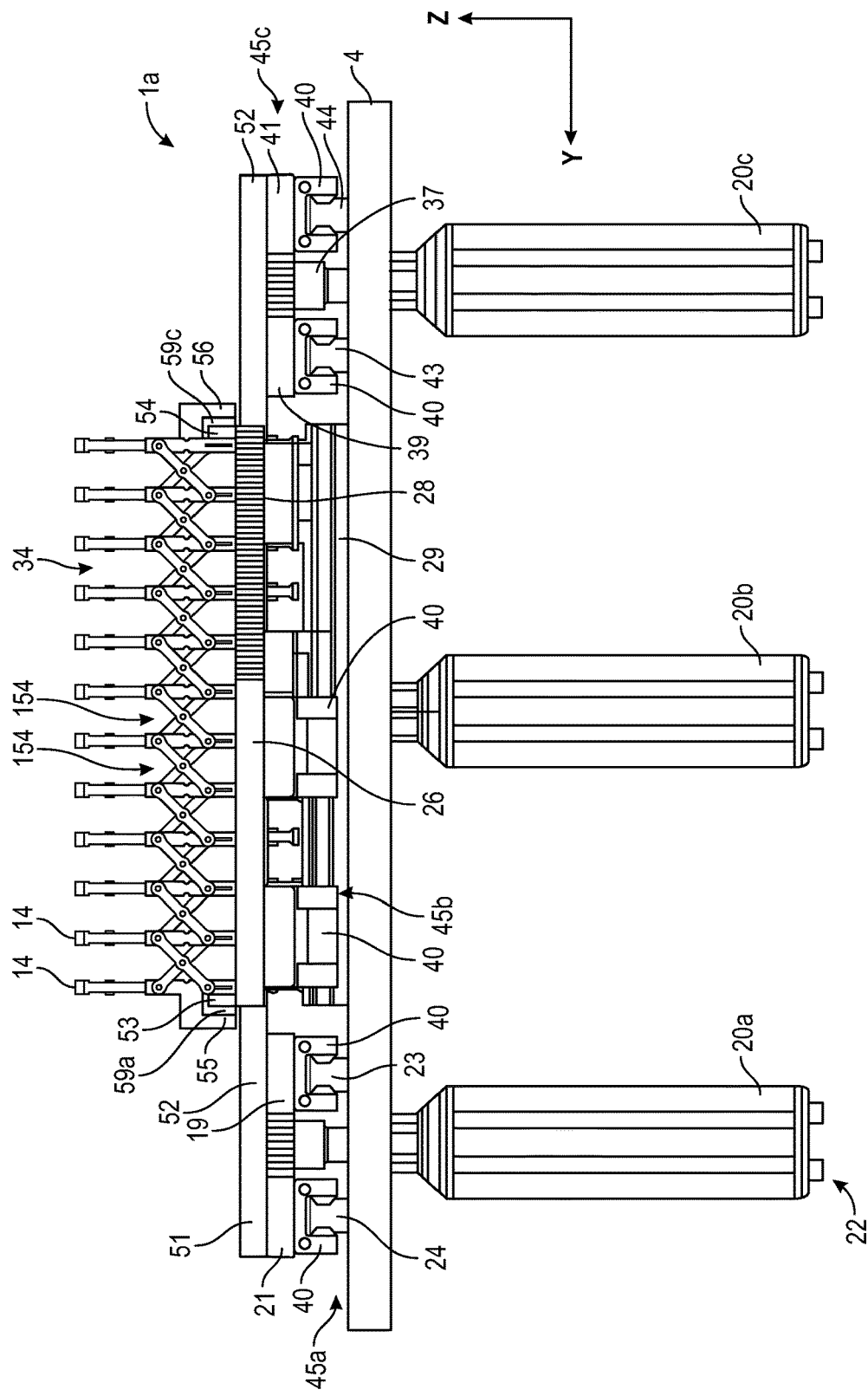
FIG. 13 is a side elevational view of the bottom half of the apparatus of FIG. 4 taken along the line 13-13 of FIG. 12.

In one embodiment, as shown in FIG. 12, a first x-push/pull bar 51 is disposed such that a longitudinal direction of the push/pull bar 51 extends in the y direction. The push/pull bar 51 is attached at a first end to the top of one end of the outer rack 21 of the first rack and pinion assembly 45*a* and is attached at its opposite second end to the top of an end of the inner rack 39 of the second rack and pinion assembly 45*c*, in each case by any suitable means such as an adhesive or one or more fasteners. The central portion of the bar 51 abuts a side, such as the left side in FIG. 12, of the bottom array 12 and is attached to such side of array 12 by at least one and in one embodiment a plurality of first y-guides 57 which are each connected to the bar 51 and to one of the creasing elements 14 of the array 12. As such, coordinated rotation of first and second actuators 20a and 20c in a counterclockwise direction in FIG. 12 result in coordinated movement of the racks 21 and 39 in the x direction so as to cause the first x-push/pull bar 51 to translate, push or move in the x direction and thus urge the left side of the bottom array 12 to the right. A second x-push/pull bar 52 similarly extends in the y direction and is attached at its first end to the top of one end of the inner rack 19 of the first rack and pinion assembly 45a and is attached at its opposite second end to the top of an end of the outer rack 41 of the second rack and pinion assembly 45c, in each case by any suitable means such as an adhesive or one or more fasteners. The central portion of the second x-push/pull bar 52 abuts a side, such as the right side in FIG. 12, of the bottom array 12 and is attached to such side of array 12 by at least one and in one embodiment a plurality of second y-guides 58 which are each connected to the bar 52 and to one of the creasing elements 14 of the array 12. Coordinated movement of the racks 19 and 41, resulting from the foregoing coordinated rotation of first and second actuators 20a and 20c in a counterclockwise direction in FIG. 12, causes the push/pull bar 52 to translate, push or move in the x direction thereby bringing, sweeping or urging the entire right side of the bottom array 12 to the left or first x-push/pull bar 51.

In a similar manner, a first y-push/pull bar 53 and a second y-push/pull bar 54 may be coupled to and extend between the rack and pinion assemblies 45b and 45d. More specifically, the first y-push/pull bar 53 is attached at a first end to the top of one end of the outer rack 26 of the third rack and pinion assembly 45b and is attached at its opposite second end to the top of an end of the inner rack 38 of the fourth rack and pinion assembly 45d, in each case by any suitable means such as an adhesive or one or more fasteners. The central portion of the bar 53 abuts a side, such as the front side in FIG. 12, of the bottom array 12 and is attached to such side of array 12 by at least one and in one embodiment a plurality of first x-guides 55 which are each connected to the bar 53 and to one of the creasing elements 14 of the array 12. As such, coordinated rotation of third and fourth actuators 20b and 20d in a counterclockwise direction in FIG. 12 result in coordinated movement of the racks 26 and 48 in the y direction so as to cause the first y-push/pull bar 53 to translate, push or move in the y direction and thus urge the front of the bottom array 12 to the rear. The second y-push/pull bar 54 similarly extends in the x direction and is attached at its first end to the top of one end of the inner rack 28 of the third rack and pinion assembly 45b and is attached at its opposite second end an end to the top of the outer rack 46 of the fourth rack and pinion assembly 45d, in each case by any suitable means such as an adhesive or one or more fasteners. The central portion of the second y-push/pull bar 54 abuts a side, such as the back side or rear in FIG. 12, of the bottom array 12 and is attached to such side of array 12 by at least one and in one embodiment a plurality of second x-guides 56 which are each connected to the bar 54 and to one of the creasing elements 14 of the array 12. Coordinated movement of the racks 28 and 46, resulting from the foregoing coordinated rotation of third and fourth actuators 20b and 20d in a counterclockwise direction in FIG. 12, causes the push/pull bar 54 to translate, push or move in the x direction thereby bringing, sweeping or urging the entire back side of the bottom array 12 towards the front or first y-push/pull bar 53. Third rack and pinion assembly 45b and fourth rack and pinion assembly 45d are positioned higher in the z plane relative to bottom plate 4, and first y-push/pull bar 53 and second y-push/pull bar 54 mounted to and extending between assemblies 45b and 45d are positioned higher that first x-push/pull bar 51 and second x-push/pull bar 52 so that the travel of the y-push/pull bars 53 and 54 does not interfere with the travel of the x-push/pull bars 51 and 52.

One or more guides coupled to the intermediate portions of the bottom array 12 may be provided for facilitating the uniform expansion and contraction of the bottom array 12 in the x and y directions. In one embodiment, a plurality of the first x-guides 55 may be slidably coupled to first y-push/pull bar 53 and a plurality of the second x-guides 56 may be slidably coupled to second y-push/pull bar 54. A first x-slide bar 59a can be provided on or mounted to the first y-push/pull bar 53 for slidably carrying the first x-guides 55, which can each be slidably coupled or carried by the first x-slide bar by any suitable means such as a bearing. Similarly, a second x-slide bar 59c can be provided on or mounted to the second y-push/pull bar 54 for slidably carrying the second x-guides 56, which can each be slidably coupled or carried by the second x-slide bar by any suitable means such as a bearing. Respective pairs of first x-guides 55 and second x-guides 56 can be secured to opposite ends of certain of the columns of creasing elements 14 of the bottom array 12. In this manner, one or more of the first x-guides 55 and second x-guides 56 may slide or travel over or on respective x-slide bars or rails 59a, 59c when the array 12 is contracted or expanded in the x direction. In one embodiment illustrated in the drawings and shown for example in FIG. 12, a pair of guides 55, 56 is respectively secured to the bottom and top of each of the left-most column of creasing elements 14, the right-most column of creasing elements 14, a left intermediate column of creasing elements 14 and a right intermediate column of creasing elements 14.

In a similar manner, a plurality of the first y-guides 57 may be slidably coupled to first x-push/pull bar 51 and a plurality of the second y-guides 58 may be slidably coupled to second x-push/pull bar 52. A first y-slide bar 59d can be provided on or mounted to the first x-push/pull bar 51 for slidably carrying the first y-guides 57, which can each be slidably coupled or carried by the first y-slide bar by any suitable means such as a bearing. Similarly, a second y-slide bar 59b can be provided on or mounted to the second x-push/pull bar 52 for slidably carrying the second y-guides 58, which can each be slidably coupled or carried by the second y-slide bar by any suitable means such as a bearing. Respective pairs of first y-guides 57 and second y-guides 58 can be secured to opposite ends of certain of the rows of creasing elements 14 of the bottom array 12. In this manner, one or more of the first y-guides 57 and second y-guides 58 may be adapted to slide or travel over or on respective y-slide bars or rails 59b, 59d when the array 12 is contracted or expanded in the y direction In one embodiment illustrated in the drawings and shown for example in FIG. 12, a pair of y-guides 57, 58 is respectively secured to the left and right of each of the top-most row of creasing elements 14 and the bottom-most row of creasing elements 14. The plurality of x-guides 55, 56 may extend relative to the y-push/pull bars in a first direction along the z axis, for example in an upward direction, for attaching to the respective creasing elements, while the plurality of y-guides 57, 58 may extend relative the x-push/pull bars in a second opposite direction along the z axis, for example a downward direction, for attaching to the respective creasing elements. In this manner, the x-guides and y-guides may slide along respective rails or slide-bars without interfering with each other. Interaction between the push/pull bars, guides and the creasing elements of the array will be described in further detail below.

As will be understood, during typical operation of the device, the pair of x-push/pull bars 51 and 52 generally move in a coordinated manner either towards each other or away from each other from the rotation of the first and second pinion gears 17, 37, respectively driven by first and second actuators 20a, 20c, which translate the respective sets of outer and inner racks 21, 29 and inner and outer rack 19, 41. That is, during normal operation of the device, either the left or first push/pull bar 51 will move to the right while the right or second push/pull bar 52 will move to the left applying a generally inward or compressive force to the opposite left and right sides of the array 12 in the x direction. After such partial or complete contraction of the bottom array 12, the left or first push/pull bar 51 will move to the left while the right or second push/pull bar 52 will move to the right applying a generally outward or tensile force to the opposite left and right sides of the array 12 in the x direction so as to pull the pull the creasing elements 14 apart thus expand the array 12. In a manner similar to the discussion with respect to x contraction and expansion of bottom array 12, coordinated movement of the racks 26, 24 and racks 28, 46, driven respectively by pinions 27, 47 and actuators 20b, 20d, may similarly drive or sweep the longitudinal push/pull bars 53 and 54 towards or away from each other such that they collapse or expand the bottom array 12 in the y direction. In one embodiment, such operation, as discussed below, results in either one-to-one contraction or one-to-one expansion of the creasing elements 14 in the bottom array 12 in both the x and y directions when viewed in plan, for example as illustrated in FIG. 12, and in one embodiment the movement of the array 12 in the x direction is coordinated with the movement of the array 12 in the y direction such that the contraction or expansion in the x direction is one-to-one with the contraction or expansion in the y direction. Guides 55-58 serve to secure the respective bars 53, 54, 51, 52 to the sides of the array, to facilitate even expansion and contraction of the array and to minimize unwanted movement or distortion of all or any portion of the array along the z axis. Although in the illustrated embodiment the rack and pinion assemblies 42, 45 are adapted to generate coordinated movement of respective pairs of push/pull bars, for example bars 51 and 52 move in unison and bar 53 and 54 move in unison, other actuation assemblies may be implemented to allow each individual push/pull bar to traverse its respective direction independently. For example, instead of rack and pinion gears, each individual push/pull bar may be coupled to a separate actuator, thus each push/pull bar may be individually driven to cause one or more of the sides of the arrays to move to a different extent than other sides of the array.

In one embodiment, top array 10 is substantially identical to bottom array 12, and the actuation assembly 22 for the top array 10 is substantially identical to the actuation assembly 22 for the bottom array 12. In one embodiment, first through fourth top actuators 18a-18d are substantially identical to respective first through fourth bottom actuators 20a-20d and are respectively coupled to first through fourth rack and pinion assemblies or other suitable gear mechanisms 42a-42d that are substantially identical to respective first through fourth bottom rack and pinion assemblies 45a-45d. In one embodiment, the top actuators 18a-d and rack and pinion assemblies 42a-d are aligned or registered opposite the respective bottom actuators 20a-d bottom rack and pinion assemblies 45a-d, as shown for example in FIG. 3. In one embodiment the top actuation assembly 22 further includes x and y push/pull bars and guides substantially identical to the x and y push/pull bars and guides discussed above with respect to the bottom array 12. The top actuation assembly 22 can operate with respect to the top array 10 in substantially the same manner as discussed above with respect to the operation of the bottom actuation assembly with respect to the bottom array 12. Like reference numerals have been used herein to describe and identify like components of top actuation assembly 22 and bottom actuation assembly 22.

Other form factors, assemblies or mechanisms for providing the desired horizontal motion of the arrays, for example along the x and y directions, may be used. In this regard, other assemblies or mechanisms, for example pulleys and drive belts, may be used in place of or in combination with gears for transmitting the motion generated by the power generation components, for example by actuators 20 or such other suitable pumps, motors or pistons, of the actuation assembly 22. In some embodiments for example, x and y actuation or movement of the bottom array 12 may be driven directly by one or more electrical motors such that the actuation assembly 22 does not include any gears, such as rack and pinion assemblies 42 and 45, or pulleys.

As can be observed in FIG. 2, the first or top array 10 and the second or bottom array 12 are disposed such that rows of respective creasing elements 13, 14 are aligned in the y axis, while as can be seen from FIG. 3 the top array 10 and the bottom array 12 are disposed such that top and bottom columns 31, 32 of respective creasing elements 13, 14 are not aligned in the x axis, as will be described in greater detail below. That is, as shown in FIG. 2, each of the plurality of first or top columns 31 of creasing elements 13 is offset to either the right or left of each of the plurality of second or bottom columns 32 of creasing elements 14. In one embodiment, the top array 10 has one less column 31 than the bottom array 12 (see FIG. 2). As shown in FIG. 3, each of the plurality of first or top rows 33 of creasing elements 13 is in line with each of the plurality of second or bottom rows 34 of creasing elements 14. In one embodiment, the number or rows 33 in the top array 10 is equal to the number of rows 34 in the bottom array 12. The creasing elements 13, 14 of each array 10, 12 may be regularly spaced relative to each other, such that the relative spacing between adjacent top columns 31 and between adjacent bottom columns 32, as well as the offset between adjacent top and bottom columns 31, 32 may be the same, that is equal spacing between columns, as well as equal offset distances between top and bottom columns, as shown in FIG. 2. Similarly, the relative spacing between adjacent top rows 33 may and between adjacent bottom rows 34 may be the equal.

In some examples, the columns of creasing elements of one of the arrays, for example the columns 31 of the first array 10, may be substantially centered between the columns of the other array, for example the columns 32 of the second array 12. In some examples, the creasing elements may not be regularly spaced in that some columns of creasing elements may be closer together than other columns of creasing elements and thereby the apparatus being operable to achieve different spacing between the resulting cells of the folded structures as will be further described and appreciated in view of the present disclosure. As can be observed in FIG. 3, at some stages of the operation of apparatus 1 respective rows 33, 34 of creasing elements are aligned in that a first or top row 33 of creasing elements 13 is in the same x-z plane as a corresponding second or bottom row 34 of creasing element 14. However, as each of the top and bottom creasing arrays 10, 12 have their own independent actuation assemblies 22, each of the top and bottom arrays 10, 12 can move, for example expand or contract, relative to each other and independent of each other in the x-y plane. Further, during certain stages of operation in some embodiments, the rows 33 of creasing elements or folding elements of the first array 10 may or may not be aligned with rows 34 of the creasing elements or folding elements of the second array 12. In addition, the independent actuation assemblies 22 permit the second array to expand or contract in the x direction independently of any expansion or contraction of the array in the y direction.

As discussed above, the apparatus 1 may include one or more controllers operatively coupled to the one or more of the actuation devices or assemblies 5 of apparatus 1, for example actuators 8, 18 and 20. The one or more controllers (not shown) may be programmable to translate, using the actuation assembly 22, the arrays 10, 12 of creasing elements 13, 14 according to a predetermined sequence of directions and steps to achieve the folding of the medium.

An exemplary foldable medium 60, and three dimensional support structure 61, which may be formed using the apparatus and methods disclosed herein, are now described with reference to FIGS. 5-10. Various three dimensional support structures can be formed using the systems and methods disclosed, examples of which are described in U.S. Pat. No. 7,762,938 to Gale, which patent is incorporated herein by this reference in its entirety for any purpose. In some examples, three dimensional structures may be formed by folding one or more sheets of a flexible material, for example folding medium 60, into a variety of patterns. The flexible material or medium 60 may be paper, or other cellulose products, metal, plastic, composite or other materials. The material 60 may be of varying grade and thickness, and may be selected from a variety of currently commercially available or later developed products based upon user preferences.

In some examples, a tessellation of generally rectangular folded regions, for example cells 63, is defined, as will be further described. However, in some examples, substantially any shapes or patterns can be achieved depending on the desired three dimensional support structure and particular implementation of individual creasing elements 13, 14 and arrays 10, 12 of creasing elements utilized. In some examples, the array or tessellation of cells may define a regular pattern, or in examples, the cells may be irregularly arranged. Some cells may have a different size than other cells within the same tessellation. For example, groups of narrow cells may be interspersed between groups of wider cells such that additional stiffness or rigidity is imparted to the folded structure in the regions where the narrow cells are located. Other variations will be appreciated in light of the present disclosure and may be implemented without departing from the scope of the present invention.

In some examples, the three-dimensional support structures 61, interchangeably referred to as folded structures herein, may be used in the manufacture and composition of packaging materials and other support structures, used for example in fuselages, wings, bulkheads, floor panels, construction panels, refrigerators, ceiling tiles, intermodal containers, and seismic walls. For example, the folded three-dimensional support structures of the present invention can be used in place of or in addition to conventional core materials, such as foam core or honeycomb core materials used in certain sandwich structures. However, other three dimensional structures for other applications can be implemented according to the present disclosure and additional advantages to the ones described will be appreciated in light of the present disclosure.

Figure 7:
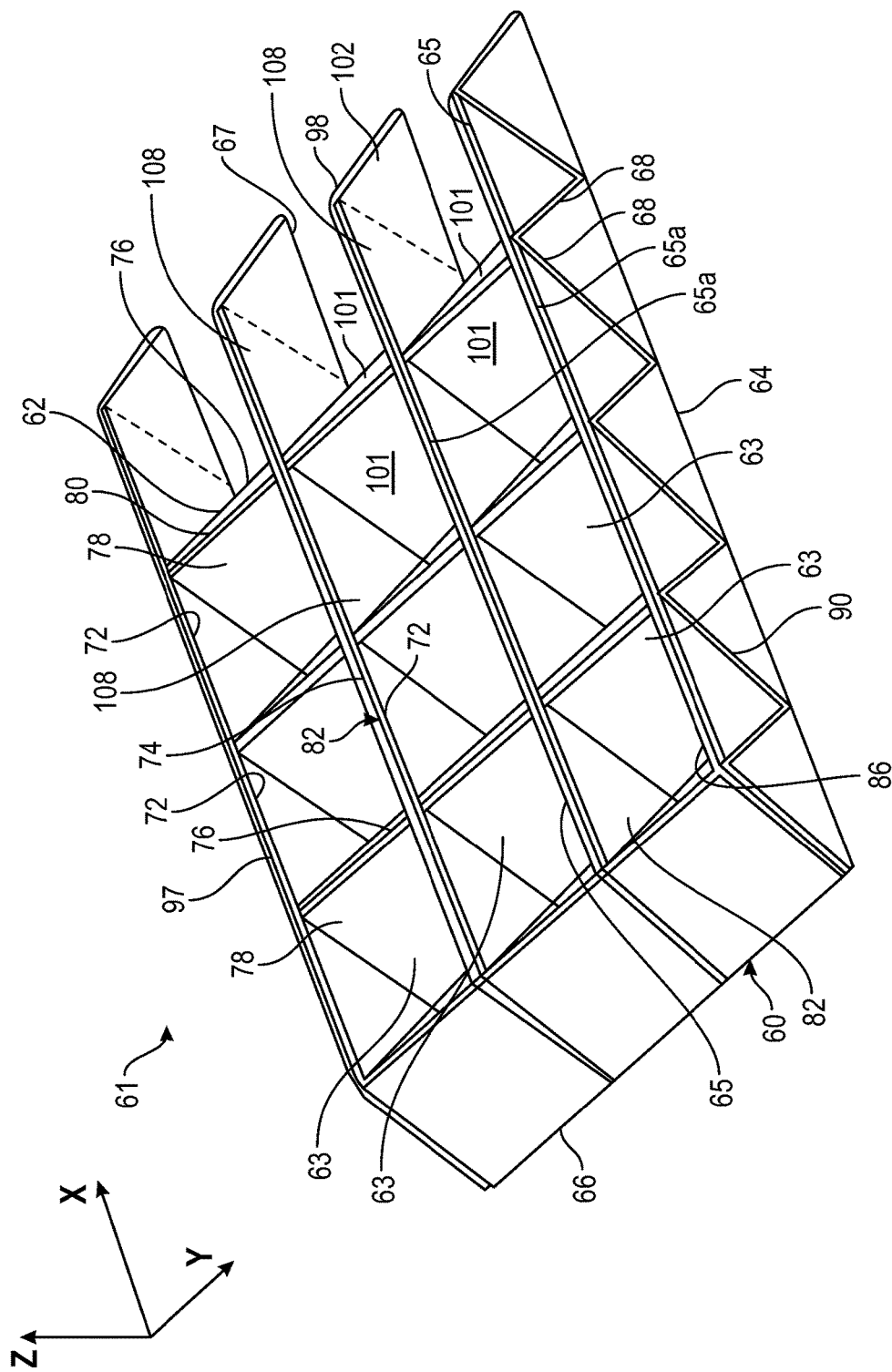
FIG. 7 is a perspective view of the sheet of material of FIG. 5 fully folded into the support structure.
Figure 8:
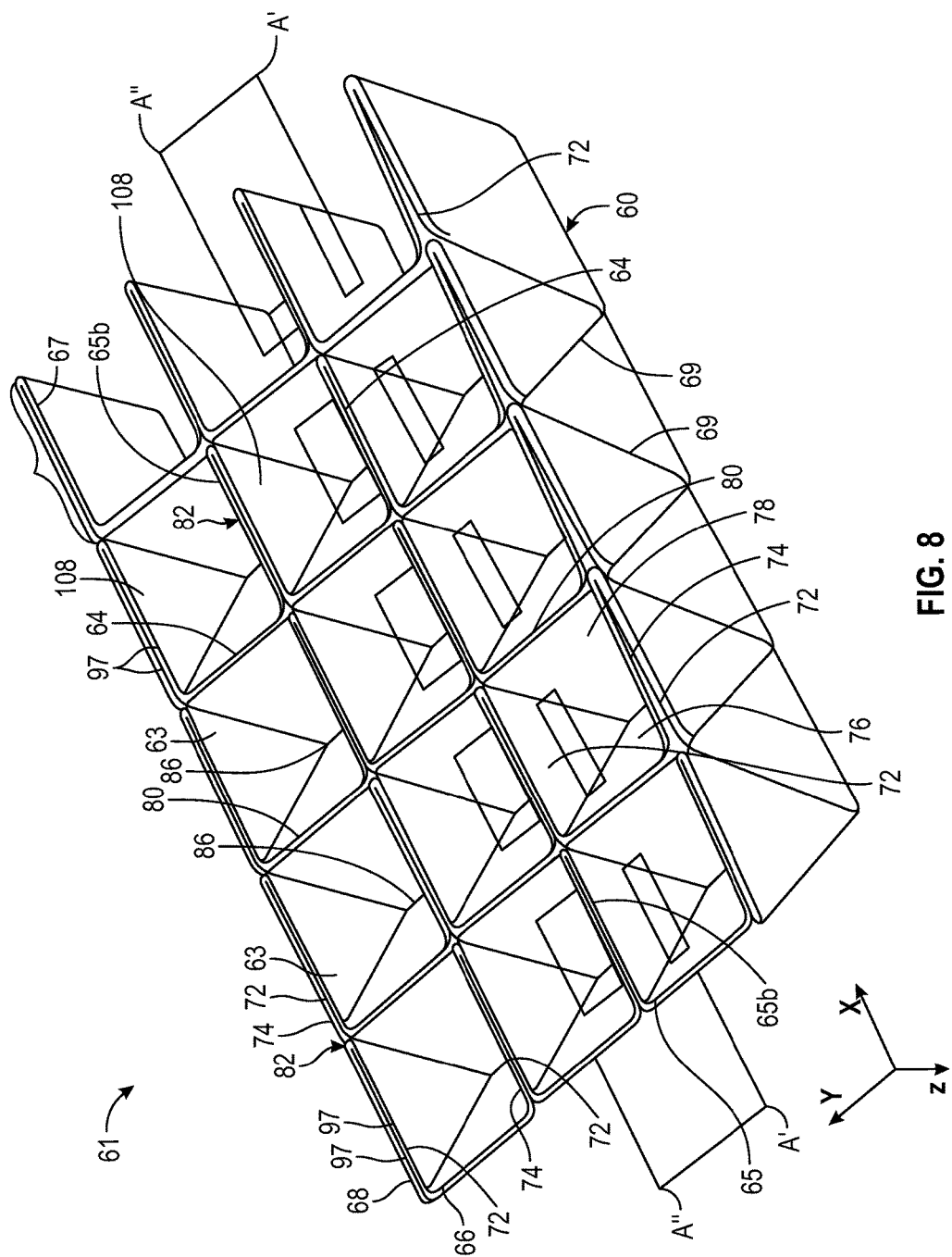
FIG. 8 is a perspective view of the support structure of FIG. 7 taken along the line 8-8 of FIG. 7.

As will be described in further detail below, the folded structures 61 according to the present disclosure may be formed by folding the folding medium 60 in multiple directions so as to form vertical structures in three planar orientations, namely, the x, y and z-axes. In some examples, the three-dimensional structures are formed from a single sheet of material or folding medium 60 which is folded into a repeating pattern of cells 63 when viewed both from a first side or top, as shown in FIG. 7, and from a second side or bottom, as shown in FIG. 8. Each of the cells 63 is formed by and includes first and second spaced-apart endwalls 72, 74 and first and second sloped sidewalls or facets 76, 78 spanning between the endwalls. In one embodiment, the first and second spaced-apart endwalls 72, 74 of the folded structure lie parallel to the x-z plane, while the first and second sloped sidewalls 76, 78 are disposed at an angle to the y-z plane and the x-z plane (see FIGS. 7 and 8).

Each of the endwalls 72, 74 includes at least two plies of the material 60 and each of the sidewalls 76, 78 includes at least a single ply of the material 60. In the embodiment of the folded structure 61 illustrated herein, each of the endwalls 72, 74 is formed of two plies of material 60 and each of the sidewalls 76, 78 is formed from a single ply of the material 60. First and second sidewalls 76, 78 of adjacent cells 63 are adjoined at a folded edge 80. The cells 63 are further aligned so that the first endwall 72 of one cell 63 from the repeating pattern abuts the second endwall 74 of an adjacent cell 63 from the repeating pattern to form at least a four-ply wall 82 of the material 60. When structure 61 is viewed from a first side, as shown in FIG. 7, the repeating cells 63 define a first surface 62 having a trough or valley 86 therein, and when the structure is viewed from an opposite second side, as shown in FIG. 8, the repeating cells 63 define a second surface 64 having a trough or valley 86 therein. The first and second surfaces 62, 64 are each planar and parallel to the x-y reference plane of the three dimensional structure 61 and to each other. The folding medium 60, when folded into the desired pattern of repeating cells 63, defines a pattern of rails 65, which may be used to support and/or for attachment of an optional first liner (not shown) on first surface 62 and an optional second liner (not shown) on second surface 64. That is, a first plurality of rails 65a is formed on the first surface 62 and a second plurality of rails 65b is formed on the second surface 64. The first and second plurality of rails 65a, 65b in combination with the respective folded edges 80 of such surfaces 62, 64 form first and second spaced-apart grid like patterns which lie in parallel x-y planes. Accordingly, one or more optional liners may be supported to and/or attached to the folded structure along the grid like patterns. Thus, one or more optional lines may be adapted to lie generally in-plane with the surfaces 62, 64, and parallel to the x-y reference plane.

Figure 6:
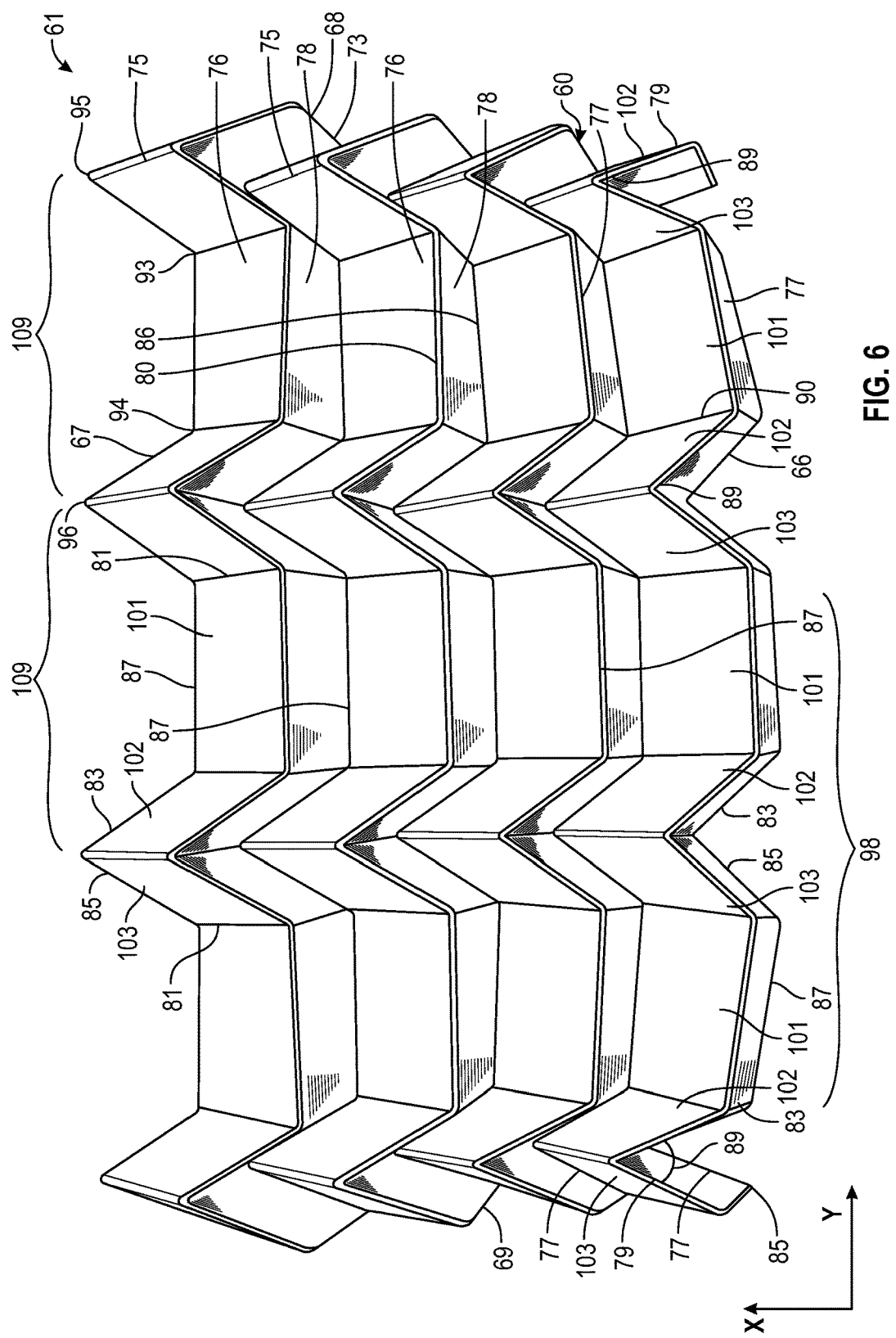
FIG. 6 is a perspective view of the sheet of material of FIG. 5 partially folded into the support structure.

In some examples, the pattern of repeating cells 63 includes the four-ply wall structure 82 as described above, and a repeating pattern of ascending facets or sloped sidewalls 78 and descending facets or sloped sidewalls 76 (see FIGS. 6-8). As depicted in FIG. 6 showing a partially folded medium and in FIGS. 7 and 8 showing a fully folded structure, the plurality of adjoining sloped sidewall 76, 78, when viewed along the y direction, alternate in a pattern of ascending and descending sloped sidewalls relative to the x-z plane. Adjacent ascending facet or sloped sidewall 78 and descending facet or sloped sidewall 76 form a plurality of apexes or peaks 80 and a plurality of troughs or recesses 86. Adjoining facets 76 and 78 meet at ridge or peak 80 to define the peak or top fold 80, and also meet at the bottom of trough or valley, to define the trough fold 86. The peak fold 80 on first surface 62 corresponds to the trough fold 86 on second surface 64, and the trough fold 86 on first surface 62 corresponds to the peak fold 80 on second surface 64. Similarly, the peak fold 80 on second surface 64 corresponds to the trough fold 86 on first surface 62, and the trough fold 86 on second surface 64 corresponds to the peak fold 80 on first surface 62.

The peak folds 80 and recess folds 86 are generally parallel to each other and are generally perpendicular to the rails 65. When structure is viewed from the first side, for example as in FIG. 7, the peak folds 80 extend in a first x-y plane and the recess folds extend in a second x-y plane. The rails 65 generally span along the x direction, while the orthogonal folds 80 and 86 generally span the y direction. The grid-like pattern defined by the rails 65 and orthogonal folds 80 may provide an increased surface area for supporting an object on the structure 61. Furthermore, the combination of four-ply wall structures 82 provided generally perpendicular to sloped facets 76, 78 of the folded structure may provide enhanced structural rigidity and stability of the folded structure 61 which may be advantageous when using said folded structures to support various objects thereon. A substantially similar pattern of peaks 80 and troughs 86, and a similarly repeating pattern of cells 63 is defined when viewing the structure 61 from the first side, as in FIG. 7, or the second side, as in FIG. 8. As will be appreciated, the effectively continuous rails 65 created by the plurality of four-ply walls 82 and folds 80 and 86 provide substantial strength and rigidity to the three dimensional structures 61 formed using the systems and methods described.

To aid in understanding of the folding methods and apparatus according to the present disclosure, a folding medium 60 will be described in further detail with reference to FIG. 5, which shows a plan view of an exemplary unfolded sheet of material or folding medium 60 for use in forming durable support structures according to examples described herein. To form the structure described above, the material 60 may be folded from a substantially flat, planar state. The medium 60 herein changes in three directions as it is folded from its planar, unfolded state shown in FIG. 5, into the three-dimensional form shown in FIGS. 7 and 8. Specifically, the medium 60 increases in height, that is along the z-axis, while decreasing in both length, that is along the y-axis, and in width, that is along the x-axis. The folding medium 60 may be provided as a generally rectangular sheet of material, or it may have any other desired shape such as circular, oval, trapezoidal, triangular, or other complex profiles as desired or as may be suitable for the particular application. The sheet of material 60 may include a first longitudinal edge 66, a second longitudinal edge 67, a first side edge 68, and a second side edge 69. The first longitudinal edge 66 and second longitudinal edge 67 extend between the first 68 and second 69 side edges together such edges 66-69 define the plan profile of the folding medium 60.

To facilitate the folding of the sheet of material or folding medium 60, a plurality of creases or fold lines 70 may be formed prior to or while the folding medium 60 is being folded. In one embodiment, the creases or fold lines 70 may be formed by scoring or otherwise weakening the foldable medium according to the desired pattern prior to the folding of the medium. For example, perforations, detents, or other features may be imparted along a predetermined pattern on one or both of the surfaces of the folding medium 60 before the folding process beings. In one embodiment, all of the fold lines 70 along which the medium will be folded may be pre-defined for example by scoring or perforating the medium 60 using a laser along a portion or all of such fold lines 70. In one embodiment, only some of such fold lines 70 are be pre-defined before the folding process and other such fold lines 70 are formed during the folding process. Any combinations of scoring or pre-forming the fold lines may be used as may be suitable for a particular folding material or application. In one embodiment, the unfolded medium 60 may contain a repeating pattern of scores or creases 70 which include a plurality of intersecting crease paths 71. As the folding medium 60 is being folded into a three dimensional structure, portions of the medium will displace upward relative to a reference plane of the unfolded medium, that is the x-y plane, while other portions will displace downward relative to the reference plane or remain in the reference plane. That is, the contour of the medium 60 when formed into a three dimensional structure 61 will include peaks and troughs defined along the plurality of creases or fold lines 70 as the respective portions of the medium 60 fold up and down relative to the plane of the unfolded material.

In broad terms, fold lines 70 of the folding medium 60 include a plurality of first crease paths 73, 75, as examples, extending parallel to each other and a plurality of second crease paths 77, 79 also extending parallel to each other and intersecting the first crease paths 73, 75. Each first crease path 73, 75 is formed from a plurality of first path segments 81. Each plurality of first path segments 81 associated with each one of the first crease path 73, 75 are generally aligned form a straight line along the x direction. As will be understood, the xyz reference frame referred to herein is used for the purposes of facilitating the description and relative arrangement of components and is not to be taken in a limiting sense.

Figure 5:
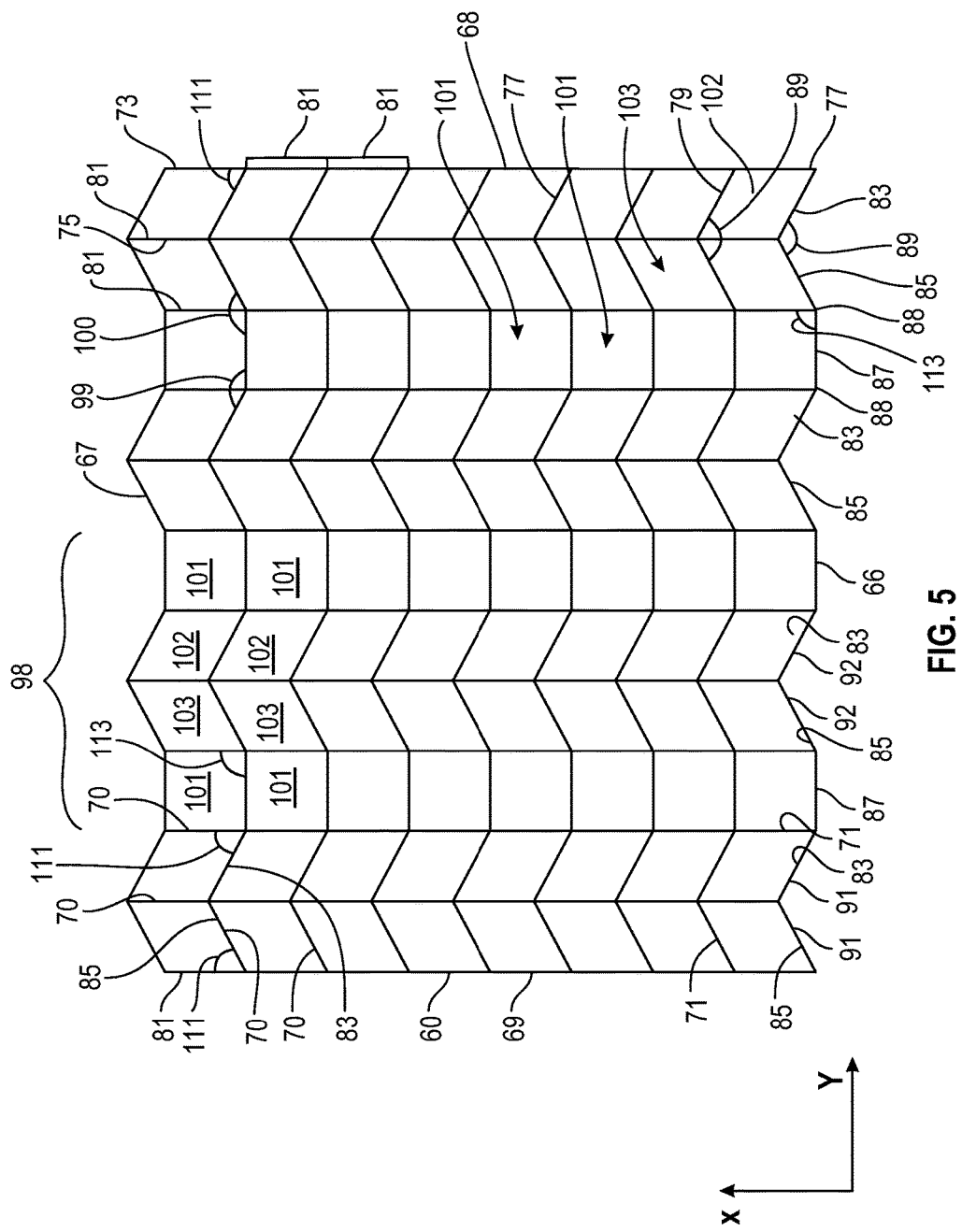
FIG. 5 is a plan view of an unfolded sheet of material for use in forming the support structure.

Each second crease path 77, 79 is formed from a repeating pattern of first and second chevron segments or angled legs 83, 85 and a straight line or leg 87 extending from a free end 88 of one of the first and second angled legs 83, 85, for example the free end 88 of the second chevron segment 85 shown in FIG. 5. That is, unlike the plurality of first crease path 73, 75, which follow a generally straight line, each of the second crease paths 77, 79 follows a path defined by adjoining angled legs 83, 85 and straight lines or legs 87. As will be understood, the term "legs" used to describe the imaginary fold lines or scoring pattern of the planar structure described herein is so designated for discussion purposes only and is not to be viewed in a limiting sense. Any similar or suitable designation would be acceptable for the purposes provided.

In one embodiment, the two angled legs or chevron segments 83, 85 may be equal in length and may form an angle of about 120°. That is, a first angle 89 defined by two adjoining angled legs 83, 85 may in some embodiments be equal to 120 degrees. Other angles may be used to provide different folding patterns or achieve different folded structures. In one embodiment, pairs of adjoining chevron legs or segments 83 and 85 have equal lengths, however in some embodiments some pairs may have different lengths. That is, a first pair 91 of chevron legs or segments may have a first length, while the next or second pair 92 of chevron legs, which is separated from the first pair 91 by a straight line segment 87 joined at one end to first pair 91 and at its other end to second pair 92, may have a second length which is different from the first length. Each of the legs 83, 85 in a pair of angled legs may generally have the same length, for example generally defining a top portion of an equilateral triangle.

A plurality of straight lines or legs 87 extend between non-adjoining ends of each chevron segments or angled legs 83, 85. The line 87 may be of any length. The length of line 87 may be the same as the length of the angled legs 83, 85, or it may be a length which is different than the length of such angled legs. Similarly, the first path segments 81 forming the first crease paths 73, 75 may be of any length as may be desired. The length of the segment 81 may be the same as any one of the lengths of lines 87, or angled legs 83, 85, or it may be a different length. As will be appreciated in light of the examples described, the length of segment 81 in combination with the angle of sloping facets 76, 78 may generally define the overall thickness, for example the height in the z axis, of the final folded three-dimensional structure 61.

As shown in FIG. 5, the plurality of second crease paths 77, 79 intersect the plurality of first crease paths 73, 75. The medium 60 is foldable along the first and second crease paths 73, 75, and 77, 79 to form three dimensional support structure 61 according to the present disclosure. One embodiment of the structure 61 formed from medium 60, shown unfolded in FIG. 5, is shown in a partially assembled state in FIG. 6 and in a fully folded state in FIGS. 7 and 8.

In one embodiment of the folding process of the present invention, and as shown in FIG. 6 for example, during an intermediate folding stage one of the plurality of second crease paths, 79 for example, is folded upwards, while the next of the plurality of second crease paths in the x direction, 79 for example, is folded downwards. This is repeated along the length of the side edges 68, 69 to form a pleating or accordion-like structure, as shown in FIG. 6. Due to the discontinuous nature of each of the second crease paths 77, 79, which as discussed above can be formed by a continuing sequence of first and second angled legs 83, 85 and a straight leg 87, the accordion-like pleating does not follow a straight line but instead follows a zigzagging path along the crease paths. This zigzagging of the second crease paths 77, 79, 79, as shown in FIGS. 5 and 6, further facilitates the folding of the medium 60 into a compact shape. While such a zigzagging pattern has certain advantages, such a configuration is not to be taken in a limiting sense and other configurations or folding patterns can be provided. In one embodiment, the folding medium may be generally rectangular, such that all four sides, for example the longitudinal edges 66, 67 and side edges 68, 69 comprise straight line segments. Creases or fold lines 70 may be defined on such a generally rectangular medium, without requiring that the medium be cut to any particular shape or have any particular perimeter profile, to provide the desired folding pattern.

Each second crease path 77 is foldable in an opposite direction from the adjacent second crease path 79. This results in the formation of an alternating pattern of ridges or peaks 80 and valleys or troughs 86 as the sheet of material or folding medium 60 is folded. For example, the lowermost second crease path 77 in FIG. 5 can serve as a trough 86 of the folded structure 61, when viewed from the first side such as in FIG. 7, and the adjacent second crease path 79 can serve as a peak or peak fold 80 when the structure 61 is so viewed from the first side. The next adjacent second crease path 77 in the x direction can serve as a trough 86 or valley fold 86. Each of the first crease paths 73, 75 are straight lines extending between the peaks 80 and troughs 86 of adjacent second crease paths 77, 79, and thus between the first and second longitudinal edges 66, 67 of the folding medium 60. Certain adjacent crease paths 73, 75 form a pattern of facets 76, 78 on a surface of the folded structure 61. At least some of the first crease paths 73, 75, and in one embodiment all of the crease paths 73, 75, follow a zigzagging pattern or sequential ascending and descending lines to form a plurality of alternating ascending and descending paths 90 that extend between first and second longitudinal edges 66, 67 and define the ascending and descending facets 76, 78 of the folded structure. A first plurality of adjacent first crease paths 93, 94, included in paths 90, connect the respective opposite ends of adjacent straight lines 87 and follow the ascending and descending contour of adjacent cells 63. Each facet 76, 76 is bounded by a portion of adjacent first crease paths 93, 94 and a pair of adjacent peak folds 80 and valley folds 86. A second plurality of the first crease paths 95, 96, included in paths 90, respectively connect the adjoined ends of a first pair of adjacent angled legs 83, 85 and the adjoined ends of a second pair of adjacent angled legs 83, 85, and each respectively fold into and become part of a pair of adjacent rail or wall 65 of the support structure 61.

In one embodiment, and as depicted in FIGS. 7 and 8, each portion 108 of rails 63 spanning between adjacent cells 63 of the folded structure may include at least a pair of two-ply segments 97, which form the end walls 72, 74 and thus the at least four-ply wall structure 82 between such adjacent cells 63. In one embodiment, each of the two-ply segments 97 may extend into the adjacent portion 108 of the rail 65, that is the portion 108 between the adjacent cells along the x axis, and thus sections of the rail 65 may comprise 8-ply structure. Other configurations may be achieved using different crease paths, for example varying the length of the first path segments 81, chevron segments 83, 85 and straight line or leg segment 87, as well as varying the angles between such segments, for example the angle 89 between adjoined chevron or angled leg segments 83, 85. In one embodiment, when the length of angled segments 83, 85 is greater than the length of line segment 87, the resulting rail 65 may include portions which have more than four plies. In one embodiment, some portions of the rail 65 may have fewer than four plies, for example two plies.

The folding process will be further described with reference to one of a plurality of regions 98 of the tessellated folding medium 60, illustrated in FIG. 6 and depicted in greater detail during stages of the folding process in FIGS. 9 and 10. As shown in a partially folded state in FIGS. 6 and 9, in one embodiment a portion of the folding medium 60 comprises a first leg or chevron segment 83 and a second leg or chevron segment 85 forming a first angled segment or chevron. The first leg 83 and second leg 85 are preferably of equivalent length. A first angle 89 exists between the first leg 83 and the second leg 85. The angle 89 preferably measures about 120° in the flat unfolded state. A third leg or straight line 87 extends from a free end 88 of the second leg 85 and another third leg 87 extends from a free end of the first leg 83. The length of third legs 87 may be of any length to accommodate manufacturing preferences, thus the third leg may be equal to, shorter or longer than the first and second legs 83, 85. The third leg 87 adjoining first chevron segment 83 extends at a second angle 99 from the first chevron segment 83 and the third leg 87 adjoining second chevron segment 85 extends at a third angle 100 from the second chevron segment 85. Each of the angles 99, 100 which may be approximately 150° in the flat unfolded state of the folding medium, illustrated for example in FIG. 5. In one embodiment, the angles 89, 99 and 100 may be different in size. In one embodiment, some or all of angles 88, 99 and 100 may be the same in size.

Figure 9:
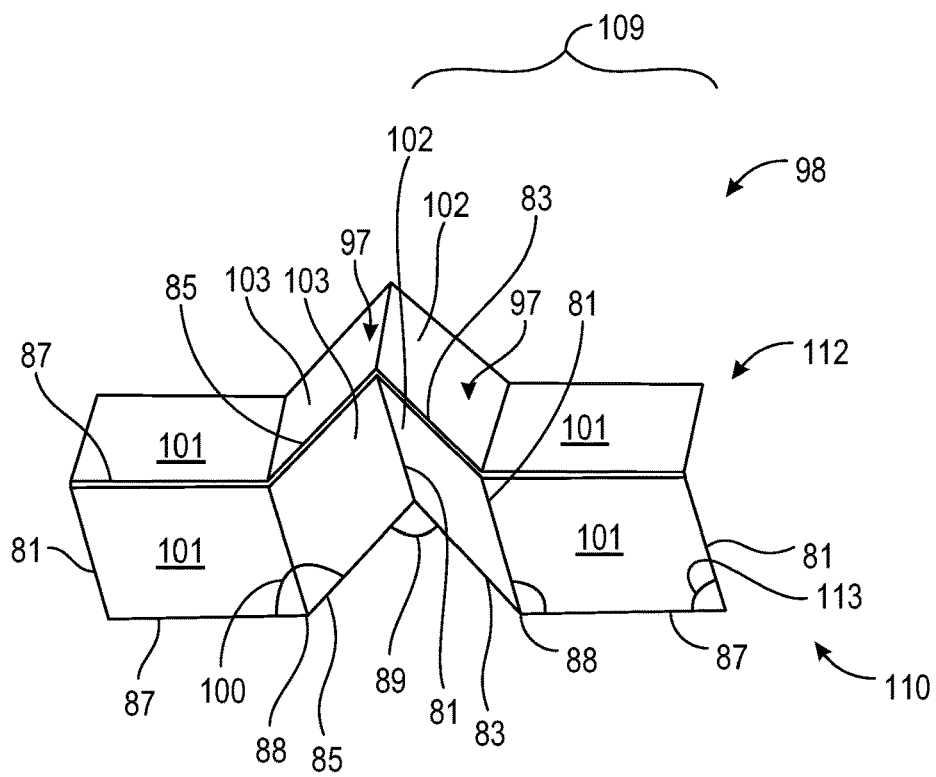
FIG. 9 is a perspective view of a portion of the sheet of material of FIG. 5 as partially folded in FIG. 6.
Figure 10:
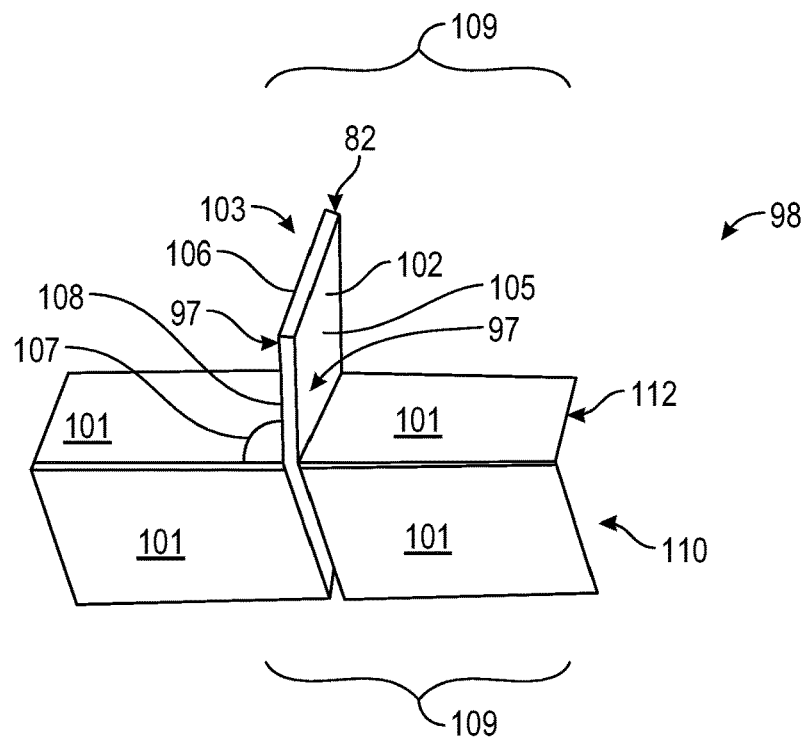
FIG. 10 is a perspective view of the portion of the sheet of material of FIG. 5 fully folded to form a portion of the support structure of FIG. 7.
Figure 11:
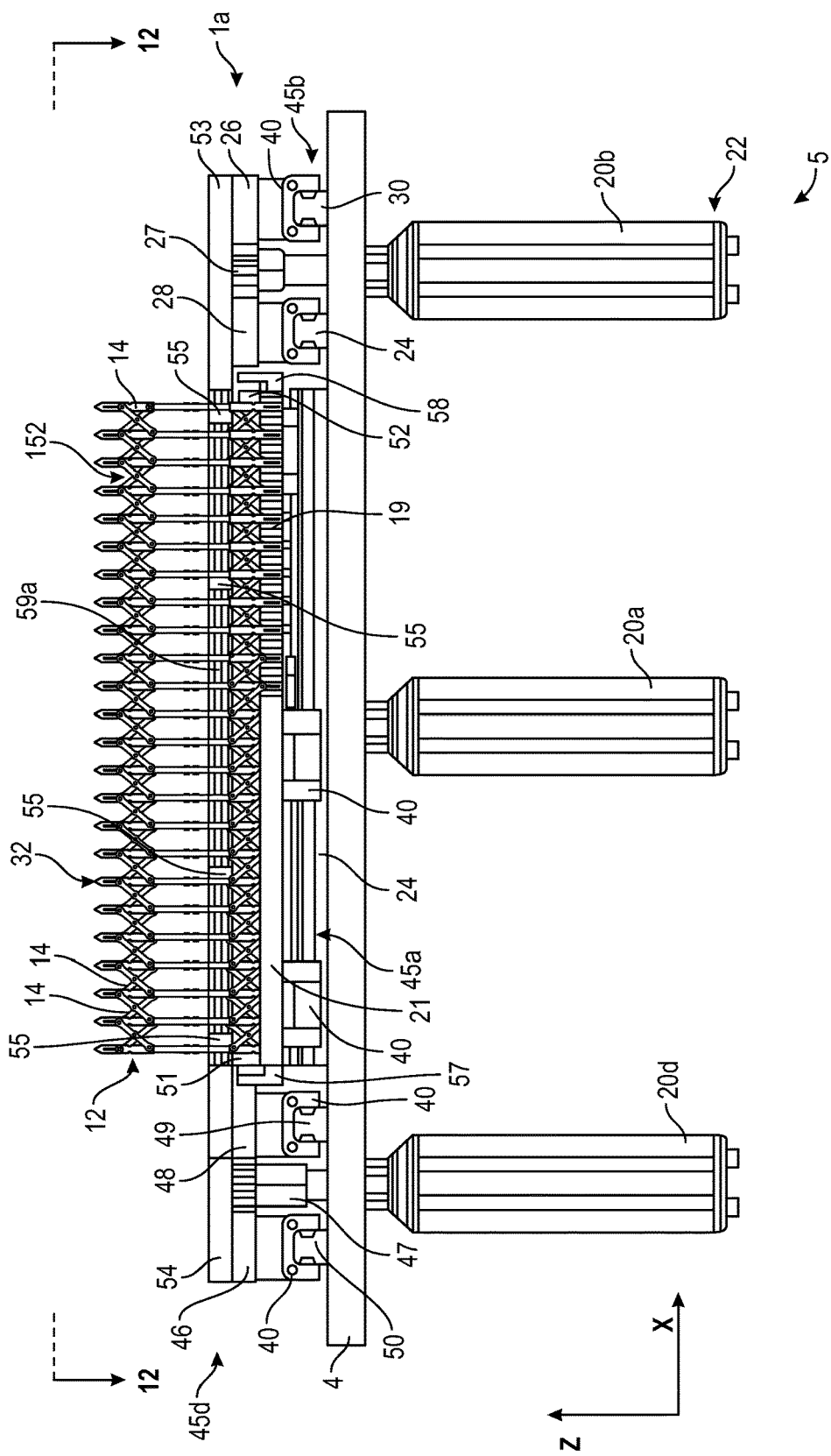
FIG. 11 is a front elevational view of the bottom half of the apparatus of FIG. 4 taken along the line 11-11 of FIG. 4.

A set of first segment or leg 83, second segment or leg 85 and one of the adjoining third segments or legs 87, for example the leg 87 adjoining first segment 83, define a repeating pattern 109 along the length of the first crease paths 77, 79, and thus the length of folded structure 91 (see FIGS. 6, 9 and 10). Each such repeating pattern 109 is connected by a plurality of first path segments 81 to an adjacent pattern 109 of adjoined legs 87, 83, 85, spaced apart along the x axis by such plurality of parallel first path segments 81, to define a repeating pattern of facets 101, 102, and 103 that extend along the length of folded structure 61. A fourth angle 111 is defined by the intersection of each first path segment 81 and the free end 88 of each first chevron segment 83, and a similar fourth angle 111 is defined by the intersection of each first path segment 81 and the free end 88 of each second chevron segment 85 (see FIG. 5). In one embodiment, the fourth angle 111 may be approximately 60 degrees in the flat unfolded state of the folding medium, illustrated for example in FIG. 5. In one embodiment, for example depending on the size of angles 89, 99, and 100, the fourth angle 111 may be other than 60 degrees. A fifth angle 113 is defined by the intersection of the straight horizontal line segment 87 and the adjoining vertical line segment 81, and may be approximately 90 degrees, as illustrated in FIG. 5. Angle 113 generally remains at 90 degrees when the structure 61 is fully folded, as illustrated with region 98 shown in FIG. 10. As the medium 60 is folded the angles 99 and 100 which may originally be obtuse angles may collapse or reduce to approximately 90 degrees, and angle 89 between adjoining angled legs 83, 85 which may originally be obtuse an obtuse angle may collapse or reduce to zero, in the fully folded structure 61 having the grid-like pattern or tessellation of cells 63.

In this manner, the repeating pattern of facets 101, 102 and 103, defined by various combinations of legs or segments 87, 83 and 85 as described above connected by a plurality of first path segments 81, repeat along both the y-axis and the x-axis (see FIGS. 5-6). Any number of repeating pattern of facets 101, 102 and 103 may be used to form the three-dimensional support structures herein. Preferably, the size of the three-dimensional support structure is defined by the number of facets 101, 102 and 103, the size of such facets, or the legs 87, 83 and 85 creating the facets, and the desired size of the support structure to be created by the folded tessellated medium. Adjacent pairs of the repeating pattern 109 of legs 87, 83 and 85 interconnected by a plurality of first path segments 81 spaced apart along the y axis define a repeating pattern of longitudinal regions or strips 110, 112 of the folding medium 60 which extend along both the length and width of the medium 60. When the medium 60 is folded, one or first region or strip 110 slopes upwards as it extending in the x direction and the adjacent second region or strip 112 slopes downwards as it extends in the x direction, as shown in FIG. 10, so as to provide a pleated or accordion-like portion of one embodiment of the folded support structure of the present invention.

As described herein, the scores or fold lines that can be preformed in the medium 60 for forming the legs or segments of the foldable medium, for example legs or segments 87, 83, 85, 81, serve to assist in folding the medium 60 into the support structure of the present invention. The fold lines depicted herein, for example in FIGS. 5 and 6, are provided for illustration purposes, and it is understood that in some embodiments no such preformed scores fold lines are present on the sheet of material. In this regard, folds can be formed during the folding process along at least some of the imaginary fold lines described above, for example along some or all of legs or segments 87, 83, 85, 81. As the medium 60 is folded, for example as shown in FIG. 6, the scores or fold lines cooperate to form a series of peaks 80 and valleys 86 in the medium 60 ultimately resulting in the repeating pattern of cells 63 described herein. In one embodiment, where scoring or other weakling of the material or foldable medium 60) is provided prior to the folding process, the scoring may be provided on one or both of the surfaces of the foldable medium 60. For example, scoring may be provided only on a top surface of the medium for a select set of the plurality of crease or fold lines 70, and scoring may be provided on the bottom surface of the medium for the remaining crease or fold lines 70. As will be appreciated, providing scoring selectively on the top or bottom surface of the material may guide the direction of folding, in that the medium may naturally fold in the direction of the weakened surface.

In one embodiment of the folding process of the invention, the foldable medium 60 may be folded in the desired pattern of cells 63 as follows. A pleating of the medium may be obtained by folding consecutive or adjacent second crease paths 77, 79 in alternating upward and downward directions. Simultaneously or at a different time, which may be prior to or after the pleating step, the medium may also be folded along first crease paths 73, 75. As the folding medium is folded, the angle 89 decreases in size until it becomes approximately zero degrees, at which point, a first endwall 72 of one cell abuts or lies adjacent to a second endwall 74 of the adjacent cell forming the four ply structure 82. The angles 99 defined by each straight line segment 87 and the adjoining angled leg 83 and the angles 100 defined by each such straight line segment 87 and the adjoining angled leg 85 both also decrease as the structure is folded, and in one embodiment of the structure 61 illustrated in FIGS. 7-8 is approximately 90 degrees. In the folded configuration, each of the segments 87 coincides with a peak fold 80 or valley fold 86. Accordingly, in the folded configuration, the resulting angles 107 between the segment 87 and each of the adjoining segments 83 and 85, which define the edges of the four ply wall structure 82, is approximately 90 degrees. In this manner, a repeating pattern of cells 63 is formed and may be arranged in a generally grid like or tessellated manner. As will be appreciated, the resulting folded structure has overall dimensions, for example length and width, which are less than the dimensions of the flattened unfolded medium. That is, as the three-dimensional structure is formed from a single sheet of material, the dimensions of the resulting product decrease along the x and y direction, while the dimension of the resulting product increases in the z direction, thus adding height to the structure.

Returning now to the exemplary apparatus and methods for forming the folded structures of the present invention, the relative positioning, actuation and operation of the top and bottom arrays 10, 12 of creasing elements 13, 14 will now be described. In the exemplary apparatus 1, each array 10, 12 includes a plurality of respective creasing elements 13, 14 arranged in respective columns 31, 33 and respective rows 32, 34 and configured to be moveable along the x direction and the y direction. In addition, one or both of arrays 10, 12 may also be moveable in the z or vertical direction 15. Relative motion of the arrays 10, 12 and of the individual respective creasing elements 13, 14 will be further described below with reference to an exemplary folding operation.

Figure 14:
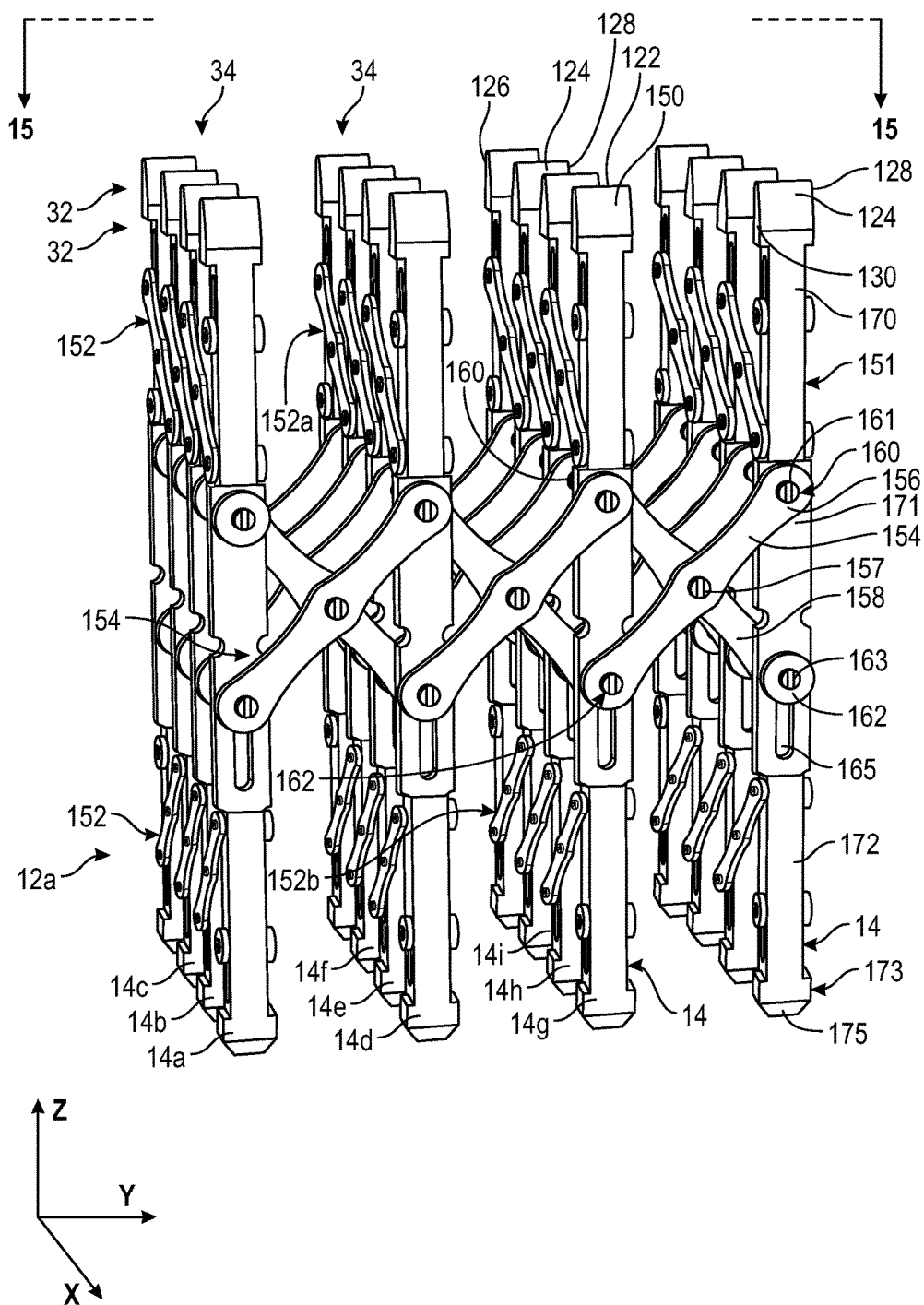
FIG. 14 is a side-perspective isometric view of a portion of an array of creasing elements of the bottom half of the apparatus of FIG. 4.
Figure 15:
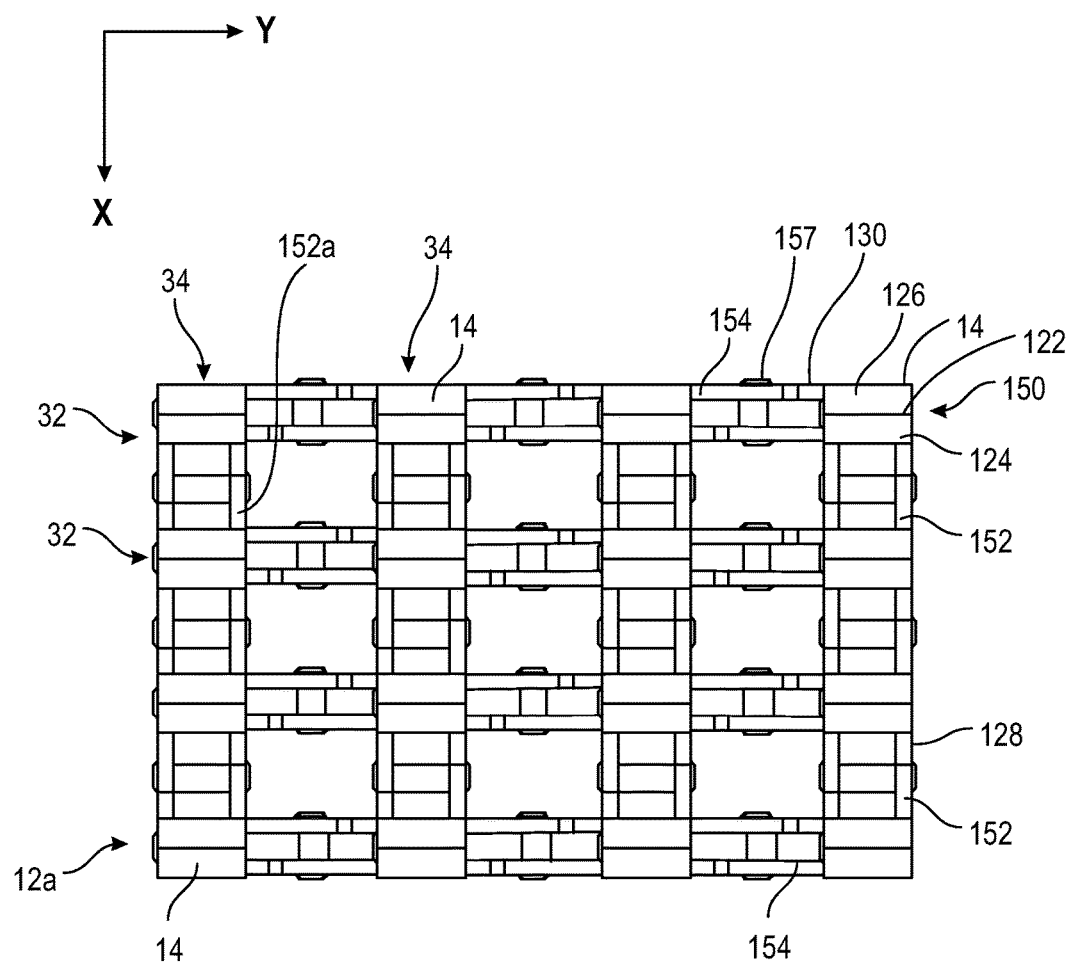
FIG. 15 is a top plan view of the portion of the array of creasing elements of FIG. 14 taken along the line 15-15 of FIG. 14.
Figure 16:
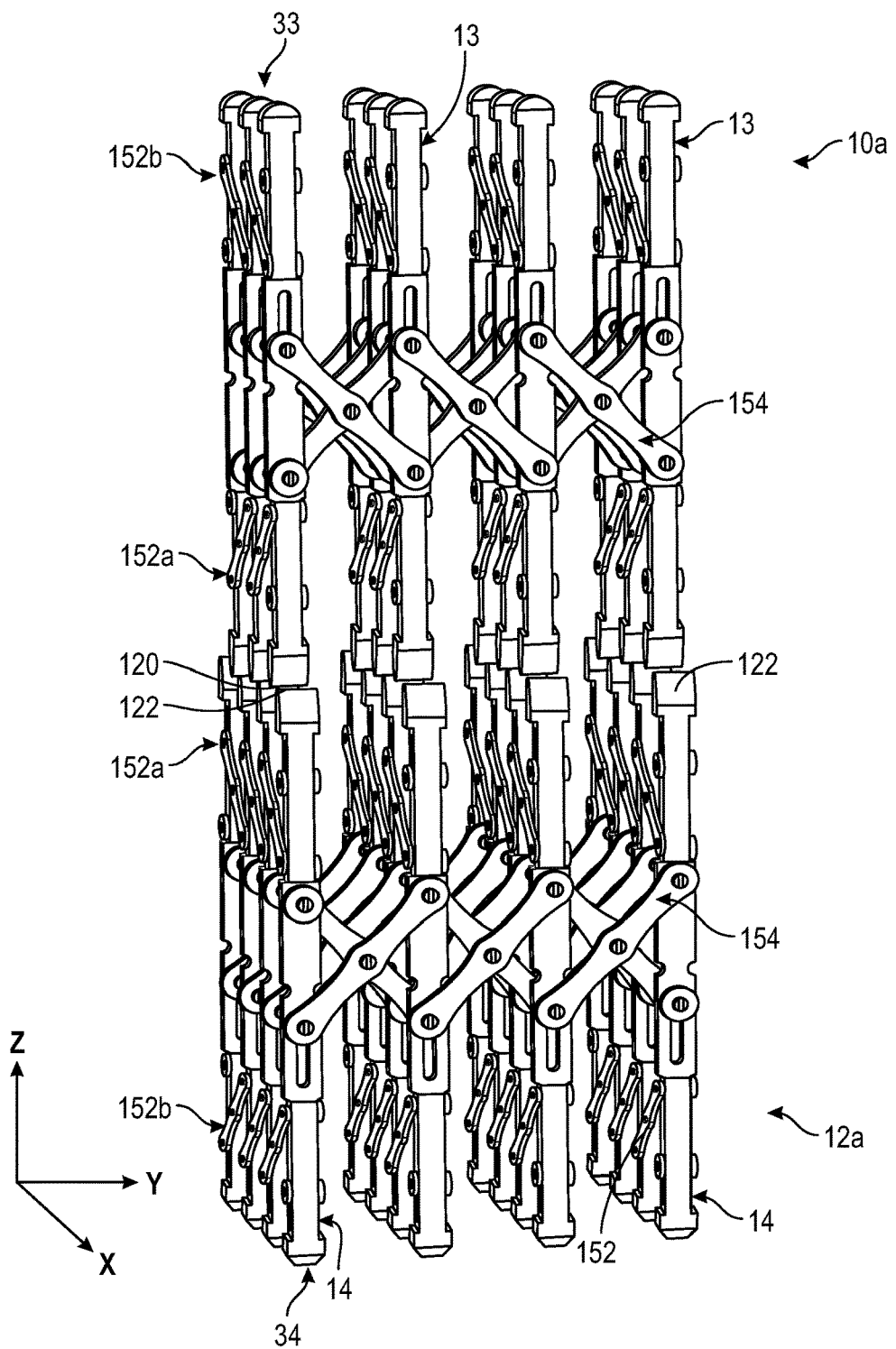
FIG. 16 is a side-perspective isometric view of portions of the first and second arrays of creasing elements of the apparatus of FIG. 1 in an opposed first position.

FIG. 14 shows a perspective view of a portion 12a of the second or bottom array 12, depicted in FIGS. 1-4, in a fully expanded or first position. A corresponding top portion 10a of the first or top array 10, in a fully expanded or first position, is shown along with the bottom portion 12a in FIGS. 16-17, 19-20. For clarity of illustration and simplification, only portions 10a, 12a of the arrays 10 and 12 are shown in FIGS. 14-17, 19-21, 23-24 and 28-30, however the exemplary arrangements depicted and described herein may apply to any size array according to the present disclosure, for example the full arrays 10, 12 shown in FIG. 1, or to arrays of any other size or arrangement selected as may be desired.

It is appreciated that some or all of creasing elements 13 of top array 10 can be substantially identical, and that some or all of creasing elements 14 of bottom array 12 can be substantially identical. In one embodiment, illustrated in the above figures, all of creasing elements 13, 14 are identical. Each individual creasing element 13, 14, which may also be referred to as a creasing member or a folding element or member, may be implemented as a generally elongate member, which may have a rectangular transverse cross section (see FIGS. 14-15). It is appreciated that some or all of the creasing elements may be configured to have substantially any transverse cross section, for example such creasing elements may be circular or oval in the transverse cross-section such that the creasing elements are generally shaped as rods or other cylindrical members. Other form factors may be used as desired for forming some or all of the creasing elements.

In one embodiment, each creasing element 13, 14 includes a first or top portion 150 and a second or body portion 151 (see FIG. 14 with respect to bottom array portion 12*a*). The top portion 150 may be shaped to have a leading edge 122 which is configured to engage or fold the foldable medium 60. The leading edge 122 may be shaped in any manner suitable to engage the sheet of material or folding medium 60 and facilitate the folding of the sheet of material. For example, the leading edge 122 may include a sharp or dull edge disposed at the top most end of the top portion 150. The leading edge may be continuous or segmented with one or more spaces therein so as be noncontinuous. The leading edge 122 may be provided with sharp puncture or scoring elements spaced along the edge for scoring the medium 60 along a fold line 70 or otherwise facilitating folding of the medium at the portion engaged by the leading edge. The leading edge 122 may be defined by two opposite sloping sides or faces 124, 126 of the top portion 150 inclined at any suitable angle relative to each other and sloping outwardly from and relative to leading edge 122 to accomplish the desired folding of the medium. In one embodiment the sloped sides 124, 126 are inclined at an angle of not greater than 90 degrees relative to each other, and in one embodiment the sloped sides 124, 126 are inclined at an acute angle, for example 60, 45 or 30 degrees, relative to each other. The leading edge 122 may be slightly rounded so as to prevent or minimize risk of tearing or otherwise damaging the material or medium 60 being folded. The sides or faces 128, 130 extending between the sloping sides 124, 126 may be generally parallel to each other, or they may be angled relative to one another, and in one embodiment extend at 90 degrees to the sides or faces 128, 130. As shown in FIG. 14 for example, the top portion 150 of an exemplary creasing element 14 is shaped to resemble a gable in that it has a generally triangular cross section in the x-z plane formed by sloping faces 124, 126 that are inclined relative to each other.

Body portion 151 of a creasing element can include a top, distal or upper section 170, a middle or central section 171 and a bottom, proximal or lower section 172, as shown in FIG. 14. The body portion 151 of each creasing element 13, 14 may be shaped and configured in any manner desired which accommodates coupling the body portion 151 of each creasing element of the respective array 10, 12 and which further accommodates coupling the array to the actuation assembly 5. In one embodiment, as discussed above, the creasing elements of each array are arranged in rows and columns such that each creasing element is adjacent to at least one and preferably a plurality of other creasing elements. For example in FIG. 14 with respect to bottom array 12, creasing element 14*e* is adjacent to and disposed between creasing elements 14*d*, 14*f* along the x direction and adjacent to and disposed between creasing elements 14*b*, 14*h* in the y direction.

Adjacent creasing elements can be connected together using suitable linking assemblies which can permit expansion and contraction of columns of creasing elements along the y axis and expansion and contraction of rows of creasing elements along the x axis. In one embodiment, the expansion and contraction of the creasing elements in the y axis is independent of the expansion and contraction of the creasing elements in the x axis. The linking assemblies may be configured such that all creasing elements in a row 33 or 34 of creasing elements are moveable together in a first direction, for example along the y axis, and all creasing elements in a column 31 or 32 of creasing elements are moveable together in a second direction, for example along the x axis. As such, the first direction and second direction can be orthogonal to each other. In one embodiment (not shown) of creasing element arrays substantially similar to arrays 10, 12, the linking assemblies may be implemented using x-guide rods and y-guide rods, where x-guide rods couple rows 34 of creasing elements together and y-guide rods couple columns 32 of creasing elements together, in each case to permit expansion and contraction of such creasing elements relative to each other. For example, a first x-guide rod may couple the creasing elements of a first row together such that the first row of creasing elements moves in unison in a first direction. A second x-guide rod may couple a second or adjacent row of creasing elements such that the all creasing elements in the second row move in unison in the first direction. In an exemplary orthogonal orientation in which the second direction is perpendicular to the first direction, a first y-guide rod may couple all of the creasing elements in a first column 31 or 32 together, and a second y-guide rod may couple all of the creasing elements in a second column 31 or 32 together. The y-guide rods may be disposed generally perpendicularly to the x-guide rods an as such create a matrix of rod elements when viewed in plan, that is in the x-y plane. Individual creasing elements may be provided at imaginary intersection points of the two rod elements. The x- and y-guide rods may be coupled to individual creasing elements such that each individual creasing element is able to move both in the x and y directions. For example, the x-guide rods may be provided in a first x-y plane, while the y-guide rods may be provided in a second x-y plane offset from the first x-y plane along the z axis. The plurality of parallel x-guide rods may be so offset along the z direction above or below the plurality of parallel y-guide rods such that the movement of the x-guide rods along the x direction does not interfere with the movement of the y-guide rods along the y direction.

In one embodiment, the linking assemblies, which may interchangeably be referred to herein as expandable linking assemblies or directionally expandable linking assemblies, may be implemented using y-travel scissor assemblies 154 and x-travel scissor assemblies 152 for respectively coupling together columns 31 or 32 of creasing elements and rows 33 or 34 of creasing elements. Each y-travel 154 and x-travel 152 scissor assembly, which can be made from any suitable material such as metal or plastic, includes a pair of scissor elements or links. For example, each y-travel scissor assembly 154 may include a first y-scissor link 156 and a second y-scissor link 158 (see FIG. 14). The first and second y-scissor links 156, 158 are pivotally coupled together using a pivot means or joint that can include for example an x-center pivot element or pin 157. Each y-scissor link 156, 158 has a y-first end 160 and a y-second end 162. In one embodiment, the y-first end 160 of each y-scissor link 156, 158 may be fixedly coupled to central section 171 of the body portion 151 of respective adjacent creasing element, for example by using a y-fixed pivot element or pin 161. In one embodiment, the y-first end 160 of first y-scissor link 156 is coupled to one side of its creasing element and the y-first end 160 of second y-scissor link 158 is coupled to the opposite other side of its creasing element. The y-second end 162 of each y-scissor link 156, 158 may be slidably coupled to central section 171 of the body portion 151 of the respective adjacent creasing element, for example using a y-moveable pin 163 slidably disposed in a y-slot 165 provided on the central section 171 and extending longitudinally in the z direction. In one embodiment, the slidable end 162 of each scissor link 156, 158 is below the pin 161 on the central section 171 but on the same side of the creasing element as the respective y-first end 160 of the link, however an alternate arrangement can be provided in which the slidable end 162 is provided above the fixed end 160. In one embodiment, the y-first end 160 of each y-scissor link 156, 158 may be slidably coupled to the respective adjacent creasing element 13, 14, and the y-second end 162 may be fixedly coupled to the respective adjacent creasing element. Furthermore, in the present example a single y-travel scissor assembly 154 is provided for coupling together each pair of adjacent creasing elements, however in one embodiment more than one, for example, two, three or more y-travel scissor assemblies may be included and similarly configured. Each y-scissor link 156, 158 is longitudinally sized to permit the desired separation between adjacent creasing elements coupled together by such links during expansion of the respective array 10, 12 in the y direction.

Figure 19:
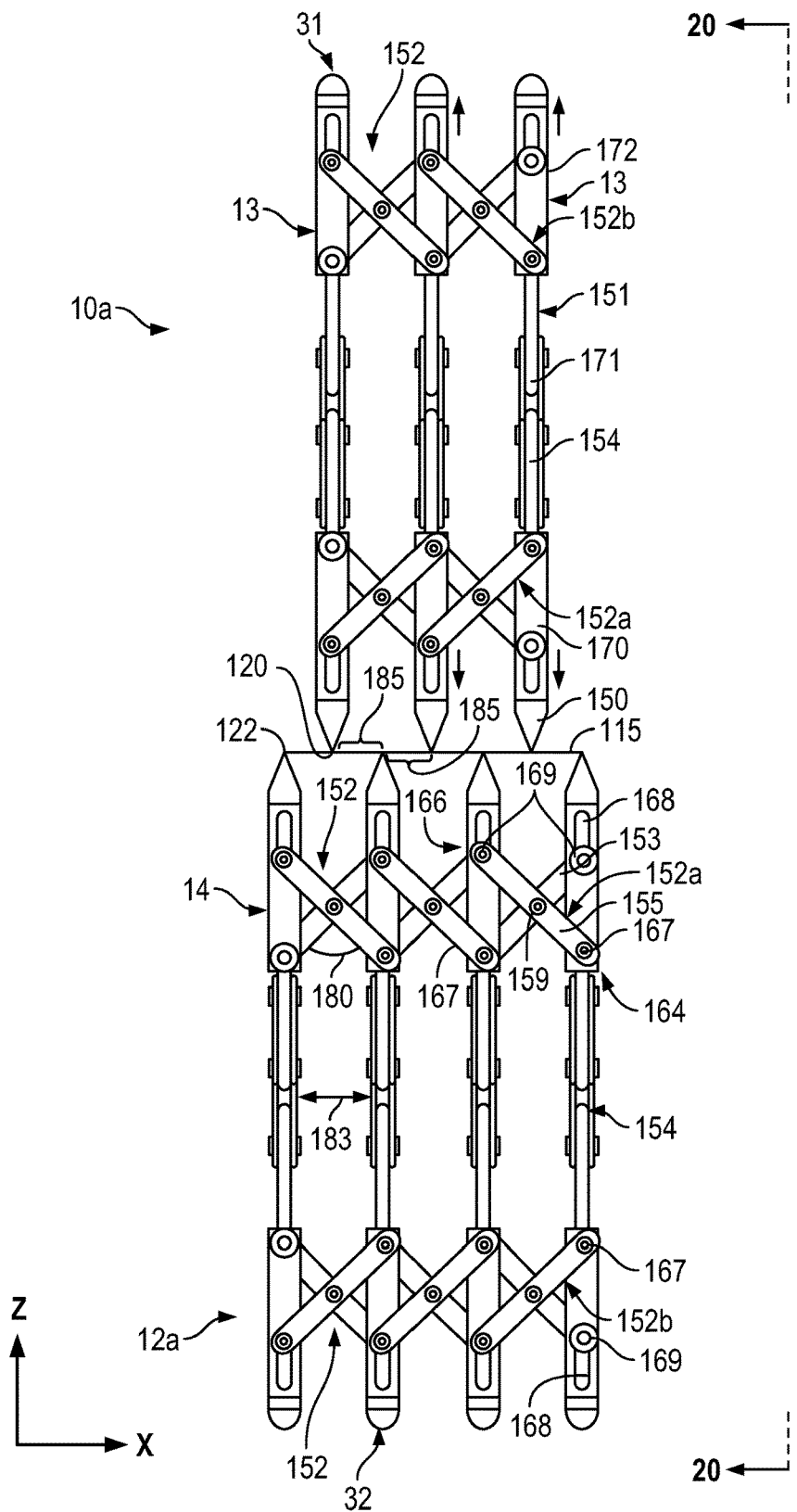
FIG. 19 is a front elevational view of the portion of the first and second arrays of creasing elements of FIG. 16 taken along the line 19-19 of FIG. 17.
Figure 20:
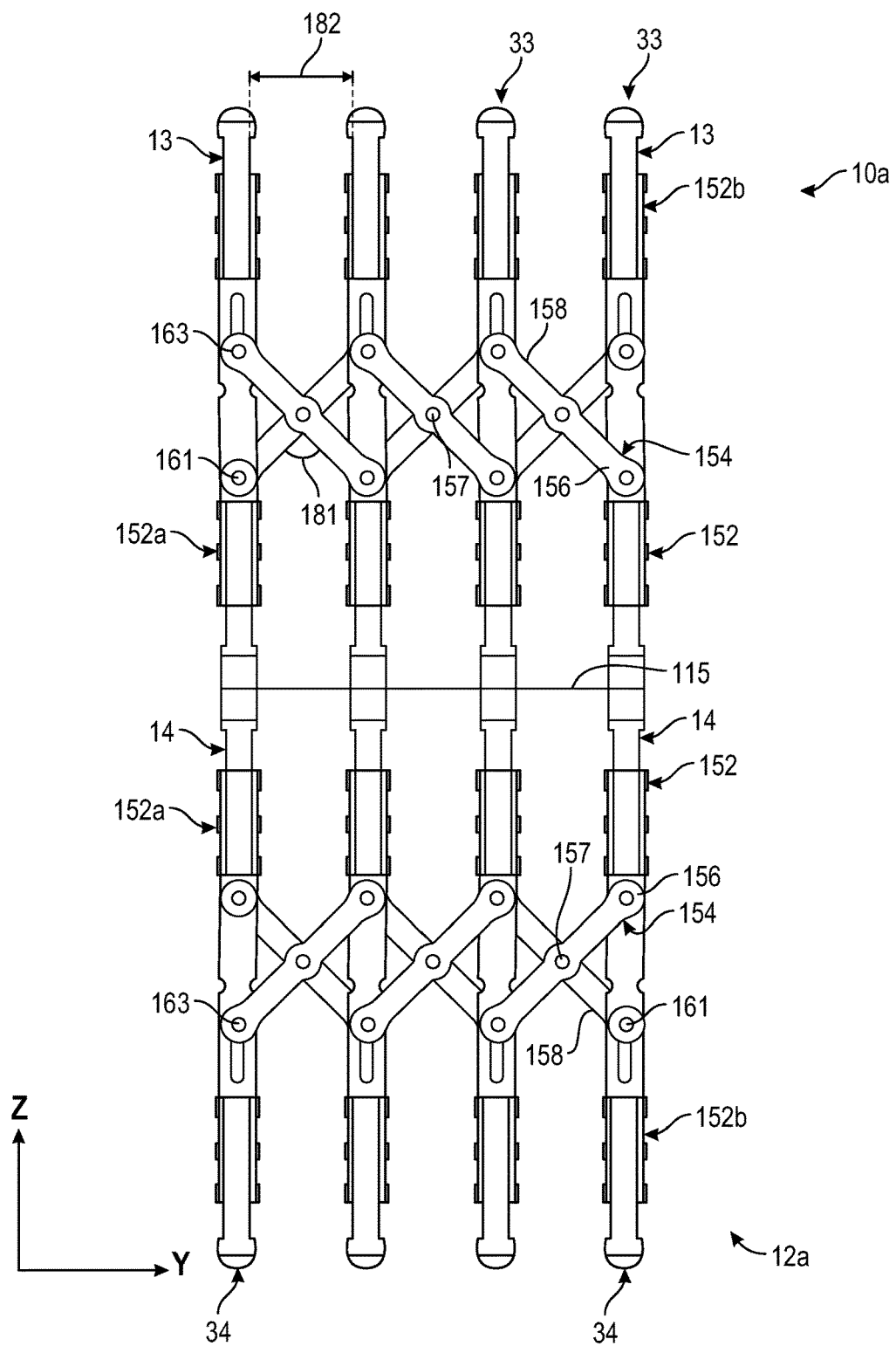
FIG. 20 is a side elevational view of the portion of the first and second arrays of creasing elements of FIG. 16 taken along the line 20-20 of FIG. 19.

In a similar manner, each x-travel scissor assembly 152 may include a first x-scissor link 153 and a second x-scissor link 155 (see FIG. 19). Similar to the y-travel scissor links 156, 158, each x-travel scissor link 153, 155 has a x-first end 164 and a x-second end 166. In one embodiment, the x-first end 164 may be coupled to the body portion 151 using a x-fixed pin 167. In one embodiment, the x-first end 164 of first x-scissor link 153 is coupled to one side of its creasing element and the x-first end 164 of second y-scissor link 155 is coupled to the opposite other side of its creasing element. The x-second end 166 of the x-scissor links may be moveably or slidably coupled to the body portion 151 using a x-moveable pin 169 extending through a x-slot 168 provided in the body portion 151 and extending longitudinally in the z direction on the body portion 151. The x-second end 166 of each link 153,155 is slidable coupled to the respective body portion 151 on the same side of the creasing element as the respective x-first end 164 of the link. The first x-scissor link 153 and second x-scissor link 155 may be pivotally coupled to each other using a x-center pin 159. Each x-scissor link 153, 155 is longitudinally sized to permit the desired separation between adjacent creasing elements coupled together by such links during expansion of the respective array 10, 12 in the x direction. In one embodiment, the y-scissor links 156, 158 are longer than the x-scissor links 153, 155 to permit greater expansion of the arrays 10, 12 in the y direction than in the x direction. In the present example, first and second x-travel scissor assemblies are utilized for coupling together each adjacent pair of creasing elements in the x-z plane. First x-travel assembly 152a is coupled to distal or upper section 170 of each adjacent creasing element, above y-travel scissor assemblies 154, and second x-travel assembly 152b is coupled to proximal or lower section 172 of each adjacent creasing element, below y-travel scissor assemblies 154. It is appreciated that any number of x-travel scissor assemblies may be provided. In one embodiment, a single-travel scissor assembly may be used for coupling together each pair of adjacent creasing elements. Further, it is appreciated that any arrangement of the scissor assemblies 152, 154 on the creasing elements, different from the arrangements discussed above, can be provided.

The pivotal joints 159 in combination with the moveable or slidable coupling between at least one end 166 of the x-scissor links 153, 155 and a respective portion of the adjacent creasing elements 13, 14 allow the relative angle 180 between such scissor elements or links 153, 155 to change (see FIG. 19). The change in angle 180 causes the distance 183 along the x-axis between adjacent creasing elements 13, 14 to decrease or increase. Similarly, the pivotal joints 157 in combination with the moveable or slidable coupling between at least one end 162 of the y-scissor links 156, 158 and a respective portion of the adjacent creasing elements 13, 14 allow the relative angle 181 between such scissor elements or links 156, 158 to change (see FIG. 20). The change in angle 181 causes the distance 182 along the y-axis between adjacent creasing elements 13, 14 to decrease or increase. In this manner, the linking assemblies, for example scissor assemblies 152, 154 facilitate expansion and collapsing or contraction of the arrays 10, 12 of creasing elements during the folding process.

The creasing elements 13, 14 can be made from any suitable material such as metal, plastic or a ceramic material, and in one embodiment can be made from a rigid such material. Not all of the creasing elements need be made from the same material, for example some creasing elements can be made from a rigid plastic, some other creasing elements can be made from metal and some other creasing elements can be made from a ceramic material. In one embodiment, the top 150 and body 151 portions of each creasing element 13, 14 may be formed as a single unitary structure, for example a monolithic component fabricated in one piece by molding or machining, as examples. In one embodiment, each creasing element may comprise a plurality of individual sub-components which are assembled to form the creasing element and assembled into each of the arrays 10, 12 of creasing elements.

In one embodiment, an end portion 173 of the bottom section 172 of a creasing element 13, 14 may be provided with a sliding contact surface or bearing 175. In one embodiment, the end portions 173 may be sufficiently spaced apart from and above the platforms 4, 6 such that the end portions 173 do not contact the platform at any time or during operation of the actuation or creasing assemblies 5, 7. In such an embodiment, the arrays of creasing elements may be generally described as floating above the platforms 4 and 6. Additional rigidity and force may be obtained by allowing the imaginary bottom surfaces of each array 10, 12 to contact the respective platforms 6, 4. In this regard, the end portion 173 of each creasing element 13, 14 may be lubricated and/or coated with a slip agent, or other low frictional material, for example a polymer. The end portion 173 may be fabricated using a material having a low coefficient of friction, or the end portion 173 may be otherwise configured for sliding and/or bearing contact with the platforms, for example by using roller bearings or other conventional low frictional bearing mechanisms. Various sliding or pivoting joints, such as the pivotal joints 157, 159, fixed pins 161, 167 and sliding pins 163, 169 as well as surface of sliding contacts, for example surfaces of slots 165, 168 adapted for receiving the sliding pins 163 and 169, may also be lubricated, coated with or otherwise manufactured from materials which provide low frictional resistance and minimize wear of such sliding components.

The specific embodiments of linking assemblies or expandable linking assemblies described above, including rod elements and scissor assemblies 152, 154, are just two examples of the various implementations of interlinking of creasing elements that are possible according to the present disclosure. It is appreciated that other variations are possible which accomplish the desired linking of creasing elements such that all creasing elements in a given row 33, 34 of creasing elements may be moveable in unison in a first direction, and all creasing elements in a given column 31, 32 of creasing elements may be moveable in unison in a second direction. In one embodiment, individual actuation of each creasing element 13, 14 may also be provided if desired, and one or more controllers may be configured to create the coordinated movement of creasing elements 13, 14. For example, using a desired timing sequence, the plurality of push/pull bars 51-54 working in conjunction with the compliant linking assemblies, for example x-travel scissor assemblies 152 and y-travel scissor assemblies 154, may operate to cause the arrays 10, 12 to collapse or contract along the x and y directions thereby forming folded structures 61 according to the present invention (see FIGS. 12, 25-27).

Figure 17:
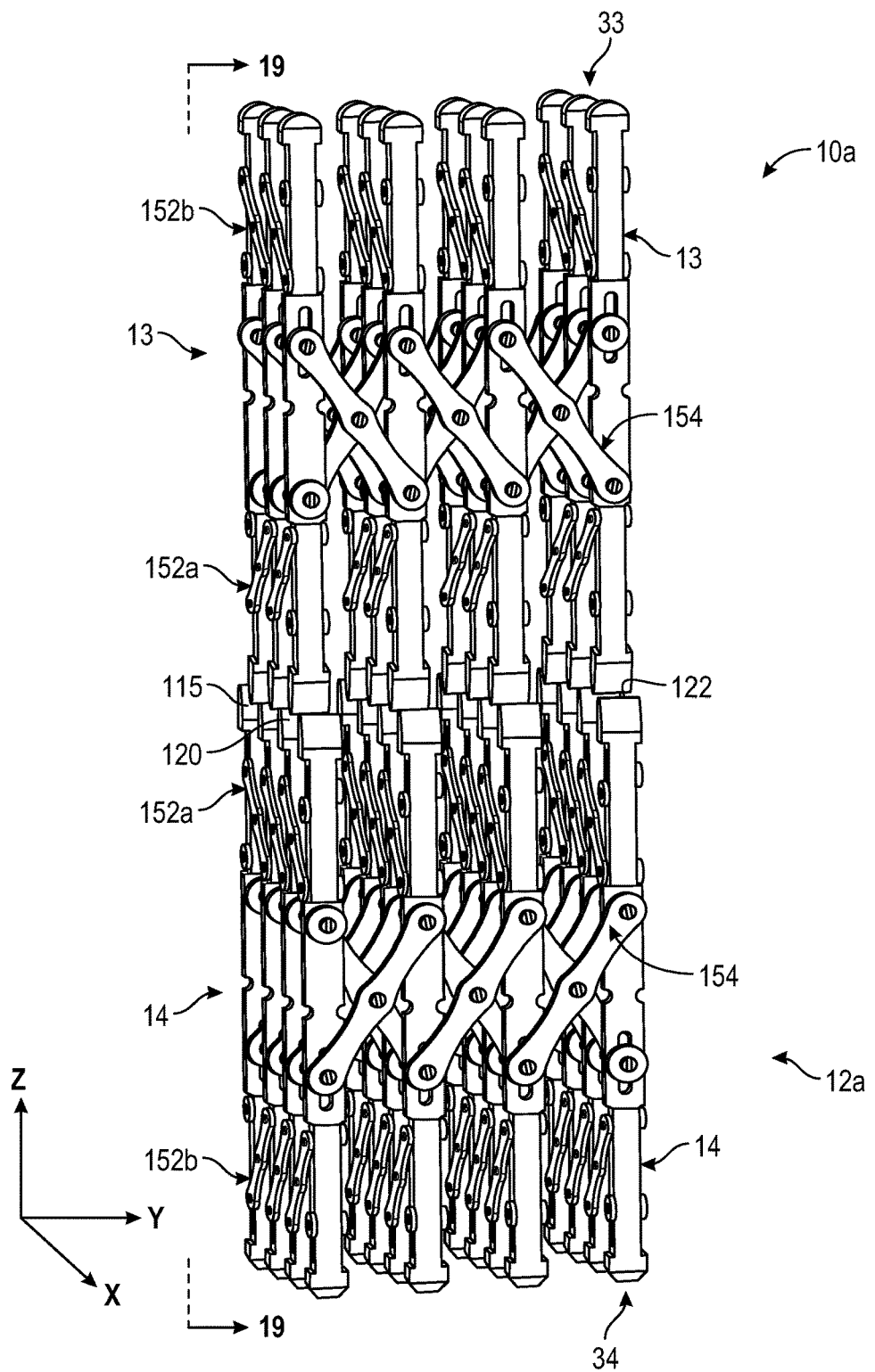
FIG. 17 is a side-perspective isometric view, similar to FIG. 16, of portions of the first and second arrays of creasing elements of FIG. 16 in an opposed position with an unfolded sheet of material disposed therebetween.
Figure 18:
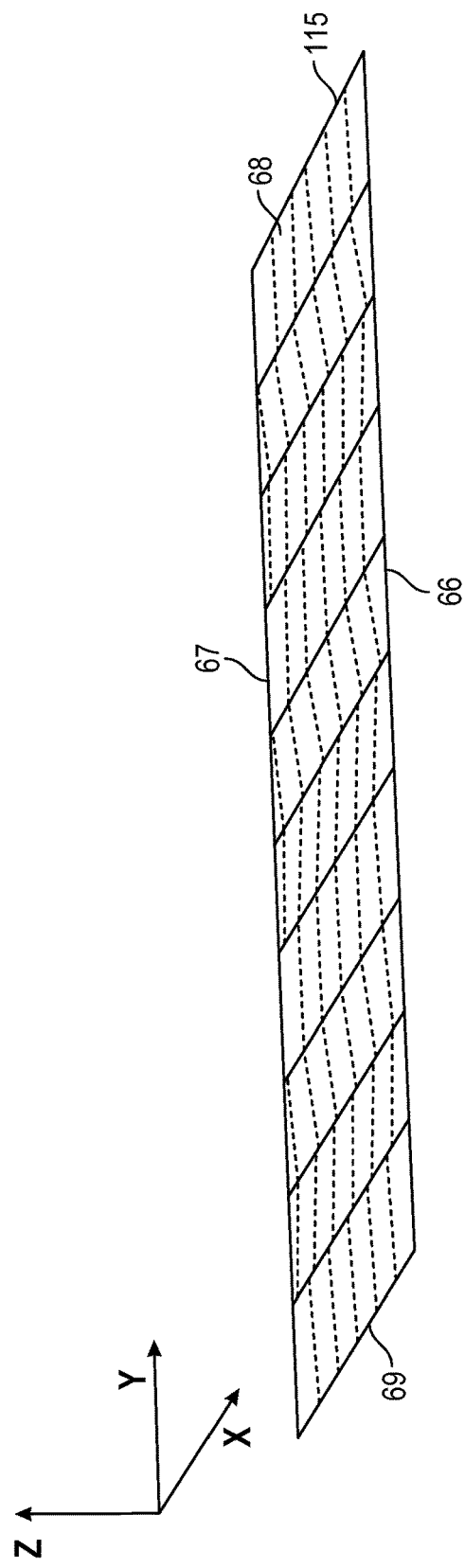
FIG. 18 is a somewhat schematic, isometric view of the unfolded sheet of material of FIG. 5.

An exemplary folding operation will now be further described with reference to FIGS. 16-31 to further illustrate the methods and apparatus of the present invention. Although some of such figures include only portions 10a, 12a of top and bottom arrays 10, 12, the discussion herein is applicable to the entire arrays 10, 12 and thus will reference the entire arrays 10, 12 illustrated in FIG. 1 and other figures herein. Initially, a sheet of material 115, which may be configured as folding medium 60 and have a similar pattern of imaginary fold or crease lines as described above, may be placed between first or top leading edges 120 of the first or top creasing elements 13 of the first array 10 and second or bottom leading edges 122 of the second or bottom creasing elements 14 of the second array 12, as shown in FIG. 17.

In one embodiment, the first array 10 and the second array 12 are initially in a first relative position in which the respective individual creasing elements 13, 14 are not interdigitated with each other. Instead, the plane defined by the leading edges 120 of the creasing elements 13 of the first array 10 is generally in the same plane or spaced away from the plane defined by the leading edges 122 of the creasing elements 14 of the second array 12 (see FIGS. 16 and 17). In one embodiment, the first array 10 and the second array 12 may be spaced apart from each other and the sheet of material 115 may be inserted or placed on the leading edges 122 of the creasing elements 14 of the bottom array 12, and subsequently the first or top array 10 may be actuated downwardly to cause the leading edges 120 of the creasing elements 13 of the first or top array 10 to contact surface of the sheet of material 115 (see FIGS. 17, 19, and 20).

As the folding operation proceeds, the top array 10 is actuated further downwardly along the z direction, for example by actuation assembly 25, moving the leading edges 120 of the creasing elements 13 of the top array 10 below the plane defined by the leading edges 122 of the creasing elements 14 of the bottom array 12. In this manner, the first array 10 and second array 12 of creasing elements 13, 14 are moved to a second position relative to each other where the creasing elements 13 of the first array 10 are at least partially interdigitated with the creasing elements 14 of the second array 12 (see FIGS. 21, 23, and 24).

During downward motion of the top array 10 to its second or partially interdigitated position, individual creasing elements 13 of the top array 10 may be brought closer together along the x direction, for example by use of first and second top x actuators 18a, 18c and first and second top x rack and pinion assemblies 42a, 42c, thereby collapsing the top array 10 along the x direction. In this regard, actuators 18a, 18c can serve to rotate the gearing mechanisms or rack and pinion assemblies 42a, 42c to decrease the distance between top x push/pull bars 51, 52 thereby contracting the top array 10 in the x direction. In a similar manner, individual creasing elements 14 of the bottom array 12 may be brought closer together along the x direction, for example by use of bottom x actuators 20a, 20c and first and second bottom x rack and pinion assemblies 45a, 45c, thereby collapsing the bottom array 12 along the x direction. In this regard, actuators 20a, 20c can serve to rotate the gearing mechanisms or rack and pinion assemblies 45a, 45c to decrease the distance between bottom x push/pull bars 51, 52 thereby contracting the bottom array 10 in the x direction.

The x push/pull bars 51, 52, which may be rigidly or otherwise coupled to the sides of the arrays 10, 12, for example using the y-guides 57, 58, may be translated along the x direction to cause the collapsing and contracting of the arrays 10, 12. An inward or compressive force is thus applied by one or more of the x push/pull bars 51, 52 to the sides of the arrays 10, 12 which span the y direction. The force is generally applied to the end row of creasing elements and transmitted, for example via rigid body motion of the end row of creasing elements, to each of the end x-travel scissor assemblies 152 and thus to each other creasing element in such row. The rigid body motion of each of the end creasing elements may force the unconstrained portion of the scissor assemblies 152, for example the pivotally mounted ends 166, to translate within the slots 168 moving the pivotally mounted ends 166 downward, in the case of the bottom set of x-travel scissor assemblies, and upward, in the case of the top set of x-travel scissor assemblies (see FIG. 19). The pivotally mounted ends 166 are coupled to adjacent ones of the pivotally mounted ends 166 and as such they move in unison under the compressive force of the x push/pull bars 51, 52. Since the creasing elements in each row are coupled by the y-travel scissor assemblies 154 to adjacent creasing elements in the next or adjacent row, movement of certain rows of creasing elements by the x push/pull bars 51, 52 cause similar movement in the x direction of all of the creasing elements in the array.

In an analogous manner, a compressive or inward force may be exerted by the y push/pull bars 53, 54 which is applied to the end columns and certain of the internal or central columns of creasing elements via the x-guides 55, 56 mounted to such bars 53, 54 and connected to such columns of creasing elements. The inward motion of such columns of creasing elements of the top and bottom arrays 10, 12 causes the y-travel scissor assemblies 154 of such columns to fold or collapse and the pivotally mounted ends 162 to move within slot 165 in a downward direction, in the case of the bottom array 12, or an upward direction, in the case of the top array 10. Pins 163 couple each of the pivotally mounted ends 162 to each other causing them to slide up and down in unison. Since the creasing elements in each column are coupled by the x-travel scissor assemblies 152 to adjacent creasing elements in the next or adjacent column, movement of certain columns of creasing elements by the y push/pull bars 53, 54 cause similar movement in the y direction of all of the creasing elements in the array.

In one embodiment, the contraction of the top array 10 and top array 12 are coordinated and thus occur simultaneously such that the top array 10 and bottom array 12 contract in unison in the x direction. The downward motion along the z direction and contracting motion along the x direction of the arrays 10, 12 may be coordinated such that the relative distance 185 between the leading edges 120 of the creasing elements 13 of the top array 10 and the leading edges 122 of the creasing elements 14 of the bottom array 12 remains generally constant (see FIG. 19). In this manner, tearing or other damage to the sheet of material 115 may be prevented. In some examples, the coordination of relative movement of the arrays 10, 12 may be adjusted such that the relative distance 185 is allowed to vary thereby imparting a stretching force to the sheet of material 115, which sheet in some examples may be made of a compliant material. For example, and with reference to FIG. 19, the leading edges 122 of bottom creasing elements 14 contact the sheet of material 115 along a first plurality of straight line segments 87 along the y axis. The leading edges 120 of top creasing elements 13 contact the sheet of material 115 along a second plurality of straight line segments 87 along the y axis. In one embodiment, the straight line segment 87 contacted or engaged by a creasing element 13 in a row of top array 10 is adjacent the straight line segment 87 contacted or engaged by the adjacent creasing element 14 of the bottom array 12 in a corresponding row. The portion of the material 115 which includes the chevron or angled legs 83, 85 of the crease paths is not engaged by any surface or edge of the creasing elements at this stage. That portion remains unsupported by the creasing elements and disposed between adjacent columns of creasing elements. As the top and bottom arrays 10, 12 become partially interdigitated, the first plurality of straight line segments engaged by the top array 10 moves downwardly, while the second plurality of straight line segments engaged by the bottom 12 moves upwardly to form the accordion-like pattern of troughs or valleys 86 and peaks or folds 80 described previously with reference to FIGS. 5-10. The material spanning the chevrons or angled legs 83, 85 also folds in a similar manner by virtue of being connected to the straight line segments 87, which are in engagement with the plurality of creasing elements 13, 14. The folding of the unsupported material causes first spaced apart endwalls 72 and second spaced apart endwalls 74 to begin taking shape by bringing the two plies of each wall closer together.

In a next stage of the folding operation, the top array 10 and bottom array 12 of creasing elements 13, 14 are contracted in the y direction, which as described above may be accomplished by bringing the y-push/pull bars 53, 54 closer together. During this stage, the material extending unsupported between the columns of creasing elements, for example the portion of the medium 60 spanning the chevrons or angled legs 83, 85 that is to become the spaced apart endwalls 72, 74, may be forced to fold in a forward or a backward direction, as may be desired. As previously described, selectively perforating or scoring the medium 60 or 115 along only one side of the medium may dictate the direction of the fold. By providing certain crease paths, for example the crease paths 75, only along one face of the foldable medium 60 or 115, the facets 102, 103 (see FIG. 9) defined by the chevrons or angled legs 83, 85 may be forced to fold in a forward direction relative to the faces 101, as shown for example in FIG. 21. Each endwall 72 may be formed a pair of adjacent facets 102 and each endwall 74 may be formed from the pair of adjacent facets 103, each with respect to the x axis and as shown for example in FIG. 9. In this step, and as the columns of creasing elements move closer together, adjacent pairs of endwalls 72, 74 are further collapsed to form the four ply wall structures 82.

The top array 10 and bottom array 12 may move through several intermediate positions of interdigitations during the folding operation. Furthermore, in certain embodiments, contraction of the arrays 10, 12 in the y direction may occur simultaneously with or separately from contraction of the arrays 10, 12 along the x direction, and contraction or interdigitation of the arrays 10, 12 in the z direction 15 may occur simultaneously with or separately from contraction of the arrays in one or both of the x and y directions. For example, the arrays may be moved from the noninterdigitated position, for example where the top array 10 and bottom array 12 are farthest apart, to the fully interdigitated position, for example where the creasing elements 13, 14 are closest together along the x direction, before or while contracting of the arrays occurs along the y direction.

Figure 31:
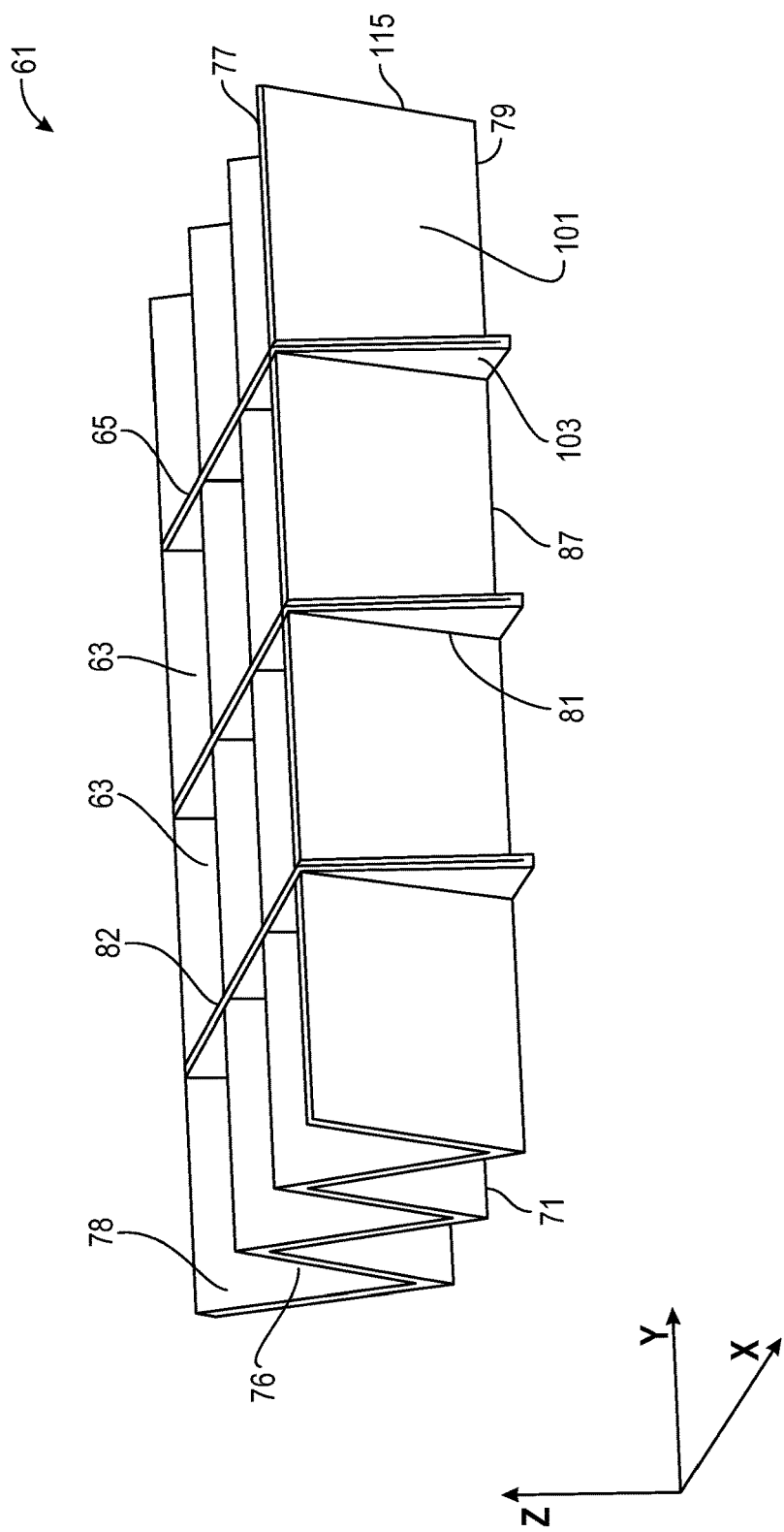
FIG. 31 is a somewhat schematic, isometric view of a portion of the fully folded sheet of material of FIG. 7.

As the arrays 10, 12 move from a partially interdigitated or second position to a fully interdigitated or third position, the x-travel scissor assemblies may become fully collapsed, and as the arrays 10 and 12 are fully contracted along the y direction, the y-travel scissor assemblies may also become fully collapsed to form the compact configuration shown in FIGS. 25-30. At this point, the medium 60 or 115 is folded to its final folded configuration, for example as depicted in FIG. 31 and as also depicted and described in reference to FIGS. 7 and 8. In this fully collapsed position, each two abutting endwalls 72, 74 may become sandwiched or compressed by the sides 128, 130 of the top portion of adjacent creasing elements, particularly for example where the length of the leading edges 120, 122 of the elements is substantially equal to the straight line segments 87 of the medium, and both sides of each of the adjacent sloped sidewalls or facets 76 78 of a cell 63 may come in full contact with the sloping sides faces 124, 126 of the respective creasing element. In other words, the interdigitation of the top portions 150 of the creasing elements 13, 14 and the contraction along the y axis of the arrays 10, 12 of creasing elements operates to fold the medium 60 or 115 into a three-dimensional structure 61, for example as shown in FIGS. 7-8 and 31.

After the three-dimensional structure 61 has been formed, one or both of the arrays 10, 12 may be actuated along the z axis or direction 15 away from each other to allow for the formed structure to be retrieved from the apparatus 1. For example, the top array 10 may be actuated using the linear actuator 8 along the z axis or vertical direction 15. The folded three-dimensional structure 61 may be removed from the bottom array 12 and may then be available for use or further processing. Each of the top array 10 and bottom array 12 may then be expanded to their respective first, starting or home position, with the expansion of each of the top and bottom arrays 10, 12 occurring simultaneously or in sequence. For example, array 10 may be expanded along the x direction by moving the x-push/pull bars 51, 52 from the contracted position shown in FIG. 25 to the farthest apart position shown in FIGS. 4 and 12 by rotating the pinion gears 17, 34 of the rack and pinion assemblies 45a, 45c in a clockwise direction. The pairs of rack gears 19, 21 and 39, 41 may translate along the x direction ends of the outer ends of the rack gears moving farther apart and thereby causing the x-push/pull bars to move farther apart. As previously described, each of the x-push/pull bars may be coupled, rigidly or otherwise, to the end rows of the arrays 10, 12, and the outward movement of the x-push/pull bars causes the end row of creasing elements to move outwardly. As during the contraction of the array, by virtue of interconnecting each creasing element or folding element to the next or adjacent creasing element or folding element using x-travel scissor assemblies 152, the pulling motion or force applied to the end rows of the creasing elements is transmitted towards the interior of the array causing all interior x-travel scissor assemblies 152 to expand.

The array 10 may be expanded along the y direction in an analogous manner by moving the y-push/pull bars 53, 54 from the contracted position of FIG. 25 to the expanded or home position of FIGS. 4 and 12. Rotation of the pinion gears 27 and 47 in the clockwise direction causes the pairs of rack gears 46, 48 and 26, 28 to move along the y direction such that outer ends of the rack gears move apart from each other thereby causing the y-push/pull bars 53, 54, which are coupled to the ends of the racks, to move outwardly relative to each other. The expansion of the y-push/pull bars 53, 54 applies a pulling force along the top and bottom end columns of creasing elements, for example by means of x-guides 55, 56. The pulling force along the end columns is transmitted to the interior of the array causing all of the y-travel scissor assemblies 154 to expand.

In the present example, four x-guides 55 are used at the front side of the arrays and four x-guides 56 are used at the back or rear side of the arrays, however any other number of x-guides may be used. Similarly, two y-guides 57 and two y-guides 58 are used to couple the left and right sides of each array to the respective push/pull bars of the portion of apparatus 1, however any other number, for example four, eight or more, of guides may be used along each side. As will be appreciated, the x-travel scissor assemblies 152 allow the arrays 10, 12 to collapse or contract or expand when an appropriate force is applied along the x direction. When a force is instead applied along the y direction, the x-travel scissor elements act as a generally rigid link connecting each of the creasing elements of a column of creasing elements forming a generally rigid column or beam. Similarly, the y-travel scissor assemblies 154 allow contraction or expansion along the y direction but form a generally rigid coupling along rows of creasing elements. In this manner, a pulling force applied perpendicular at one or more points along the generally rigid column of creasing elements may be sufficient to cause all of the creasing elements in the column to move in reaction to that force. Similarly, a pulling force applied perpendicular to the rigid row assemblies formed by interconnected creasing elements and y-travel scissor assemblies may be sufficient to cause the rows of elements to move along the pulling force. In this regard, the combination of orthogonally arranged x-travel and y-travel scissor assemblies 152, 154 not only allows for collapsing of the arrays but also advantageously forms generally rigid rows and columns of creasing elements allowing for the expansion of the arrays.

In one embodiment, the angle by the inclined faces 124, 126 forming the leading edge 120, 122 of a creasing element is not greater than, or substantially equal to or less than, the angle between the sloped side walls or facets 76, 78 of the desired cell 63 to be formed by the creasing element. In one embodiment, apparatus 1 is constructed so that the angle between the inclined faces 124, 126 of the creasing elements 13, 14 is less than or equal to the smallest desired angle between the sloped side walls or facets 76, 78 of the cells 63 in the folded structure 61 intended to be created by such creasing elements 13, 14.

The depth of the cells 63 in the folded structure 61 created by apparatus is determined by the amount of full interdigitation of the creasing elements 13, 14 forming such cells 63, that is the distance along the z axis that the leading edge 120 of the respective creasing elements 13 extend between and beyond the leading edge 122 of the respective creasing elements 14 forming the cell. In one embodiment, the amount or distance of full interdigitation between a creasing element 13 of top array 10 and adjacent creasing elements 14 of bottom array 12 permitted by apparatus 1 is not less than the maximum distance along the z axis that valley fold 86 of the desired cell 63 to be created extends below the opposed end walls 72, 74 of such cell 63.

Each cell 63 of the folded structure 61 has a width along the x axis and a length along the y axis. The width of a cell 63, which is generally the distance between adjacent peak folds 80 is determined by the amount or distance along the x axis to which the leading edges 120, 122 of adjacent creasing elements of the first and second arrays 10, 12 contract to in the final or contracted position. The length of a cell 63, which is generally the length of the straight line segment 87, is defined by the cumulative length of opposing leading edges 120, 122 of opposing creasing elements. That is, in some examples, the top and bottom arrays may be offset along the y direction to vary the length of each resulting cell. The configuration and operation of an apparatus according to the present invention to achieve offsetting of the arrays along the y direction, for example, will be further described with reference to FIGS. 32 and 33 below.

Further variations of the resulting cells 63 may be achieved. For example, if the leading edge 122 of the opposed creasing element in the second array of the apparatus 1 forming such cell is located between such creasing elements of the first array an equal distance from each such creasing element of the first array, then valley fold 86 of the cell will be located in the middle of the cell. Alternatively, if the leading edge 122 of the opposed creasing element of the second array is spaced closer to the leading edge 122 of one of the adjacent creasing elements of the first array, then the valley fold 86 of the cell will likewise be closer to one of the peak folds 80 of the cell. In one embodiment, the amount or distance along the x axis of the leading edge 122 of adjacent creasing elements of the first array 10, 12 permitted by apparatus 1 is not less than the maximum distance along the x axis that of the peak folds 80 of the desired cell 63 to be created by the apparatus.

As can be appreciated from the foregoing, apparatus 1 permits folded structures 61 to be created having cells 63 therein of various shapes and sizes.

Figure 32:
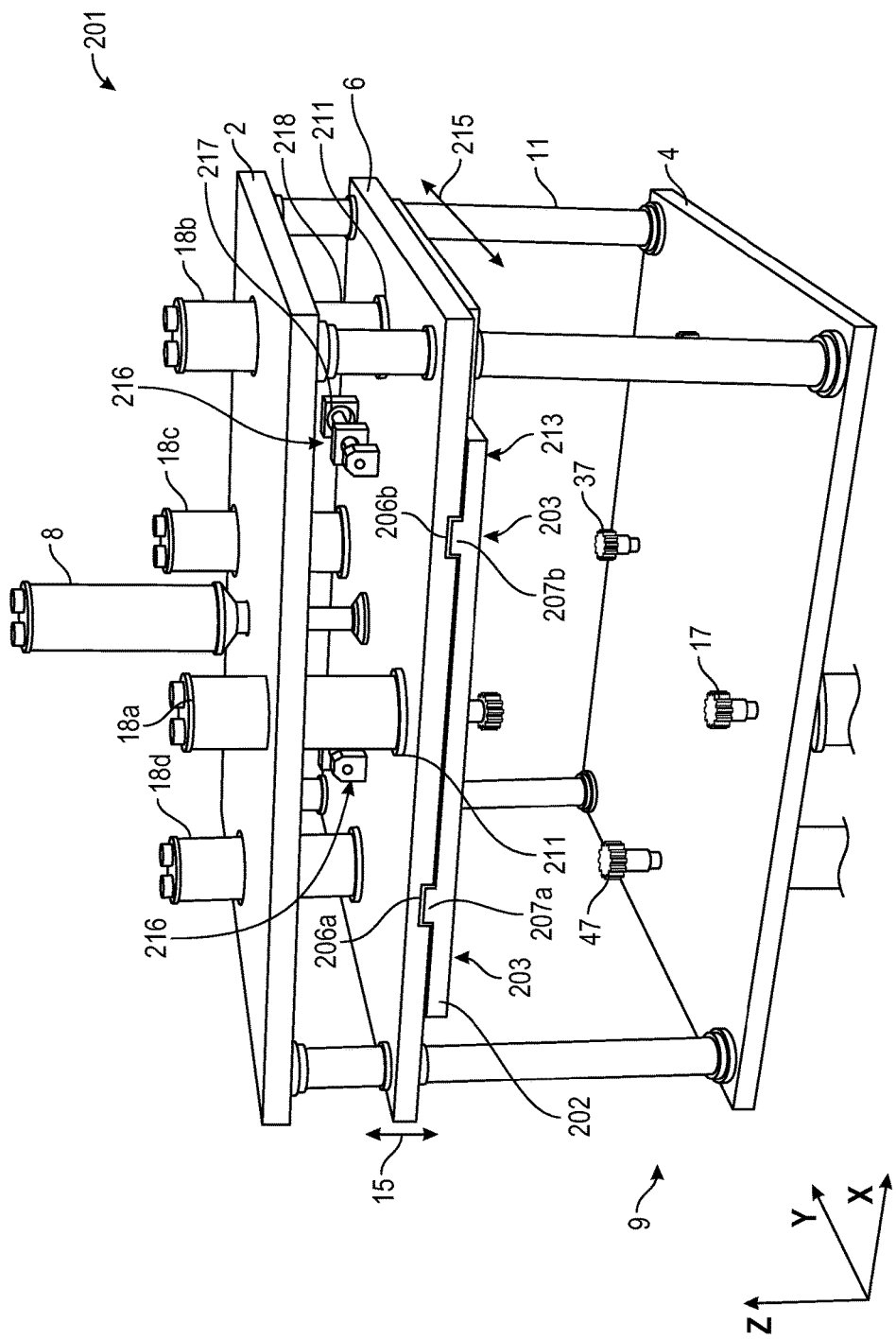
FIG. 32 is an isometric and schematic partial view of another embodiment of an apparatus of the present invention for folding a sheet of material into a support structure.

As previously discussed, an apparatus of the invention call also be provided that permits the length of a cell 63 of the formed folded structure 61 to be varied from structure to structure, which may be achieved without changing the size of the creasing elements or otherwise reconfiguring the top and/or bottom arrays 10,12. As such, opposed creasing elements having respective leading edges 120, 122 of fixed lengths can be utilized with a foldable medium 60 having an imaginary straight line segment 87 of a first length defined thereon, so as to form a first cell 63 having a distance or length between opposed end walls 72, 74 of such first length. In addition, such opposed creasing elements can be utilized with a foldable medium 60 having another imaginary straight line segment 87 of a second length defined thereon, that is different from the first length, such that a second cell 63 having a distance between opposed end walls 72, 74 of such second length may be formed. One embodiment of such an apparatus is illustrated in FIG. 32, which for simplicity and clarity shows a partial isometric view of the apparatus. In the example shown in FIG. 32, certain components of the actuating assemblies and support assemblies are shown, while certain other portions of the apparatus, for example the top and bottom arrays 10,12, are omitted so as not to obscure the disclosure of the present example. The arrays 10,12 (not shown in FIG. 32) may be essentially the same as previously described with reference to apparatus 1, and it will be understood that any combinations of creasing elements and arrays of creasing elements may be used in the example of FIG. 32.

Apparatus 201 illustrated in FIG. 32 is substantially similar to apparatus 1 and like reference numerals have been utilized to describe and identify like components of apparatus 1 and 201. Apparatus 201 permits relative movement along at least one of x and y axes between the creasing elements 13 of top array 10 and the creasing elements 14 of the bottom array 12 (not shown in FIG. 32). In one embodiment, creasing elements 13 of the top array are movable in unison in a direction along the y axis relative to the creasing elements 14 of the bottom array. Although such movement can be of any suitable distance, in one embodiment such distance ranges from 0.125 to 1.0 inch, in one embodiment from 0.125 to 0.5 inch and in one embodiment is approximately 0.25 inch.

In one embodiment, an additional moveable plate 202 is included in apparatus 201. Translation plate 202, also known as y-translation plate 202, is slidably secured to the bottom of moveable plate 6 by any suitable slide assembly 203. In one embodiment, the slide assembly includes at least first and second grooves 206a, 206b formed in the bottom of plate 6 in spaced-apart positions along the x axis. Translation plate 202 is provided with at least first and second slide elements 207a, 207b for cooperating with respective grooves 206 to permit plate 208 to move in the y direction relative to plate 6. The slide elements 207 can be in the form of first and second rails 207a, 207b that cooperatively seat in respective grooves 206a, 206b in a manner with permits the rails to slide along the y axis or 215 direction, in the grooves. The rails 207a, 207b and grooves 206a, 206b can be configured such that the rails are restricted from moving in the two directions orthogonal to the direction of travel, and as such the rails 207a, 207b and grooves 206a, 206b may be shaped so that the rails 207a, 207b cannot move in the x direction or in the z direction while seated in the grooves 206a, 206b. The cooperating rails and grooves may be implemented in a dovetail arrangement, as shown in FIG. 32, however other techniques, currently known or later developed, for slidably coupling the plate 202 to the bottom of plate 6 may be used.

Rack and pinion assemblies 42 can be mounted to the bottom 213 of translation plate 202 in the same configuration as such assemblies 42 are mounted to the bottom of moveable plate 6 in apparatus 1. Similarly, actuation devices or actuators 18a-18d are mounted to the top of movable plate 6, and rack and pinions assemblies 42, in the same manner as discussed above and illustrated with respect to moveable plate 6 in apparatus 1. A plurality of respective apertures 211 can be provided through the width of translation plate 202 for receiving the actuators 18 and permitting movement of the actuators 18 along the y axis during y travel of the plate 202. In some examples, the apertures 211 may be circular and a diameter of each of the apertures 211 may be selected such that the inner wall of the aperture 211 does not interfere with the shaft of each of the actuators 18a-18d when the plate 203 is translated along the y direction. In certain examples, one or more of the apertures 211 may shaped as an oval, a rectangle, or an elongated slot. Any other suitable form factor may be used for the apertures 211 to allow the plate 202 to move relative the plates 2, 4, and/or 6 along the y direction.

An actuation assembly 216 can be included in apparatus 201 for translating or moving plate 202 relative to elevationally-adjustable plate 6. In one embodiment, a plurality of linear actuators 217, for example cylinder-piston type, hydraulic or electric actuators, may be utilized and controlled and/or synchronized as desired, using a programmable controller for example that is the same or in addition to the controllers discussed above. In one embodiment, first and second actuators 217 are provided and mounted in spaced-apart positions along the x axis to the top of moveable plate 6. The piston of each actuator can be connected to a bracket or other suitable member 218 that is joined in a suitable manner to the top of translation plate 202 and extends through an opening in the moveable plate 6 so as to be accessible to the actuator.

Figure 33:
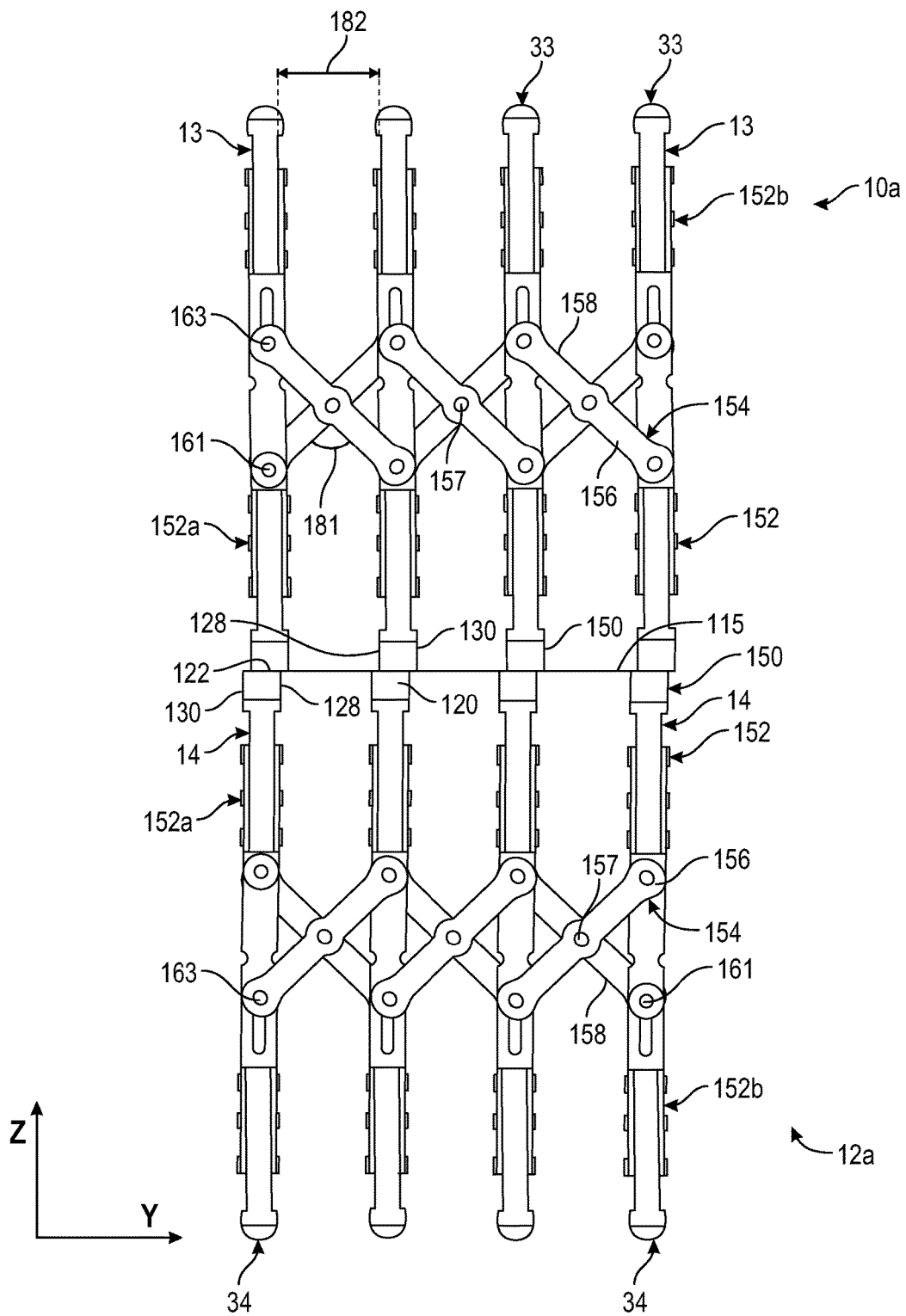
FIG. 33 is a side elevational view, similar to FIG. 20, of a portion of the first and second arrays of creasing elements of the apparatus of FIG. 32.

Actuation assembly 216 permits the creasing elements 13 of top array 10 to be moveable along y axis relative to the creasing elements 14 of the bottom array 12 (see FIG. 33). As such, the rows 33 of creasing elements 13 can be translated in the y direction relative to the corresponding rows 34 of creasing elements 14, either during or prior to the folding process of apparatus 201.

Apparatus 201 operates in substantially the same manner as discussed above with respect to apparatus 1. In one method of operation where the straight lines 87 of the foldable medium 60, and thus the distance between end walls 72, 74 of the cells 63 of the folded structure to be formed, are greater than the length of the leading edge of the creasing element 13, 14, the top array 10 can be moved along the y axis relative to the bottom array 12, for example before the creasing elements engage the foldable medium 60, such that the end surface of the creasing elements in one of arrays 10, 12 is registered along the y axis with one end of an alternating set of straight lines 87 of the medium 60 and the end surface of the creasing elements in the other of arrays 10, 12 is registered along the y axis with the other end of each of the set of straight lines 87 between such alternating set. For example, the end surface 130 of a creasing element 13 can be registered with one end of a straight line 87 of the medium 60, and the end surfaces 130 of the opposing creasing elements 14 on both sides along the x axis of such creasing element 13 can be registered with the other end of the two adjacent straight lines 87 on the medium located on opposite sides of the first line 87 along the x axis. During the folding process, the opposed leading edges 120, 122 of the creasing elements 13, 14 engage the straight lines 87 of the medium 60 during interdigitation of the creasing elements to cause such alternating straight lines 87 to form alternating peak folds 80 and valley folds 86 in the medium. A slight offset of the top creasing elements 13 relative to the bottom creasing elements 14 along the y axis as shown in FIG. 33, such as for example in the amounts discussed above, does not affect the folding process or the formation of cells 63 and wall structures 82.

In the foregoing manner, apparatus 201 permits creasing elements 13, 14 having leading edges 120, 122 of fixed lengths to be utilized to form cells having a distance between end walls 72, 74 approximately equal to the length of such leading edges 120, 122 and to form cells having a distance between end walls 72, 74 greater than the length of such leading edges 120, 122.

Figure 34:
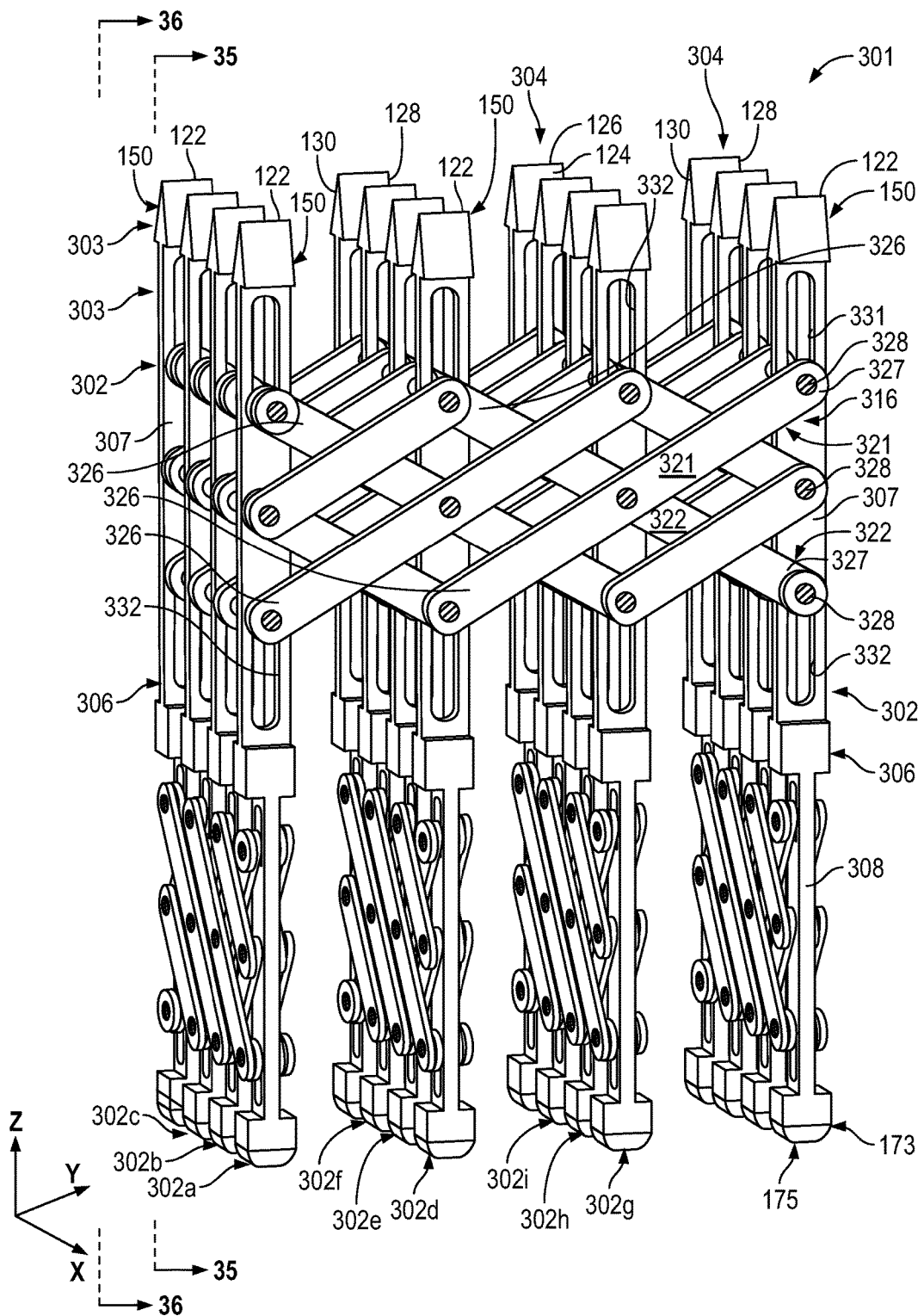
FIG. 34 is a side-perspective isometric view, similar to FIG. 14, of another embodiment of a portion of an array of creasing elements of the present invention.
Figure 35:
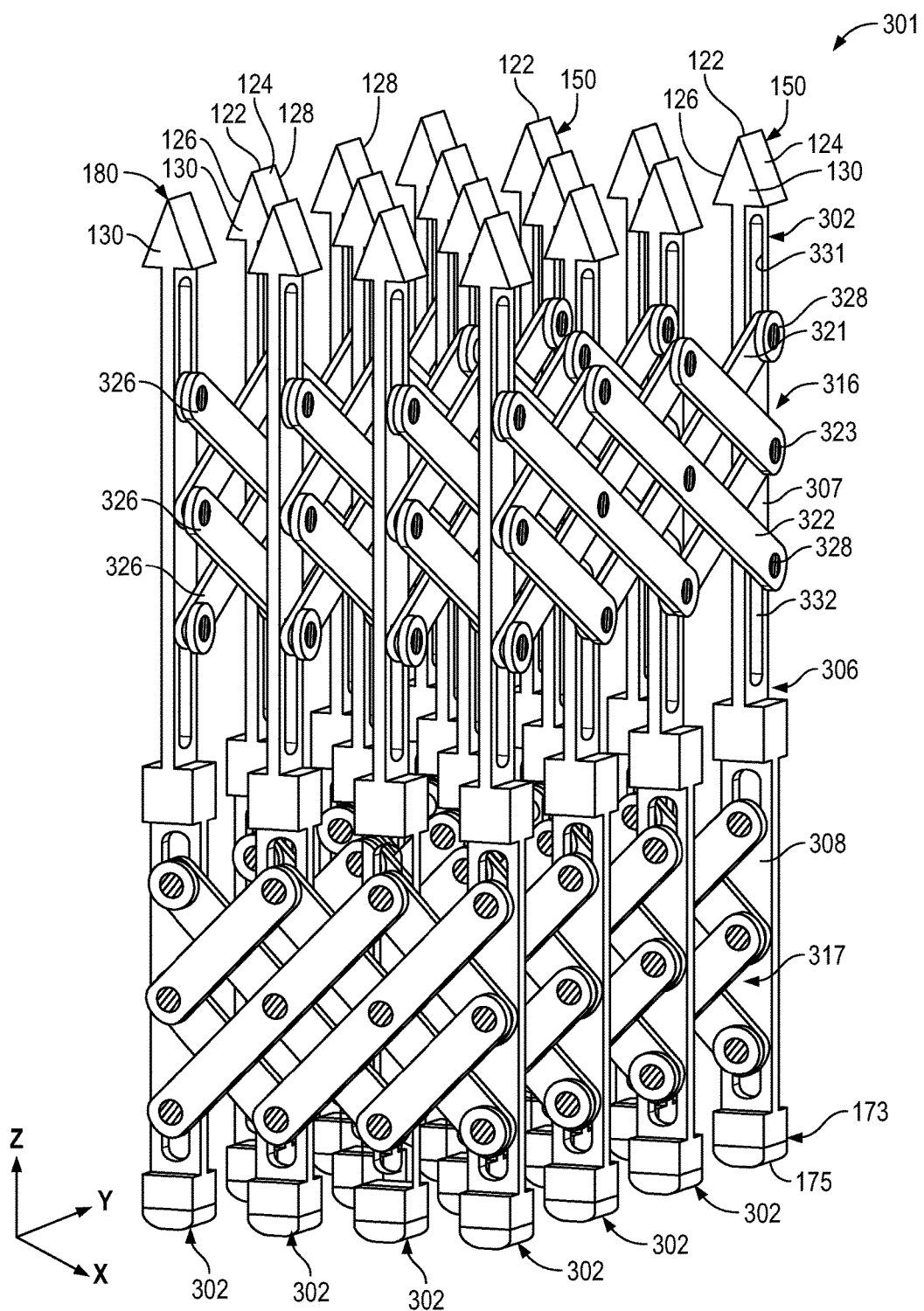
FIG. 35 is a front perspective isometric view of the portion of the array of creasing elements of FIG. 34 taken along the line 35-35 of FIG. 34.
Figure 36:
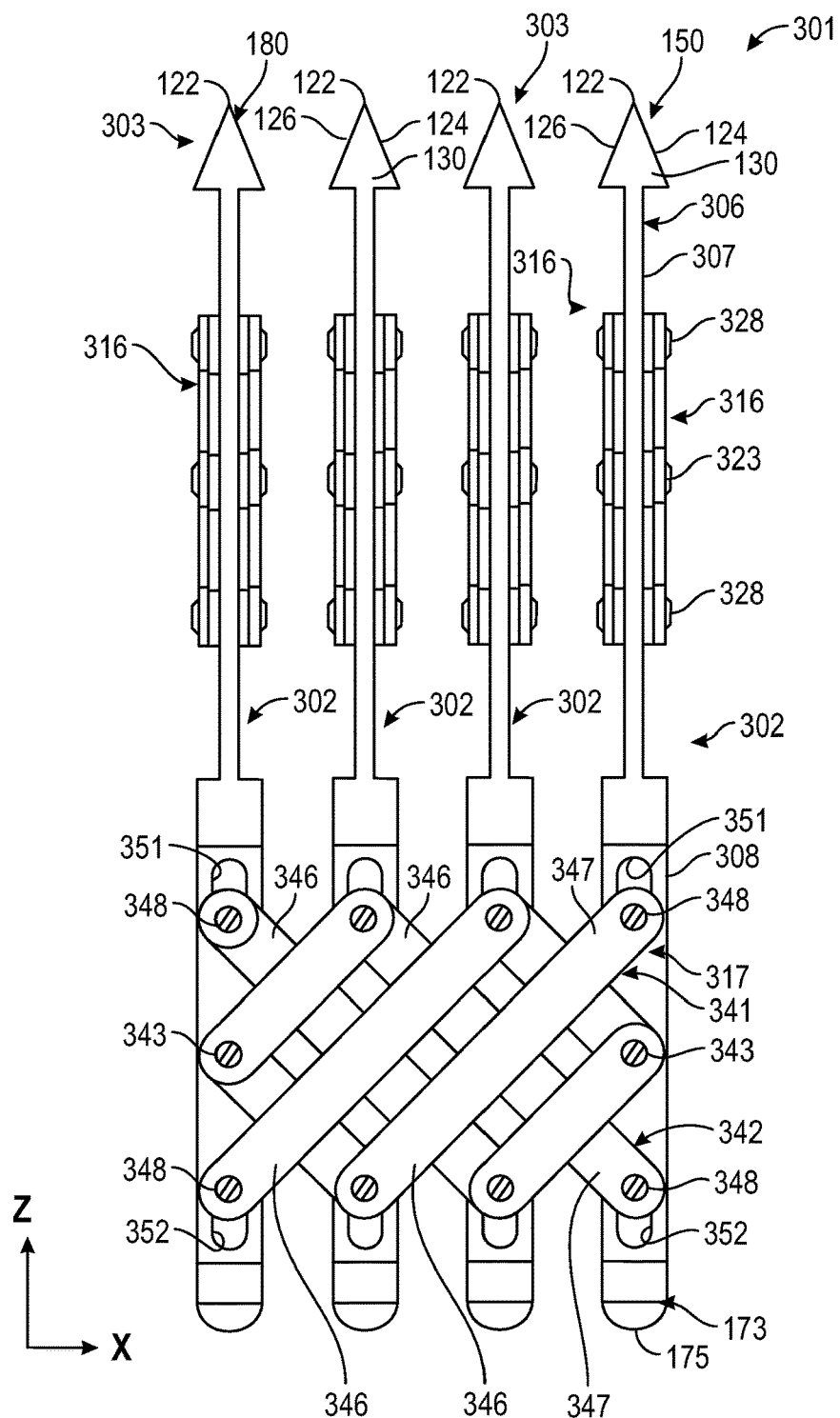
FIG. 36 is a front elevational view of the portion of the array of creasing elements of FIG. 34 taken along the line 36-36 of FIG. 34.

Other embodiments of the first or top array of creasing elements and the second or bottom array of creasing elements of the creasing assembly of the present invention, for example creasing assembly 7, can be provided. An additional embodiment of an array of creasing elements that can be utilized for one or both of top array 10 and bottom array 12 of the invention is illustrated in FIGS. 34-36. Creasing array 301 disclosed in FIGS. 34-36 can be utilized for one or both of top array 10 and bottom array 12 of the invention, including in any of the disclosures above or herein. The creasing array 301 is substantially similar to top array 10 and bottom array 12 and like reference numerals have been used to describe like components of arrays 301, 10 and 12.

Creasing array 301 is formed from a plurality of creasing elements 302 that are substantially similar to creasing elements 13 of top array 10 and creasing elements 14 of bottom array 12 and like reference numerals have been used to describe like components of creasing elements 302, 13 and 14. The creasing elements can be arranged in a plurality of columns 303 and a plurality of rows 304 that can extend perpendicular to the columns 303. It is appreciated that some or all of creasing elements 302 of creasing array 301 can be substantially identical and, in one embodiment, for example as illustrated in FIGS. 34-36, all of creasing elements 302 are identical. Each individual creasing element 302, which may also be referred to as a creasing member or a folding element or member, may be implemented as a generally elongate member, which may have a rectangular transverse cross section. It is appreciated that some or all of the creasing elements may be configured to have substantially any transverse cross section, for example such creasing elements may be circular or oval in the transverse cross-section such that the creasing elements are generally shaped as rods or other cylindrical members. Other form factors may be used as desired for forming some or all of the creasing elements.

In one embodiment, each creasing element 302 includes a first or top portion 150 and a second or body portion 306 (see FIG. 34). Body portion 306 of a creasing element can include a top, distal or upper section 307 and a bottom, proximal or lower section 308, as shown in FIG. 34. The body portion 306 of each creasing element 302 may be shaped and configured in any manner desired which accommodates coupling the body portion 306 of each creasing element of the array 301 and which further accommodates coupling the array to the actuation assembly 5. In one embodiment, as discussed above, the creasing elements of each array are arranged in rows and columns such that each creasing element is adjacent to at least one and preferably a plurality of other creasing elements. For example as shown in FIG. 34, creasing element 302e is adjacent to and disposed between creasing elements 302d, 302f along the x direction and adjacent to and disposed between creasing elements 302b, 302h in the y direction.

Adjacent creasing elements can be connected together using any suitable linking assemblies, including any of the linking assemblies described herein, which can permit expansion and contraction of columns of creasing elements along the y axis and expansion and contraction of rows of creasing elements along the x axis. In one embodiment, the expansion and contraction of the creasing elements in the y axis is independent of the expansion and contraction of the creasing elements in the x axis. The linking assemblies may be configured such that all creasing elements in a row 304 of creasing elements are moveable together in a first direction, for example along the y axis, and all creasing elements in a column 303 of creasing elements are moveable together in a second direction, for example along the x axis. In one embodiment, the linking assemblies, which may interchangeably be referred to herein as expandable linking assemblies or directionally expandable linking assemblies, may be implemented using y-travel scissor assemblies 316 and x-travel scissor assemblies 317 for respectively coupling together columns 303 of creasing elements 302 and rows 304 of creasing elements 302.

Each y-travel 316 and x-travel 317 scissor assembly, which can be made from any suitable material such as metal or plastic or ceramic, can include a plurality of first and second scissor elements or links. For example, each y-travel scissor assembly 316 may include a plurality of first y-scissor links 321 and a plurality of second y-scissor links 322 (see FIG. 34). The first and second y-scissor links 321, 322 are pivotally coupled together using a pivot means or joint that can include for example a y-center pivot element or pin 323. Each y-scissor link 321,322 has a y-first end portion 326 and a y-second end 327. In one embodiment, each pair of y-scissor links 321,322 couples together three adjacent creasing elements in a column 303 at the upper section 307 of the creasing elements 302. In this regard, the y-first end 326 of each y-scissor link 321, 322 may be slidably coupled to upper section 307 of the body portion 306 of one of the outer creasing elements of such three adjacent creasing elements, for example the left creasing element 302, by for example using a y-moveable element or pin 328 slidably disposed in a respective y-slot 331,332 provided on the upper section 307 of such left creasing element 302 and extending longitudinally in the z direction. The y-slot 331 for the y-first end 326 of the first y-scissor link 321 can be in the lower portion of the upper section 307, and the y-slot 332 for the y-first end 326 of the second y-scissor link 322 can be in the upper portion of the upper section 307. The y-second end 327 of each y-scissor link 321, 322 may be slidably coupled to upper section 307 of the body portion 306 of the other of the outer creasing elements of such three adjacent creasing elements, for example the right creasing element 302, by for example using a y-moveable element or pin 328 slidably disposed in a respective y-slot 332,331 provided on the upper section 307 of such right creasing element 302 and extending longitudinally in the z direction. The y-slot 332 for the y-second end 327 of the first y-scissor link 321 can be in the upper portion of the upper section 307, and the y-slot 331 for the y-second end 327 of the second y-scissor link 322 can be in the lower portion of the upper section 307. The y-center pivot pin 323 is fixedly coupled within a bore (not shown) in the upper section 307 of the center creasing element 302 of such three adjacent creasing elements. In one embodiment, such bore in the creasing element 302 is disposed midway between the slots 331,332. In one embodiment, a first y-travel scissor assembly 316 is coupled to one side of the creasing elements 302 of each column 303 of creasing elements and a second y-travel scissor assembly 316 is coupled to the other side of the creasing elements 302 of such column 303, although it is appreciated that an embodiment can be provided where only one y-travel scissor assembly 316 is utilized for a column 303 of creasing elements 302. At the outer-most rows 304 of creasing elements 302, only half of each y-scissor link 321, 322 is fixedly coupled by the y-center pivot pin 323 to the upper section 307 of each such end creasing element 302. In this regard, a y-end portion 326 or 327 of each scissor link 321,322 extends from the end creasing element 302 to the respective slot 331,332 in the adjacent creasing element 302 disposed inwardly of the array 301 from such end creasing element. Each first y-scissor link 321 extends parallel to each other and each second y-scissor link 322 extends parallel to each to each and the y-travel scissor assembly 316 extends in a plane. Contraction of the scissor links 321,322 of the assembly 316, by pivoting y-first end portions 326 away from each other about pin 323 and y-second end portions 327 away from each other about pin 323, causes the y-moveable pins 328 of each creasing element 302 to move away from each other in slots 331,332 so as to draw the creasing elements of the array 301 together in the y direction in unison. Expansion of the links 321,322 of the assembly 316, by pivoting y-first end portions 326 towards each other about pin 323 and y-second end portions 327 towards each other about pin 323, causes the y-moveable pins 328 of each creasing element 302 to move towards each other in slots 331,332 so as to move the creasing elements of the array 301 away from each other or expand in the y direction in unison.

In a similar manner, each x-travel scissor assembly 317 may include a plurality of first x-scissor links 341 and a plurality of second x-scissor links 342 (see FIG. 36). The first and second x-scissor links 341,342 are pivotally coupled together using a pivot means or joint that can include for example a x-center pivot element or pin 343. Each x-scissor link 341,342 has an x-first end portion 346 and a x-second end 347. In one embodiment, each pair of x-scissor links 341,342 couples together three adjacent creasing elements in a row 304 at the lower section 308 of the creasing elements 302. In this regard, the x-first end 346 of each x-scissor link 341,342 may be slidably coupled to lower section 308 of the body portion 306 of one of the outer creasing elements of such three adjacent creasing elements, for example the left creasing element 302, by for example using a x-moveable element or pin 348 slidably disposed in a respective x-slot 351,352 provided on the lower section 308 of such left creasing element 302 and extending longitudinally in the z direction. The x-slot 351 for the x-first end 346 of the first x-scissor link 341 can be in the lower portion of the lower section 308, and the x-slot 352 for the x-first end 346 of the second x-scissor link 342 can be in the upper portion of the lower section 308. The x-second end 347 of each x-scissor link 341, 342 may be slidably coupled to lower section 308 of the body portion 306 of the other of the outer creasing elements of such three adjacent creasing elements, for example the right creasing element 302, by for example using a x-moveable element or pin 348 slidably disposed in a respective x-slot 352,351 provided on the lower section 308 of such right creasing element 302 and extending longitudinally in the z direction. The x-slot 352 for the x-second end 347 of the first x-scissor link 341 can be in the upper portion of the lower section 308, and the x-slot 351 for the x-second end 347 of the second x-scissor link 342 can be in the lower portion of the lower section 308. The x-center pivot pin 343 is fixedly coupled within a bore (not shown) in the lower section 308 of the center creasing element 302 of such three adjacent creasing elements. In one embodiment, such bore in the creasing element 302 is disposed midway between the slots 351,352. In one embodiment, a first x-travel scissor assembly 316 is coupled to one side of the creasing elements 302 of each row 304 of creasing elements and a second x-travel scissor assembly 316 is coupled to the other side of the creasing elements 302 of such row 304, although it is appreciated that an embodiment can be provided where only one x-travel scissor assembly 316 is utilized for a row 304 of creasing elements 302. At the outer-most columns 303 of creasing elements 302, only half of each x-scissor link 341, 342 is fixedly coupled by the x-center pivot pin 343 to the lower section 308 of each such end creasing element 302. In this regard, a x-end portion 346 or 347 of each scissor link 341,342 extends from the end creasing element 302 to the respective slot 351,352 in the adjacent creasing element 302 disposed inwardly of the array 301 from such end creasing element. Each first x-scissor link 341 extends parallel to each other and each second x-scissor link 342 extends parallel to each to each and the x-travel scissor assembly 316 extends in a plane. Contraction of the scissor links 341,342 of the assembly 316, by pivoting x-first end portions 346 away from each other about pin 343 and x-second end portions 347 away from each other about pin 343, causes the x-moveable pins 348 of each creasing element 302 to move away from each other in slots 351,352 so as to draw the creasing elements of the array 301 together in the x direction in unison. Expansion of the links 341,342 of the assembly 316, by pivoting x-first end portions 346 towards each other about pin 343 and x-second end portions 347 towards each other about pin 343, causes the x-moveable pins 348 of each creasing element 302 to move towards each other in slots 351,352 so as to move the creasing elements of the array 301 away from each other or expand in the x direction in unison.

The creasing elements 302 can be made from any suitable material such as metal, plastic or a ceramic material, and in one embodiment can be made from a rigid such material. Not all of the creasing elements need be made from the same material, for example some creasing elements can be made from a rigid plastic, some other creasing elements can be made from metal and some other creasing elements can be made from a ceramic material. In one embodiment, the top 150 and body 306 portions of each creasing element 302 may be formed as a single unitary structure, for example a monolithic component fabricated in one piece by molding or machining, as examples. In one embodiment, each creasing element may comprise a plurality of individual sub-components which are assembled to form the creasing element and assembled into the array 301 of creasing elements. In one embodiment, an end portion 173 of the lower section 308 of a creasing element 302 may be provided with a sliding contact surface or bearing 175.

Creasing array 301 can operate in the same manner as discussed above, for example with respect to top array 10 and bottom array 12. The spanning of the first and second y-scissor links 321,322 and the first and second x-scissor links 341,342 across three respective adjacent creasing elements 302, and the slidable coupling together of such three adjacent creasing elements 302 by such respective scissor links, enhances the structural integrity and uniform movement of the creasing array 301 so as to increase the reliability of the operation of folding apparatus 1 and the quality of the folded structure formed thereby.

Examples of apparatus, systems and methods for folding a sheet of material into a folded support structure have been described herein, which apparatus, systems, and methods may afford a level of automation for achieving three dimensional folded structures as described.

An exemplary apparatus according to the present invention may include a first array of creasing elements and a second array of creasing elements, each of the creasing elements in the first and second arrays having a leading edge adapted to engage a sheet of material. The apparatus may further include at least one actuator for causing relative movement of the first and second arrays of creasing elements from a first position in which the first and second plurality of creasing elements are spaced apart to a second position in which the first and second array of creasing elements are at least partially interdigitated and for moving the creasing elements of the first array closer together and the creasing elements of the second array closer together during relative movement of the first and second arrays of creasing elements to the second position. In this manner a sheet of material can be placed between the first and second arrays of creasing elements and folded by the leading edges of the creasing elements during the relative movement of the first and second arrays creasing elements to the second position. Furthermore, the movement of the creasing elements of the first array closer together and the creasing elements of the second array closer together accommodates contraction of the sheet of material as it is folded by the first and second arrays of creasing elements.

In certain embodiments, the at least on actuator may include at least one first actuator for causing relative movement of the first and second arrays of creasing elements from the first position to the second position and at least one second actuator for moving the creasing elements of the first array closer together and the creasing elements of the second array closer together during relative movement of the first and second arrays of creasing elements to the second position. In one embodiment, an apparatus may include a plurality of arrays of creasing elements, wherein creasing elements of a first array are disposed in rows and columns and the creasing elements of a second array are disposed in rows and columns. In one embodiment, the number of columns in the first array of creasing elements may be one less than the number of columns in the second array of creasing elements. In one embodiment, the rows of creasing elements in the first array may be alignable in a plane with the rows of creasing elements in the second array.

In one embodiment, the first array of creasing elements may be moveable transversely relative to the second array of creasing elements so that the rows of creasing elements in the first array are not aligned in a plane with the rows of creasing elements in the second array. In one embodiment, the apparatus may further include at least one additional actuator for moving the first array of creasing elements relative to the second array of creasing elements so that the rows of creasing elements in the first array are not aligned in a plane with the rows of creasing elements in the second array when the first and second arrays of creasing elements are in the first position.

In one embodiment, the columns of creasing elements in the first array may be offset from the columns of creasing elements in the second array when viewed in plan so that that columns of creasing elements in the first array are interdigitated with the columns of creasing elements in the second array when the first and second arrays of creasing elements are in the second position. In one embodiment, the columns of creasing elements in the first array may be substantially centered between the columns of creasing elements in the second array when viewed in plan.

In one embodiment, adjacent creasing elements in each column of the first array may be interconnected by a first column scissor assembly and adjacent creasing elements in each column of the second array may be interconnected by a second column scissor assembly. In one embodiment, adjacent creasing elements in each row of the first array may be interconnected by a first row scissor assembly and adjacent creasing elements in each row of the second array may be interconnected by a second row scissor assembly.

In one embodiment, leading edges of the creasing elements of the first array may be substantially coplanar with each other when the first and second arrays of creasing elements are in the first position. In one embodiment, the leading edges of the creasing elements of the second array may be substantially coplanar with each other when the first and second arrays of creasing elements are in the first position. In one embodiment, the leading edge of the creasing elements of the second array may be substantially coplanar with each other and the leading edge of the creasing elements of the first array may be substantially coplanar with each other when the first and second arrays of creasing elements are in the first position.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An apparatus for folding a sheet of material to create a folded structure, comprising a first array of creasing elements and a second array of creasing elements, each of the creasing elements having a leading edge adapted to engage the sheet of material, at least one actuator for causing relative movement of the first and second arrays of creasing elements from a first position in which the first and second plurality of creasing elements are spaced apart to a second position in which the first and second array of creasing elements are at least partially interdigitated and for moving the creasing elements of the first array closer together and the creasing elements of the second array closer together during relative movement of the first and second arrays of creasing elements to the second position whereby the sheet of material can be placed between the first and second arrays of creasing elements and folded by the leading edges of the creasing elements during the relative movement of the first and second arrays creasing elements to the second position and the movement of the creasing elements of the first array closer together and the creasing elements of the second array closer together accommodates contraction of the sheet of material as it is folded by the first and second arrays of creasing elements, wherein the creasing elements of the first array are disposed in rows and columns when viewed in plan and the creasing elements of the second array are disposed in rows and columns when viewed in plan, and adjacent creasing elements in each column of the first array are interconnected by a first column scissor assembly and adjacent creasing elements in each column of the second array are interconnected by a second column scissor assembly, and adjacent creasing elements in each row of the first array are interconnected by a first row scissor assembly and adjacent creasing elements in each row of the second array are interconnected by a second row scissor assembly.

2. The apparatus according to claim 1, wherein the at least one actuator includes at least one first actuator for causing relative movement of the first and second arrays of creasing elements from the first position to the second position and at least one second actuator for moving the creasing elements of the first array closer together and the creasing elements of the second array closer together during relative movement of the first and second arrays of creasing elements to the second position.

3. The apparatus of claim 2, wherein the at least one actuator includes a third actuator for causing movement of one of the first or second arrays relative to the other one of the first or second arrays such that columns of creasing elements of one of the first or second arrays are not aligned with columns of creasing elements of the other one of the first or second arrays.

4. The apparatus according to claim 1, wherein the number of columns in the first array of creasing elements is one less than the number of columns in the second array of creasing elements.

5. The apparatus according to claim 4, wherein the number of rows in the first array of creasing elements is equal to the number of rows in the second array of creasing elements.

6. The apparatus according to claim 1, wherein each of the rows of creasing elements in the first array is alignable in a plane with the respective row of creasing elements in the second array.

7. The apparatus according to claim 6, wherein the first array of creasing elements are moveable transversely relative to the second array of creasing elements so that the rows of creasing elements in the first array are not aligned in a plane with the rows of creasing elements in the second array.

8. The apparatus according to claim 7, further comprising at least one additional actuator for moving the first array of creasing elements relative to the second array of creasing elements so that the rows of creasing elements in the first array are not aligned in a plane with the rows of creasing elements in the second array when the first and second arrays of creasing elements are in the first position.

9. The apparatus of according to claim 1, wherein the columns of creasing elements in the first array are offset from the columns of creasing elements in the second array when viewed in plan so that columns of creasing elements in the first array are interdigitated with the columns of creasing elements in the second array when the first and second arrays of creasing elements are in the second position.

10. The apparatus according to claim 9, wherein the columns of creasing elements in the first array are centered between the columns of creasing elements in the second array when viewed in plan.

11. The apparatus according to claim 1, wherein the leading edges of the creasing elements of the first array are coplanar with each other when the first and second arrays of creasing elements are in the first position.

12. The apparatus according to claim 11, wherein the leading edges of the creasing elements of the second array are coplanar with each other when the first and second arrays of creasing elements are in the first position.

13. The apparatus according to claim 12, wherein the leading edge of the creasing elements of the second array are coplanar with each other and the leading edge of the creasing elements of the first array are coplanar with each other when the first and second arrays of creasing elements are in the first position.

* * * * *